(12) United States Patent
Tzelnic et al.

(10) Patent No.: US 9,652,568 B1
(45) Date of Patent: May 16, 2017

(54) METHOD, APPARATUS, AND COMPUTER PROGRAM PRODUCT FOR DESIGN AND SELECTION OF AN I/O SUBSYSTEM OF A SUPERCOMPUTER

(71) Applicant: EMC Corporation, Hopkinton, MA (US)

(72) Inventors: Percy Tzelnic, Concord, MA (US); Sorin Faibish, Newton, MA (US); Uday K. Gupta, Westford, MA (US); John Bent, Los Alamos, NM (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 921 days.

(21) Appl. No.: 13/675,965

(22) Filed: Nov. 13, 2012

Related U.S. Application Data

(60) Provisional application No. 61/559,378, filed on Nov. 14, 2011.

(51) Int. Cl.
  *G06F 13/10* (2006.01)
  *G06F 17/50* (2006.01)
  *G06F 15/177* (2006.01)

(52) U.S. Cl.
  CPC ........ *G06F 17/5022* (2013.01); *G06F 15/177* (2013.01)

(58) Field of Classification Search
  CPC ............. G06F 11/1438; G06F 11/1471; G06F 17/30303; G06F 11/1458; G06F 11/203; G06F 17/30
  See application file for complete search history.

(56) References Cited

U.S. PATENT DOCUMENTS

| | | | |
|---|---|---|---|
| 7,117,275 B1 | 10/2006 | Ofek et al. | |
| 7,676,514 B2 | 3/2010 | Faibish et al. | |
| 7,676,628 B1 * | 3/2010 | Compton et al. | 711/114 |
| 7,739,379 B1 | 6/2010 | Vahalia et al. | |
| 7,793,061 B1 | 9/2010 | Gupta et al. | |
| 7,945,726 B2 | 5/2011 | Faibish et al. | |

(Continued)

OTHER PUBLICATIONS

Ben et al.("PLFS: A Checkpoint Filesystem for Parallel Applications", ACM, 2009, pp. 1-12).*

(Continued)

*Primary Examiner* — Thai Phan
*Assistant Examiner* — Iftekhar Khan
(74) *Attorney, Agent, or Firm* — Polsinelli PC

(57) ABSTRACT

For simulating a parallel supercomputing cluster, a simulation program includes a model of the system of compute nodes and a model of an I/O subsystem that stores checkpoints from the compute nodes. When executed, instructions in the simulation program perform the steps of receiving input parameters defining the compute nodes and the I/O subsystem, computing a total number of computational flops for a time between checkpoints and an amount of disk storage required to store the checkpoint data for different configurations of the parallel supercomputing cluster, and presenting a summary to a user of the computed number of computational flops for a time between checkpoints and an amount of disk storage required to store the checkpoint data for the different configurations of the parallel supercomputing cluster.

20 Claims, 16 Drawing Sheets

(56) References Cited

U.S. PATENT DOCUMENTS

| | | | |
|---|---|---|---|
| 8,140,821 B1 | 3/2012 | Raizen et al. | |
| 8,296,534 B1 | 10/2012 | Gupta et al. | |
| 8,352,429 B1* | 1/2013 | Mamidi et al. | 707/640 |
| 8,392,370 B1* | 3/2013 | Whitney et al. | 707/640 |
| 2007/0220227 A1 | 9/2007 | Long | |
| 2007/0220327 A1* | 9/2007 | Ruscio | G06F 11/1438 714/17 |
| 2007/0277056 A1* | 11/2007 | Varadarajan et al. | 714/15 |
| 2009/0106255 A1 | 4/2009 | Lacapra et al. | |
| 2010/0031084 A1* | 2/2010 | Tremblay | G06F 9/30043 714/13 |
| 2010/0153634 A1* | 6/2010 | Fellinger et al. | 711/104 |
| 2010/0185719 A1* | 7/2010 | Howard | 709/201 |
| 2011/0119525 A1* | 5/2011 | Muralimanohar et al. | 714/15 |
| 2011/0173488 A1* | 7/2011 | Blumrich | G06F 11/1438 714/4.1 |
| 2011/0219208 A1* | 9/2011 | Asaad et al. | 712/12 |
| 2011/0264898 A1* | 10/2011 | Chaudhry | G06F 9/3842 712/228 |
| 2011/0296241 A1* | 12/2011 | Elnozahy | G06F 11/1438 714/19 |
| 2012/0222034 A1* | 8/2012 | Ishikawa et al. | 718/102 |
| 2012/0324159 A1 | 12/2012 | Bopardikar et al. | |
| 2013/0198723 A1* | 8/2013 | Gupta | G06F 9/44 717/127 |
| 2014/0137124 A1 | 5/2014 | Szalay et al. | |

OTHER PUBLICATIONS

J.T. Daly("A higher order estimate of the optimum checkpoint interval for restart dumps", ScienceDirect,2004, pp. 303-312).*
Long et al. ("Compiler-Assisted Static Checkpoint Insertion", IEEE,1992, pp. 58-65).*
Susan Blaclrford—LAPACK Benchmark—1999, pp. 1-11.*
Wright et al. ("LDPLFS: Improving I/O Performance Without Application Modification", IEEE, 2012, pp. 1352-1359 ).*
Eingereicht von ("Comparison and End-to-End Performance Analysis of Parallel File Systems", Technische Universität Dresden, 1974, pp. 1-123).*
Elnozahy et al. ("Checkpointing for Peta-Scale Systems: A Look into the Future of Practical Rollback-Recovery", IEEE, 2004, pp. 97-108).*
Nawab Ali et al., "Scalable I/O Forwarding Framework for High-Performance Computing System," IEEE International Conference on Cluster Computing (Cluster 2009), New Orleans, LA, Aug. 31-Sep. 4, 2009, 11 pages, IEEE, New York, NY.
Ahmed Amer et al., "Design issues for a shingled write disk system," 26th IEEE Symposium on Massive Storage Systems and Technologies (MSST 2010), Lake Tahoe, NV, May 3, 2010, 14 page, IEEE, New York, NY.
Nathan Fabian et al., "The ParaView coprocessing library: A scalable, general purpose in situ visualization library," 2011 IEEE Symposium on Large Data Analysis and Visualization (LDAV), Providence, RI, Oct. 23-24, 2011, pp. 89-96, IEEE, New York, NY.
Jay Lofstead et al., "Managing variability in the io performance of petascale storage systems," Conference on High Performance Computing Networking, Storage and Analysis (SC10), New Orleans, LA, Nov. 13-19, 2010, 12 pages, Association for Computing Machinery, New York, NY.
Jay Lofstead et al., "Flexible IO and integration for scientific codes through the adaptable IO system (ADIOS)," 6th international workshop on Challenges of large applications in distributed environments (CLADE '08), Boston, MA, Jun. 2008, 10 pages, Association for Computing Machinery, New York, NY.
Adam Moody et al., "Design, modeling, and evaluation of a scalable multi-level checkpointing system," 2010 ACM/IEEE International Conference for High Performance Computing, Networking, Storage and Analysis (SC10), New Orleans, LA, Nov. 13-19, 2010, pp. 1-11, IEEE, New York, NY.
Swapnil Patil et al., "GIGA+: Scalable Directories for Shared File Systems," 2nd International Petascale Data Storage Workshop (PDSW '07) at SC07, Reno, Nevada, Nov. 11, 2007, pp. 26-29, Association for Computing Machinery, New York, NY.
Tom Peterka et al., "Scalable parallel building blocks for custom data analysis," 2011 IEEE Symposium on Large Data Analysis and Visualization (LDAV), Providence, RI, Oct. 23-24, 2011, 8 pages, IEEE, New York, NY.
Fabrizio Petrini et al., "The case of the missing supercomputer performance: Achieving optimal performance on the 8,192 processors of asci q," 2003 ACM/IEEE Conference on Supercomputing (SC03), Phoenix, AZ, Nov. 15-21, 2003, 17 pages, Association for Computing Machinery, New York, NY.
Galen Shipman et al., "The spider center wide file system: From concept to reality," Cray User Group Conference, Atlanta, GA, May 2009, 10 pages, National Center for Computational Sciences, Oak Ridge National Laboratory, Oak Ridge, TN.
Anna Tikhonova et al., "Visualization by Proxy: A Novel Framework for Deferred Interaction with Volume Data," IEEE Transactions on Visualization and Computer Graphics, vol. 16, No. 6, Nov. 16, 2010, pp. 1551-1559, IEEE, New York, NY.
Venkatram Vishwanath et al., "Toward simulation-time data analysis and I/O acceleration on leadership-class systems," 2011 IEEE Symposium on Large Data Analysis and Visualization (LDAV), Providence, RI, Oct. 23-24, 2011, 6 pages, IEEE, New York, NY.
Brad Whitcock, "Parallel in situ coupling of simulation with a fully featured visualization system," Eurographics Symposium on Parallel Graphics and Visualization, Llandudno, Wales, UK, Apr. 10-11, 2011, pp. 100-109, The Eurographics Association, Geneva, Switzerland.
Jonathan Woodring et al., "In Situ Sampling of a Large Scale Particle Simulation for Interactive Visualization and Analysis," LA-UR-10-08211, Eurographics/IEEE-VGTC Symposium on Visualization 2011, Bergen, Norway, May 31-Jun. 3, 2011, Computer Graphics Forum, vol. 30, No. 3, 2011, 11 pages, The Eurographics Association, Geneva, Switzerland.
Andy Cedilnik et al., "Remote Large Data Visualization in the ParaView Framework," Eurographics Symposium on Parallel Graphics and Visualization (2006), Braga, Portugal, May 10, 2006, 8 pages, The Eurographics Association, Geneva, Switzerland.
Ning Liu et al., "On the Role of Burst Buffers in Leadership-Class Storage Systems," IEEE 28th Symposium on Mass Storage Systems and Technologies (MSST 2012), Pacific Grove, CA, Apr. 16-20, 2012, 11 pages, IEEE, New York, NY.
Hassan Abbasi et al., "DataStager: Scalable Data Staging Services for Petascale Applications," 18th ACM International Symposium on High Performance Distributed Computing, Munich, Germany, Jun. 11-13, 2009, 10 pages, Association for Computing Machinery, New York, NY.
Nawab Ali et al., "Scalable I/O Forwarding Framework for High-Performance Computing Systems," IEEE International Conference on Cluster Computing (Cluster 2009), New Orleans, LA, Aug. 31-Sep. 4, 2009, 11 pages, IEEE, New York, NY.
Ning Liu et al., "Modeling a Leadership-scale Storage System," 9th International Conference on Parallel Processing and Applied Mathematics, Torun, Poland, Sep. 11-14, 2011, 10 pages, Springer, New York, NY.
Michael Albrecht et al., "An Evaluation of Embedded Storage for Exascale and the Value of Asynchronous Data Transfer," IEEE International Conference on eScience 2012, Chicago, IL, Oct. 8-12, 2012, 2 pages, IEEE, New York, NY.
John Morrison, "SOS-14 Future Directions in GPU HW Panel," SOS14 Conference, Savannah, GA, Mar. 9, 2012, 6 pages, Oak Ridge National Laboratory, Oak Ridge, TN.
John Morrison, "Interactions Between LANL and EMC Corporation," poster, Industry-National Workshop on Modeling and Simulation, Austin, TX, Mar. 6-8, 2012, one page, Oak Ridge National Laboratory, Oak Ridge, TN.
Sorin Faibish, "An IO Stack for the Exascale," short paper, 28th IEEE Conference on Mass Storage and Technologies (MSST 2012), Pacific Grove, CA, Apr. 16-20, 2012, 13 pages, IEEE, New York, NY.

(56) References Cited

OTHER PUBLICATIONS

John Bent et al., "Storage Challenges at Los Alamos National Lab," 28th IEEE Conference on Mass Storage and Technologies (MSST 2012), Pacific Grove, CA, Apr. 16-20, 2012, 5 pages, IEEE, New York, NY.

John Bent et al., "Co-processing Simulation and Visualization on a Prototype Exascale Burst Buffer Storage System," Poster presented at LANL booth at Supercomputing Conference (SC11), Seattle, WA, Nov. 14, 2011, one page, Los Alamos National Laboratory, Los Alamos, NM.

Andrew Komernicki et al., "Roadrunner: Hardware and Software Overview," IBM Redbook REDP-4477-00, Jan. 2009, 50 pages, IBM Corporation, Armonk, NY.

John Bent et al., "PLFS: A Checkpoint Filesystem for Parallel Applications," LANL Technical Information Release 09-02117, SC09 Conference, Portland, Oregon, Nov. 14-20, 2009, 12 pages, Association for Computing Machinery, New York, NY.

Adam Manzanares et al., "Reading from a Write Optimized File System Under Highly Concurrent Shared File Workloads," FAST 2011, WiP, 9th USENIX Conference on File and Storage Technologies, San Jose, CA, Feb. 17, 2011, one page, USENIX Association, Berkeley, CA.

Mallikarjuna Shastry et al., "Selection of a Checkpoint Interval in Coordinated Checkpointing Protocol for Fault Tolerant Open MPI," International Journal on Computer Science and Engineering, vol. 02, No. 06, 2010, pp. 2064-2070, Engg Journals Publications, Vandalur, India.

Rajeer Thakur et al., "An Abstract-Device Interface for Implementing Portable Parallel-I/O Interfaces," Proceedings of the 6th Symposium on the Frontiers of Massively Parallel Computation, Annapolis, MD, Oct. 27-31, 1996, pp. 180-187, IEEE, New York, NY.

Evan J. Felix et al., "Active Storage Processing in a Parallel File System", 6th LCI International Conference on Linux Clusters: The HPC Revolution. Chapel Hill, NC, Apr. 26, 2005, 11 pages, Linux Cluster Institute, University of New Mexico, Albuquerque, NM.

Juan Piernas et al., "Evaluation of Active Storage Strategies for Lustre Parallel File System," SC07 Conference, Reno, NV, Nov. 10-16, 2007, 10 pages, Association for Computing Machinery, New York, NY.

Gary Grider, "Exa-Scale FSIO, Can we get there? Can we afford to?", LA-UR 10-04611, 27th IEEE (MSST 2011) Symposium on Massive Storage Systems and Technologies, Denver, Colorado, May 23-27, 2011, 41 pages, IEEE, New York, NY.

Sequoia RFP Attachment 2, "Draft Statement of Work," Advanced Simulation and Computing, LLNL-PROP-404138-DRAFT, May 21, 2008, 140 pages, Lawrence Livermore National Security, LLC, Livermore, CA.

Matt Leininger et al., "Sequoia Architectural Requirements," LLNL-PRES-403472, The Salishan Conference on High Speed Computing, Gleneden Beach, OR, Apr. 21-24, 2008, 26 pages, Lawrence Livermore National Laboratory, Livermore, CA.

Gary Grider, "Exa-Scale FSIO, Can we get there? Can we afford to?," LA-UR 10-04611, HEC FSIO 2010 Workshop, Arlington, VA, Aug. 1-4, 2010, 14 pages, Lawrence Livermore National Laboratory, Livermore, CA.

Gary Grider, ExaScale FSIO/Storage/Viz/Data Analysis, Can we get there? Can we afford to?, Excerpts from LA-UR 10-04611, ASC PSAPP II Conference, Irving, Texas, May 10-11, 2011, 8 pages, Sandia National Laboratory, Albuquerque, NM.

Gary Grider, "Exa-Scale FSIO and Archive, Can we get there? Can we afford to?," LA-UR 10-04611, Fall Creek Falls 2011 Conference, Gatlinburg, TN, Sep. 13-16, 2011, 33 pages, Lawrence Livermore National Laboratory, Livermore, CA.

Andy White, "Exascale Technical Challenges," LA-UR 11-02-200, ASC PSAPP II Conference, Irving, TX, May 10-11, 2011, 18 pages, Sandia National Laboratory, Albuquerque, NM.

Dick Watson, "PSAAP II's Exascale Software Component," LLNL-PRES-482167, ASC PSAPP II Conference, Irving, TX, May 10-11, 2011, 10 pages, Sandia National Laboratory, Albuquerque, NM.

Hsing-Bung Chen et al., "A Cost-Effective, High Bandwidth Server I/O network Architecture for Cluster Systems," Parallel and Distributed Processing Symposium (IPDPS 2007), Long Beach, CA, Mar. 26-30, 2007, 10 pages, IEEE, New York, NY.

Hsing-Bung Chen et al., "Integration Experiences and Performance Studies of A COTS Parallel Archive System," 2010 IEEE International Conference on Cluster Computing, Crete, Greece, Sep. 20-24, 2010, pp. 166-177, IEEE, New York, NY.

Gary Grider et al., "PaScal—A New Parallel and Scalable Server IO Networking Infrastructure for Supporting Global Storage/File Systems in Large-size Linux Clusters," Performance, Computing, and Communications Conference (IPCCC 2006), Mesa, AZ, Apr. 10-12, 2006, pp. 331-340, IEEE, New York, NY.

John Bent et al., "Flexibility, Manageability, and Performance in a Grid Storage Appliance," 11th IEEE International Symposium on High Performance Distributed Computing (HPDC'02), Edinburgh, Scotland, Jul. 23-26, 2002, 10 pages, IEEE, New York, NY.

Yitzhak Birk et al,, "Distributed-and-Split Data-Control Extension to SCSI for Scalable Storage Area Networks," 10th Symposium on High Performance Interconnects Hot Interconnects (HotI'02) Aug. 21, 2002, Stanford University, Palo Alto, CA, 6 pages, IEEE Computer Society, IEEE, New York, NY.

Steffen Gerhold et al., "Improved checkpoint / restart using solid state disk drives," 32nd International Convention on Information and Communication Technology, Electronics and Microelectronics (MIPRO), Opatija, Croatia, May 25-29, 2009, 6 pages, Croatian Society for Information and Communication Technology, Electronics and Microelectronics, Opatija, Croatia.

Steffen Gerhold et al., "Pageserver: High-Performance SSD-Based Checkpointing of Transactional Distributed Memory," 2nd International Conference on Computer Engineering and Applications (ICCEA 2010), Mar. 26, 2010, Bali, Indonesia, 5 pages, IEEE, New York, NY.

Raghunath Rajachandrasekar et al., "Can Checkpoint/Restart Mechanisms Benefit from Hierarchical Data Staging?", 17th International European Conference on Parallel and Distributed Computing (Euro-Par 2011), Bordeaux, France, Aug. 29-Sep. 2, 2011, Proceedings, pp. 312-321, Springer-Verlag Berlin, Germany.

Xiangyong Ouyang et al., "Enhancing Checkpoint Performance with Staging IO and SSD," IEEE MSST, SNAPI 2010—6th IEEE International Workshop on Storage Network Architecture and Parallel I/Os, Lake Tahoe, NV, May 3, 2010, 8 pages, IEEE, New York, NY.

Xiangyu Dong et al., "Hybrid Checkpointing using Emerging Non-Volatile Memories for Future Exascale Systems," ACM Trans. On Architecture and Code Optimization, vol. 8. No. 2 , Jul. 2011, 30 pages, Association for Computing Machinery, New York, NY.

Xiangyu Dong et al., "Modeling and Leveraging Emerging Non-Volatile Memories for Future Computer Designs," IEEE Design & Test of Computers, vol. 28, No. 1, Jan.-Feb. 2011, pp. 44-51, IEEE, New York, NY.

David Camp et al., "Evaluating the Benefits of an Extended Memory Hierarchy for Parallel Streamline Algorithms," 2011 IEEE Symposium on Large-Scale Data Analysis and Visualization, Providence, RI, Oct. 23-24, 2011, pp. 57-64, IEEE, New York, NY.

Jeffrey Vetter et al., "Blackcomb: Hardware-Software Co-design for Non-Volatile Memory in Exascale Systems," SC10, New Orleans, LA, Nov. 13-19, 2010, 10 pages, IEEE, New York, NY.

Sudarsun Kannan et al., "Using Active NVRAM for I/O Staging," Technical Report HPL-2011-131, Aug. 21, 2011, 6 pages, Hewlett-Packard Corp., Palo Alto, CA.

Ramya Prabhakar, "Provisioning a Multi-Tiered Data Staging Area for Extreme-Scale Machines", 31st Int'l Conference on Distributed Computing Systems (ICDCS 2011), Minneapolis, MN, Jun. 20-24, 2011, 12 pages, IEEE, New York, NY.

Min Li et al., "Functional Partitioning to Optimize End-to-End Performance on Many-core Architectures," SC10, New Orleans, LA, Nov. 13-19, 2010, 12 pages, IEEE, New York, NY.

Xiaojian Wu et al., "Managing Storage Space in a Flash and Disk Hybrid Storage System," MASCOTS 2009, Modeling, Analysis and Simulation of Computer and Telecommunication Systems, Imperial College, London, England, Sep. 21-23, 2009, 4 pages, IEEE, New York, NY.

(56) References Cited

OTHER PUBLICATIONS

Xiaojian Wu et al., "Exploiting concurrency to improve latency and throughput in a hybrid storage system," MASCOTS 2010, Modeling, Analysis and Simulation of Computer and Telecommunication Systems, Texas A&M University, College Station, TX, Aug. 17-19, 2010, 10 pages, IEEE, New York, NY.

Xiaojian Wu, "Storage System for Non-Volatile Memory Devices," Ph.D. Dissertation, Aug. 2011, 128 pages, Texas A&M, College Station, TX.

John A. Garrison and A.L. Narasimha Reddy, "Umbrella File System: Storage Management Across Heterogeneous Devices," ACM trans on Storage, vol. 5, Issue 1, Mar. 2009, 21 pages, Association for Computing Machinery, New York, NY.

John A. Garrison, "Umbrella File System: Storage Management Across Heterogeneous Devices," Ph.D. Dissertation, Texas A&M, May 2010, 120 pages, Texas A&M, College Station, TX.

Tia Newhall and Douglas Woos, "Incorporating Network RAM & Flash into Fast Backing Store for Clusters," 2011 IEEE International Conference on Cluster Computing, Austin, TX, Sep. 26-30, 2011, pp. 121-129, IEEE, New York, NY.

George Symons, "Hybrid SSD/HDD Storage: A New Tier," FlashMemory Summit 2011, Santa Clara, CA, Aug. 9-11, 2011, 13 pages dated Aug. 15, 2011, Conference Concepts, Inc., San Diego, CA.

Ioan Ovidiu Hupca et al., "CacheFS—Hybrid RAM, SSD, and HDD file system", Google research web page, Mar. 29, 2010, two pages, Google Inc., Mountain View, CA.

Andy Wang et al., "The Conquest File System: Better Performance Through a Disk/Persistent-RAM Hybrid Design," ACM Transactions on Storage (TOS), vol. 2, Issue 3, Aug. 2006, 33 pages, Association for Computing Machinery, New York, NY.

Yannis Klonatos et al., "Azor: Using Two-level Block Selection to Improve SSD-based I/O caches," 2011 IEEE 6th International Conference on Networking, Architecture, and Storage (NAS), Dalian, China, Jul. 28-30, 2011, pp. 309-318, IEEE, New York, NY.

Sudarsun Kannan et al., "Using Active NVRAM for Cloud I/O," Open Cirrus Summit 2011 The 6th International Event, Atlanta, GA, Oct. 12-13, 2011, 5 pages, Center for Experimental Research in Computer Systems (CERCS) at Georgia Tech, Atlanta GA.

Kamil Iskra et al., "The NoLoSS Project Investigating the roles of node local storage in Exascale systems," 2010 LANL HEC FSIO, on the Internet by Oct. 22, 2011, 2 pages, Department of Energy, Washington, DC.

Jason Cope et al., "CODES: Enabling Co-design of Multi-layer Exascale Storage Architectures," Workshop on Emerging Supercomputing Technologies (WEST 2011), in conjunction with the 25th International Conference on Supercomputing (ICS 2011), Tucson, AZ, May 31-Jun. 4, 2011, 6 pages, Association for Computing Machinery, New York, NY.

Seonyeong Park et al., "A comprehensive study of energy efficiency and performance of flash-based SSD," Journal of Systems Architecture (2011) vol. 57, Issue: 4, Feb. 25, 2011, pp. 354-365, Elsevier B.V., Amsterdam, the Netherlands.

HEC FSIO 2010 Workshop Agenda, Arlington, VA, Aug. 1-4, 2010, on the Internet by Oct. 22, 2011, 5 pages, Los Alamos National Laboratory, Los Alamos, NM.

Ioan Raicu et al., "Making a Case for Distributed File Systems at Exascale," Third Workshop on Large-Scale System and Application Performance (LSAP), at ACM HPDC 2011, San Jose, CA, Jun. 8-11, 2011, 8 pages, Association for Computing Machinery, New York, NY.

John Bent et al., "Jitter-Free Co-Processing on a Prototype Exascale Storage Stack," 28th IEEE Conference on Mass Storage and Technologies (MSST 2012), Pacific Grove, CA, Apr. 16-20, 2012, 5 pages, IEEE, New York, NY.

Jim Aherns et al., ParaView: An End-User Tool for Large Data Visualization, Technical Report LA-UR-02-1560, 2005, 17 pages, Los Alamos National Laboratory, Los Alamos, NM.

Jim Aherns et al., "Verifying Scientific Simulations via Comparative and Quantitative Visualization," Computer Graphics and Applications, vol. 30, Issue: 6, Dec. 2010, pp. 16-28, IEEE, New York, NY.

Stat(system call), Wikipedia, Jul. 16, 2015, 8 pages, Wikimedia Foundation, San Francisco, CA.

Eckhardt, Drew, STAT(2), Linux Programming Manual, Apr. 21, 2009, 6 pages, Linux Kernal Organization, Linux Foundation, San Francisco, CA.

He et al., Dash-IO: an empirical study of Flash-based IO for HPC, TeraGrid '10, Pittsburgh, PA, Aug. 2, 2010, 8 pages, Association for Computing Machinery, New York, NY.

Polte et al., And eat it too: High read performance in write-optimized HPC I/O middleware formats, Supercomputing PDSW'09, Portland, OR, Nov. 15, 2009, 6 pages, Association for Computing Machinery, New York, NY.

Bent et al., US Dept. of Energy Best Practices Workshop on File Systems & Archives: Usability at the Los Alamos National Lab, LA-UR 11-11416, San Franscisco, CA, Sep. 26-27, 2011, 5 pages, Los Alamos National Lab, Los Alamos, NM.

Moody et al., Detailed Modeling, Design, and Evaluation of a Scalable Multi-level Checkpointing System, LLNL-TR-440491, Jul. 20, 2010, 46 pages, Lawrence Livermore National Laboratory, Livermore, CA.

Springmeyer et al., From Petascale to Exascale: Eight Focus Areas of R&D Challenges for HPC Simulation Environments, LLNL-TR-474731, Mar. 18, 2011, 30 pages, Lawrence Livermore National Laboratory, Livermore, CA.

Ibtesham et al., On the Viability of Checkpoint Compression for Extreme Scale Fault Tolerance, Alexander et al. (Eds.), Euro-Par 2000: Parallel Processing Workshops, Bordeau, France, Aug./Sep. 2011, Revised Selected Papers, Part II, LNCS 7156, 2012, pp. 302-311, Springer-Verlag, Berlin, Germany.

Bindle et al., Principles of Scientific Computing, Linear Algebra II, Algorithms, Feb. 26, 2009, 21 pages, Computer Science Department, New York University, New York, NY.

* cited by examiner

METHOD, APPARATUS, AND COMPUTER PROGRAM PRODUCT FOR DESIGN AND SELECTION OF AN I/O SUBSYSTEM OF A SUPERCOMPUTER

RELATED APPLICATIONS

This application claims the benefit of Percy Tzelnic, et al., U.S. Provisional Application 61/559,378 filed Nov. 14, 2011, entitled Method and Model for Design and Selection of an I/O Subsystem of a Supercomputer.

LIMITED COPYRIGHT WAIVER

A portion of the disclosure of this patent document contains computer code listings and command formats to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates to a parallel supercomputing cluster having compute nodes interconnected in a mesh of data links, and input-output nodes including data storage for storing checkpoint data from the compute nodes at spaced intervals of time.

BACKGROUND OF THE INVENTION

Parallel supercomputing clusters are used for numerical simulation of complex systems and processes. For example, parallel supercomputing clusters are used for weather forecasting, climate change modeling, and scientific research. Compute nodes perform similar computations of the simulation in parallel and exchange intermediate results over a mesh of high-speed interconnections using a Message Passing Interface (MPI) protocol. The Message Passing Interface is a standardized and portable message passing system designed to function on a wide variety of parallel computers.

Because the time to complete a numerical simulation is often much larger than the mean time to interrupt (MTTI) of a compute node due to a software or hardware error, a checkpoint technique is used to recover from such an interrupt. The checkpoint technique periodically saves checkpoint data representing the computational state of the compute nodes, so that the supercomputing cluster may recover from the interrupt by re-starting execution from a checkpoint saved in data storage.

Very large parallel supercomputing clusters have been assembled from rack-mounted commodity servers and switches. The rack-mounted commodity servers for the supercomputing cluster are configured to function either as compute nodes that perform the calculations of the simulation, or input-output (I/O) nodes that save the checkpoint data in a magnetic disk storage array. One I/O node is sufficient for storing all the checkpoint data from one group of about eight to sixteen compute nodes. The intermediate results and checkpoint data are exchanged between the nodes using high-speed InfiBand (TB) data links and switches. A slower speed Gigabit Ethernet network links each of the nodes to a control station computer providing an administrative node for the supercomputer. Such a supercomputer is described in Komernicki et al., "Roadrunner Hardware and Software Overview," IBM Redbook REDP-4477-00, January 2009, IBM Corporation, Armonk, N.Y.

SUMMARY OF THE INVENTION

In accordance with a first aspect, the invention provides an apparatus for simulating a parallel supercomputing cluster having a system of compute nodes and an I/O subsystem connected to the compute nodes for storing checkpoint data from the compute nodes. The apparatus includes a digital computer having a data processor and non-transitory computer readable storage medium storing a simulation program. The simulation program includes a model of the system of compute nodes and a model of the I/O subsystem. The simulation program also includes computer instructions that, when executed by the data processor, perform the steps of: (a) receiving input parameters defining the system of compute nodes and input parameters defining the I/O subsystem; (b) computing a total number of computational flops for a time between checkpoints and an amount of disk storage required to store the checkpoint data for different configurations of the parallel supercomputing cluster; and (c) presenting a summary to a user of the computed number of computational flops for a time between checkpoints and an amount of disk storage required to store the checkpoint data for the different configurations of the parallel supercomputing cluster.

In accordance with another aspect, the invention provides a method of simulating a parallel supercomputing cluster having a system of compute nodes and an I/O subsystem connected to the compute nodes for storing checkpoint data from the compute nodes. The method includes a data processor executing computer instructions of a simulation program stored in non-transitory computer readable storage medium. The simulation program includes a model of the system of compute nodes and a model of the I/O subsystem. The execution of the computer instructions performs the steps of: (a) receiving input parameters defining the system of compute nodes and input parameters defining the I/O subsystem; (b) computing a total number of computational flops for a time between checkpoints and an amount of disk storage required to store the checkpoint data for different configurations of the parallel supercomputing cluster; and (c) presenting a summary to a user of the computed number of computational flops for a time between checkpoints and an amount of disk storage required to store the checkpoint data for the different configurations of the parallel supercomputing cluster.

In accordance with a final aspect, the invention provides a computer program product. The computer program product includes non-transitory computer readable storage medium storing computer instructions that, when executed by a data processor, perform the steps of: (a) receiving input parameters defining the system of compute nodes and input parameters defining the I/O subsystem; (b) computing a total number of computational flops for a time between checkpoints and an amount of disk storage required to store the checkpoint data for different configurations of the parallel supercomputing cluster; and (c) presenting a summary to a user of the computed number of computational flops for a time between checkpoints and an amount of disk storage required to store the checkpoint data for the different configurations of the parallel supercomputing cluster.

In a preferred embodiment of the invention, a simulation model for a supercomputer includes a model for both a system of compute nodes and an I/O subsystem that stores checkpoints. The model has been validated using real measurements from a small demo system and the model extrapolates to a full scale supercomputer. The model accepts input parameters defining the compute system and input parameters defining the I/O subsystem. The model calculates the checkpoint time for three cases. The first case is a basic configuration using Lustre file system clients, running in the compute nodes, and the checkpoint target time specified in the spec of the supercomputer. The second case is an I/O subsystem using Parallel Log-Structured File System (PLFS) on the compute nodes on top of Lustre file system mounted on each compute node. The third case is an I/O subsystem using PLFS on the compute node and writing to a burst buffer that each compute node is connected to. For the third case the data is written to the burst buffer using Message Passing Interface Input-Output (MPI-IO) during the Tckpt time (MPI job paused) and it is "drained" to the Lustre file system during the MPI job compute time between checkpoints. For each of the three cases, the model calculates the checkpoint time and the compute time between checkpoints, and builds a time series for each of the cases. The last step is to compute the total number of computation flops C for each checkpoint interval for each of the three cases by integral of the time series. The model also calculates the number of disks required to achieve the throughput to allow drain from the burst buffer to the Lustre file system during the time between the checkpoints. The outputs of the model include the number of checkpoints written for each case, the runtime for each case, the minimum number of disk for capacity required for storing the number of checkpoints actually written, and graphics of the time series of the flops per second and the total flops.

BRIEF DESCRIPTION OF THE DRAWINGS

Additional features and advantages of the invention will be described below with reference to the drawings, in which.

Figure 1:
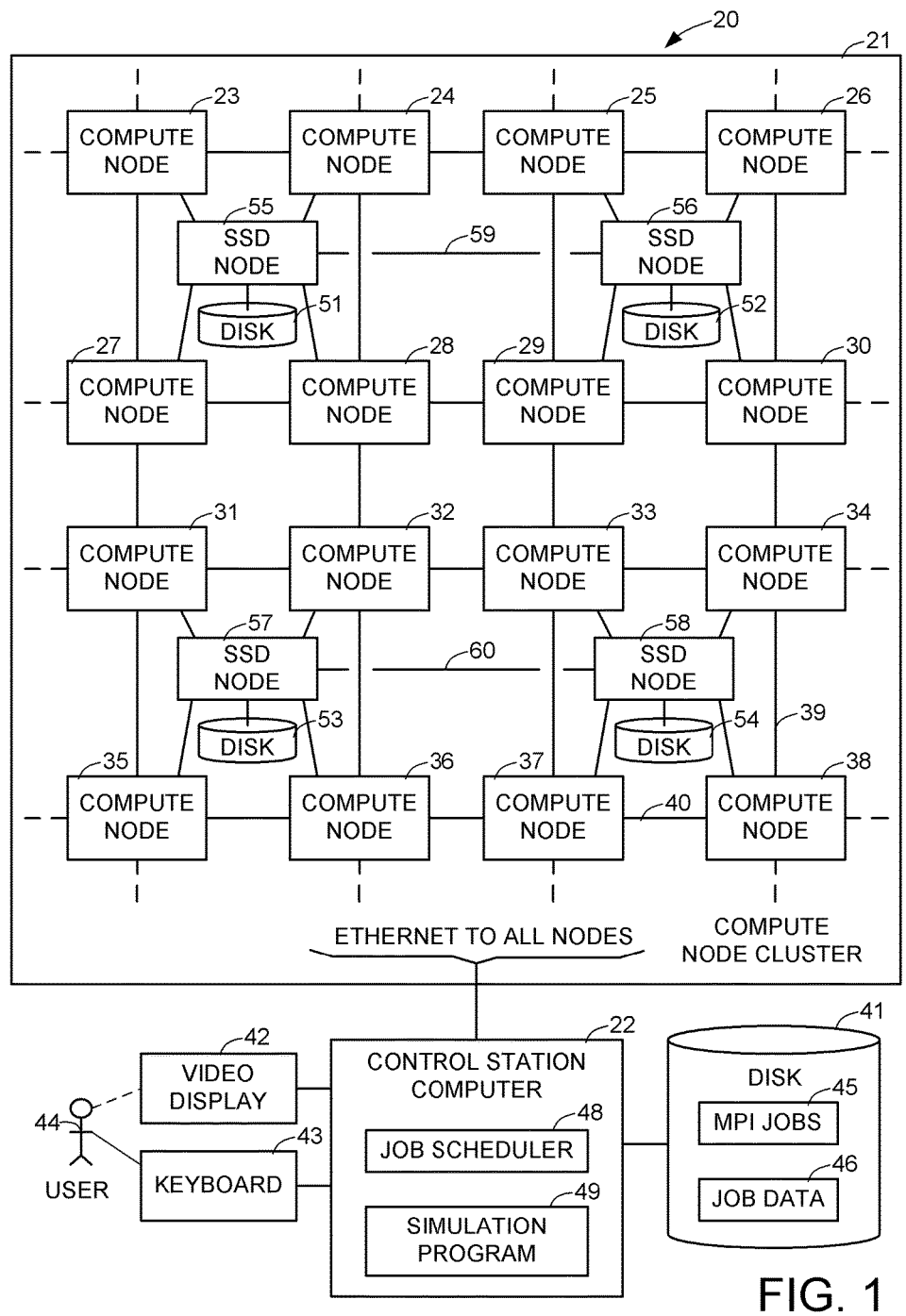
FIG. 1 is block diagram of a supercomputer including Solid-State Drive (SSD) nodes in accordance with the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENTS

1. Overview of the Supercomputer Architecture

With reference to FIG. 1, there is shown a supercomputer 20 including a compute node cluster 21 and a control station computer 22 linked to the nodes in the compute node cluster via an Ethernet. The compute node cluster 21 includes compute nodes 23, 24, 25, 26, 27, 28, 29, 30, 31, 32, 33, 34, 35, 36, 37, and 38 linked together by a mesh of high-speed data links, such as links 39 and 40. Although a two-dimensional mesh is show for the sake of illustration, the mesh of interconnections may have various other forms, such a three-dimensional mesh, a tree, or a fractal organization such as a mesh of clusters. The mesh, for example, is comprised of InfiBand (IB) links.

The control station computer 22 has local disk storage 41 and a video display 42 and a keyboard 43 providing a graphical user interface to a user 44. The local disk storage 41 stores MPI jobs 45 and job data 46. The control station computer 22 is programmed with a job scheduler 48 for scheduling the transmission of the MPI jobs 45 and their associated job data 46 over the Ethernet and the execution of a job once the job and its associated job data have been loaded into the compute nodes. The control station computer 22 is further programmed with a simulation program 49, which is further described below with reference to FIGS. 16 and 17.

The compute node cluster 21 has associated magnetic disk storage 51, 52, 53, 54 for storing checkpoint data from the compute nodes at periodic intervals. If a hardware or software exception causes an interrupt of a compute node during execution of an MPI job, then all of the compute nodes presently executing this MPI job are interrupted in order to perform checkpoint recovery. In a typical case of checkpoint recovery, the checkpoint data from the last checkpoint of the MPI job is recalled from the magnetic disk storage 51, 52, 53, 54 and re-loaded into the interrupted compute nodes, and then the MPI job is restarted from this last checkpoint.

In order to reduce the processing time of the compute nodes that is spent in writing the checkpoint data to the magnetic disk storage, Solid-State Drive (SSD) burst buffer nodes 55, 56, 57, 58 are interposed between the compute nodes and the magnetic disk storage. Each SSD node is configured from a rack server blade including solid-state storage such as flash memory in solid-state drives. Each SSD node provides a burst buffer for a respective group of the compute nodes. Although FIG. 1 shows a respective SSD node for a respective group of four compute nodes for the sake of illustration, it should be understood that one SSD node could be provided for a group of about eight to sixteen compute nodes. For example, the magnetic disk storage 51, 52, 53, 54 for a compute node cluster is provided by a rack server configured as a RAID-6 storage array having eight magnetic disks. In this case, one or two SSD nodes would be interposed in the high-speed data path between each such RAID-6 storage array and the compute nodes serviced by this RAID-6 storage array. For example, each SSD node services a group of eight compute nodes, and one RAID-6 storage array services two SSD nodes. Instead of a RAID-6 storage array, the magnetic disk storage could be configured in other ways, such as a RAID-5 or a RAID-10 storage array, or as a Hadoop Distributed File System (HDFS), or Ceph with replication.

In FIG. 1, for high data availability, the SSD node 55 is linked to the SSD node 56 by a high-speed data link 59 for transmitting remote copy data so that the checkpoint data in the disk storage 51 is maintained as a mirror or duplicate of the checkpoint data in the disk storage 52. In this case, if there is a failure of any one of the two SSD nodes 55, 56, it is possible to recover by replacement of the failed SSD node and by transfer of the remote copy data of the failed SSD node over the link 59 back to the replacement SSD node. In a similar fashion, a data link 60 interconnects the SSD node 57 and the SSD node 58 for transmitting remote copy data so that the checkpoint data in the disk storage 53 is maintained as a mirror or duplicate of the checkpoint data in the disk storage 54.

Figure 2:
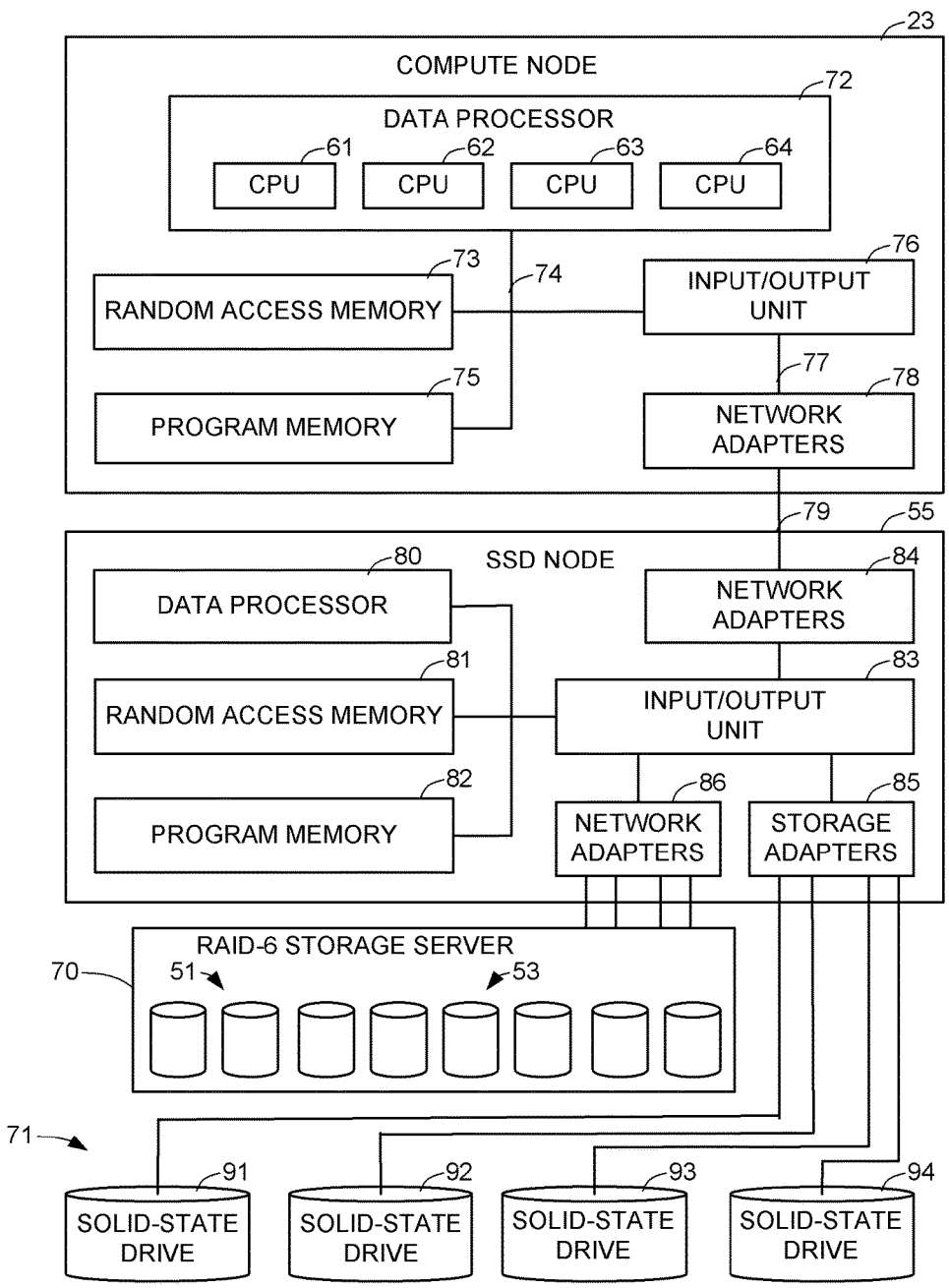
FIG. 2 is block diagram showing details of hardware components of a SSD node and an associated compute node and an associated magnetic disk storage server in the supercomputer of FIG. 1.

FIG. 2 shows details of hardware in the compute node 23 and in the SSD node 55. The compute node 23 includes a data processor 72, random access memory 73 connected to the data processor 72 via a data bus 74, and a program memory 75 and an input/output unit 76 also connected to the data bus 74. The data processor 72 includes multiple core central processor units (CPU) 61, 62, 63, 64. The program memory 75 is non-transitory computer readable storage medium such as flash memory. In general, non-transitory computer readable storage medium is a physical device or physical material which serves to store computer-readable data on a permanent or semi-permanent basis. Examples of other kinds of non-transitory computer readable storage media include magnetic disks, magnetic tape, and optical disks. Network adapters 78 are linked to the input/output unit 76 via an input/output bus 77.

The SSD node 55 includes a data processor 80, random access memory 81, program memory 82, an input/output unit 83, network adapters 84, storage adapters 85, and network adapters 86. The program memory 82 is a non-transitory computer readable storage medium such as flash memory. The network adapters 84 link the input/output unit 83 to respective group of compute nodes (including the compute node 23) via a high-speed data link 79. The network adapters 86 link the input/output unit 83 to a RAID-6 storage server including the magnetic disk storage 51 and the magnetic disk storage 53. The storage adapters 85 link the input/output unit to solid-state flash memory drives 91, 92, 93, and 94. For additional data availability, five solid-state drives could be used in a RAID-5 configuration, instead of just the four drives shown.

Figure 3:
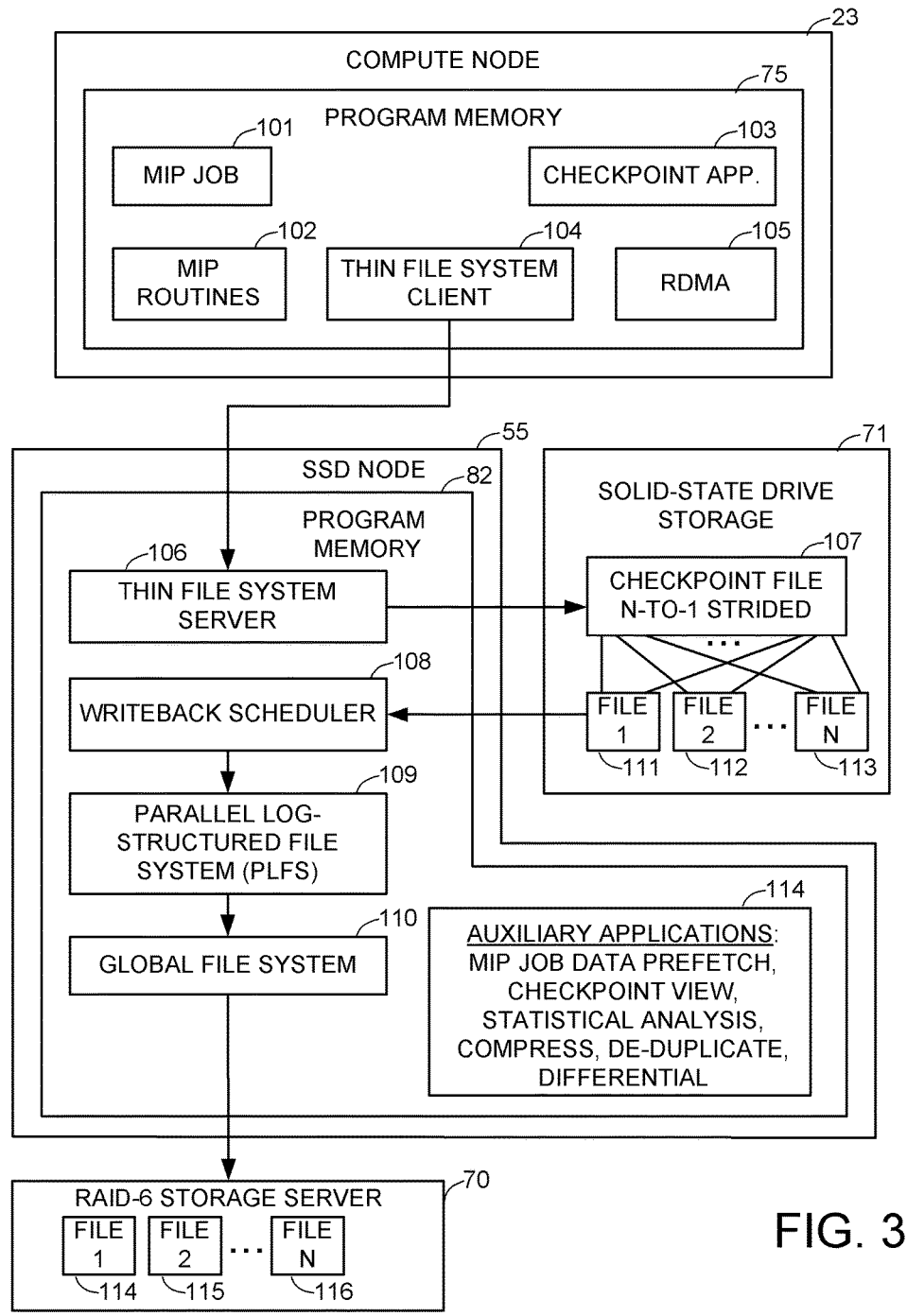
FIG. 3 is a block diagram showing details of software and data flow in the SSD node and the associated compute node in FIG. 2.

FIG. 3 shows software components in the compute node 23 and in the SSD node 55. The program memory 75 in the compute node 23 stores an MIP job 101, MIP routines 102 invoked by execution of primitives in the MIP job 101, a checkpoint application 103 scheduled for invocation at periodic checkpoint times, a thin file system client 104, and a remote direct memory access (RDMA) routine 105.

The program memory 82 in the SSD node 55 includes a thin file system server 106, a writeback scheduler 108, a Parallel Log-Structured File System (PLFS) 109, a global file system 110, and auxiliary applications 114. The PLFS 109 is a virtual parallel log structured file system that remaps an application's preferred data layout into one which is optimized for the underlying file system 110. PLFS is described in John Bent et al., "PLFS: A Checkpoint Filesystem for Parallel Applications," LANL Technical Information Release 09-02117, SC09 Nov. 14-20, 2009, Portland, Oreg., Association for Computing Machinery, New York, N.Y., incorporated herein by reference. PLFS consists of about fifteen thousand lines of code and is publically available from the Internet at github.com/plfs/.

The global file system 110 is a shared disk file system for computer clusters, allowing the compute nodes to have direct concurrent access to the same shared block storage in the magnetic disk storage of the storage server 70. The global file system 110 may use GFS or GFS2 from Red Hat Corporation, Raleigh, N.C., or the Lustre file system from Intel Corporation of Santa Clara, Calif., or PanFS from Panasas of Sunnyvale, Calif., or the General Parallel File System (GPFS) from IBM Corporation of Armonk, N.Y.

The thin file system server 106 responds to the thin file system client 104 to permit multiple MPI processes of the MPI job 101 to write checkpoint data to a shared file 107 in the solid-state drive storage 71 in a strided fashion in a first data layout. Then the writeback scheduler 108 invokes the Parallel Log-structured File System 109 to asynchronously migrate the checkpoint data from the shared file 107 in the solid-state drive storage 71 to the magnetic disk storage of the RAID-6 storage server 70 so that the checkpoint data is written to the magnetic disk storage in a sequential fashion in a second data layout including separate files 111, 112, 113 for the respective MPI processes. The thin file system server layer 106 presents a file system interface to the MPI job and defines the first data layout. The PLFS file system layer converts between the first data layout and the second data layout by enabling checkpoint data to be read as separate files 111, 112, and 113 from the data of the checkpoint file 107 in the solid-state drive storage 71. The global file system layer 110 defines the second data layout of the files 114, 115 and 116 in magnetic disk storage of the RAID-6 storage server.

The thin file system client 104 and the thin file system server 106 respond to MPI invocations from the MPI job 101 to the MPI routines 102 to locate and specify data placement in the first data layout in the solid-state drive storage 71. In particular, the MPI invocations include an invocation collective to all the compute nodes and the solid-state storage nodes to take file view information and read and distribute associated file data to the other nodes, so that there is a local copy in the solid-state storage of each solid-state storage node of what each MPI process will need on a subsequent MPI operation.

The auxiliary applications 114 perform additional tasks offloaded from the compute nodes or associated with the checkpoint data. These auxiliary applications include applications for MIP job data prefetch, checkpoint view, statistical analysis of checkpoint data, data reduction operations upon the checkpoint data to reduce the magnetic disk storage capacity needed to store the checkpoint data, and encrypting the checkpoint data so that the encrypted checkpoint data is stored in the magnetic disk storage.

The MPI job data prefetch application receives pre-loaded data transmitted from the control station computer to the solid-state storage node 55 over the Ethernet network coupling the control station computer to each of the solid-state storage nodes. The prefetch data is preloaded into the solid-state storage node without any impact on MPI traffic on the mesh of high-speed data links interconnecting the compute nodes. All of the pre-loaded data is transmitted from the control station computer to the solid-state storage nodes over the Ethernet network for the MPI job before completion of execution of a previous MPI job.

The checkpoint view application processes the checkpoint data to produce a visualization of the checkpoint data presented on the video display (42 in FIG. 1) in real time to the user (44 in FIG. 1). In this case, data for the presentation is transmitted by each SSD node to the control station computer, and the control station computer assembles the data from the SSD nodes for presentation on the video display.

The statistical analysis application computes statistics from the checkpoints in real time for presentation on the video display (42 in FIG. 1) in real time to the user (44 in FIG. 1). In this case, data for the presentation is transmitted by each SSD node to the control station computer, and the control station computer assembles the data from the SSD nodes for presentation on the video display. The statistical analysis provides early detection of simulation errors and/or erroneous unexpected behavior of the system with no disturbance to the running job, compute jitter, or MPI traffic. The statistical analysis can be used to terminate a simulation upon detection of a simulation error indicating that the results are erroneous. For example, a simulation is terminated early if the computations diverge from predetermined limits.

The auxiliary applications that perform data reduction operations upon the checkpoint data include data compression, data de-duplication, and computation of differentials between successive checkpoints for storage of differentials in lieu of the full checkpoints. For example, a first checkpoint is a full checkpoint, followed by a series of nine differential checkpoints, followed by another full checkpoint, followed by another series of nine differential checkpoints, etc.

2. Using the Supercomputer Architecture for Exascale I/O

Supercomputers, like those built by the Department of Energy, have closely adhered to Moore's Law in terms of computational power as measured in floating point operations per second (FLOPS). There has been a tremendous amount of innovation driving these improvements in FLOPS such as the heterogeneous processing elements on the Roadrunner supercomputer at the Los Alamos National Laboratory (LANL). However, the basic storage architecture has remained mostly unchanged from the teraflop to the current Petaflop era.

That this storage architecture will not remain viable into the Exascale era has become increasingly obvious. Two interrelated trends drive the need for new storage architecture. The first is that the capacity of disk drives is increasing much more quickly than is the bandwidth. The second is that the increase in FLOPS is increasingly achieved by adding more processor cores instead of by making the individual cores faster. The repercussion of these trends is twofold. One, the cost to purchase the number of disks necessary to provide sufficient bandwidth is prohibitively expensive. Two, the access pattern on the disks will become mostly random thus requiring even more disks as the bandwidth per disk for a random pattern is much lower than for a sequential pattern.

To address these challenges, we provide a new hardware architecture that uses a relatively small collection of solid-state storage devices to drastically reduce the total number of disks needed. Into this hardware architecture, we integrate a new software architecture that transforms random access patterns into sequential ones. The resulting architecture is the only way we have identified to achieve required storage performance in the Exascale era at a reasonable fraction of the total cost of the supercomputer.

Recently supercomputers have broken the Petaflops barrier and in 2011 the 10 Petaflops barrier is being broken, using evolutionary scalable checkpointing and I/O techniques from the teraflops era. The solutions for scalable checkpointing and I/O produced in the 2000-2010 timeframe were targeted at the 100 teraflops and up to the small numbers of 10 s of Petaflops. So, just an evolution of existing checkpointing and I/O solutions was possible. Yet, at just 1-2 Petaflops, these solutions are being stretched beyond their comfort zone requiring more rapid evolution than thought necessary since 2009.

Current global parallel file systems are delivering I/O speeds that perform sequential disk access and achieve speeds of around 50 MB/sec/disk and using striping achieve I/O throughputs of 10 s to 100 s of GB/sec. Currently, the I/O speeds are sufficient for writing the memory of the supercomputers, to disk subsystems, in a reasonable amount of time, 15-20 minutes, as the supercomputers' memory is of the order of one gigabyte (GB) per core, or 100 s of terabytes (TB) per supercomputer cluster. The 15-20 minutes to dump memory to disk is a requirement driven by the mean time to interrupt (MTTI) of supercomputers being of the order of 1 day. Another requirement for the supercomputer storage system is capacity. Capacity requirements are typically 20-30 times the size of the memory of the supercomputer. In the past, meeting the capacity requirement, utilizing disks in the 500 GB size range, necessitated about 6000 disks. But 6000 disks in that time frame provided 300 GB/sec, far more bandwidth than was needed. This meant that in the past we were buying disks for capacity and getting bandwidth for free.

Currently, with disks at the 2 TB range, and not significantly faster than the 500 GB disks, to meet the capacity requirement, we only need 1-2000 disks, but to meet the bandwidth requirement we need 2000 disks. This means that with the disks that we are currently buying, the bandwidth and capacity are pretty well balanced. This change is obviously due to the fact that while disks get denser, they get faster at a much slower pace (typically about the square root of the capacity improvement). This change from capacity to throughput balanced disk purchases happened in 2011-12 timeframe (with the introduction of 2-3 TB disks). The trend of capacity outpacing bandwidth for disks will continue for the foreseeable future. In fact the trend may get more acute with shingled disk technology, meaning that in the future, we will not be buying disks for capacity, or balanced capacity/bandwidth, and instead we will be buying disk systems for bandwidth. This is a very unfortunate outcome, because disks are priced for capacity, not for bandwidth, meaning that the costs associated with storage for supercomputers will become a larger percentage of the total cost of the supercomputing environment than in the past. Further, with the advent of solid-state storage, disks will become even more focused on capacity, and pricing will become even more aligned with capacity and less aligned with bandwidth.

The discussion above was based on the assumption that all the disks grow their bandwidth at a small fraction of their capacity growth. A further assumption is that the data is written sequentially onto disk, which would be required to achieve the full bandwidth of the disks. In the past, when we were getting our improvements in performance of supercomputers mostly from frequency increases of individual processors, the number of "cores" that made up a supercomputer stayed relatively constant and the memory per processor stayed roughly constant at 1-4 GB/core. This fact combined with the large number of disks we had to purchase for capacity meant that in the past, the number of processes writing to each individual disk (or disk subsystem) was small. That meant that the workload seen by individual disks was roughly sequential.

As we all know, the trend in computing now is not faster processors but more cores on a processor. This has caused the access patterns that the I/O subsystems of supercomputers use, to change radically. The trend is for more cores, each with less memory, leading to many times more processes writing to each individual disk/disk subsystem. Combine this fact with the fact that until recently the number of disks required for the capacity (with adequate bandwidth) has gone down, and the result is a recipe for disaster, in that each disk/disk subsystem has orders of magnitude more processes writing to it. This means that the workload no longer resembles a sequential workload, and it begins to look much more like a random workload, requiring the middleware software to aggregate and reshape it to ensure a sequential workload to the disks. This situation is much worse when all the cores write their memory to a single file to the global file system in an N-processes-to-1-file stride pattern (N-to-1). In this case the write I/Os are strided through the file, not sequential at all, and the stripe of the file system makes the I/O almost random on disk such that the disk throughput decreases radically. As a result the write I/O performance in the N-to-1 case is much lower and inconsistent on disk. Some disks will see sequential I/Os and some will see very random I/Os. This trend will change all the time during the write of the checkpoints resulting in longer time to write the checkpoint or requiring many more disks.

Thus, the basic trends, of higher core counts with smaller memories per core, leading to this "non-sequential workload" issue caused by N-to-1 strided patterns (which are desired by supercomputing applications for a variety of data management reasons) created a new problem to the I/O system. This problem was caused also by the need of spreading the workload across more and more disks to achieve the required throughput. The coupling of the trends in (a) disk capacity versus bandwidth growth with (b) the non-serialization issue caused by the N-to-1, with (c) high core count and lower memory per core, has resulted in the need to grow the number of disks used by supercomputers non-linearly in order to provide adequate I/O throughput making the required disk system not affordable anymore. To make things worse, as we head towards Exascale, the mean time to interrupt for machines of this size will likely go down from the order of a day to the order of an hour or two. This means that the burst bandwidth demand gets an order of magnitude worse per GB of core's memory.

So far we only discussed the write I/O issues but the read issues are formidable as well, especially in the cases where the data is accessed in an N-to-1 pattern, as the memory of each core is distributed between multiple disks. As a result, even if a core reads the data sequentially, due to multiple cores accessing the data in parallel, the disks will see very small and random read I/Os resulting in read performance that is a tiny fraction of the aggregate disk bandwidth when accessed in a more sequential way. As discussed before, the trend towards more cores with less memory will cause data to be distributed in an even more strided pattern over the disks, so this poor read performance issue will get worse into the future.

Thus, in order to keep the balance between bandwidth and capacity, we need to improve the disk throughput for both read and write assuming that the individual disk speeds will grow at a much slower pace than disk capacity. The only way to improve disk I/O performance that we know of is to improve the sequentiality of the I/O access pattern to disks regardless of the access model—N-to-N or N-to-1. How can we achieve this? By using a better way to layout the data on disk, independent of the way the data is accessed by the compute cores. A relatively transparent way to provide this alternate layout is to introduce an additional file system layer between the compute cores and the global file system, in order to provide a new level of indirection. This new layer understands the file system layout of data on disk and remaps the data written to, or read from the global file system such that the data lands very sequentially on individual disks. This improved layout allows achievement of higher disk I/O throughput from each single disk. Eventually modern disks will achieve speeds of up to 250 MB/sec when accessed in a sequential stream of large I/Os. In addition, disks are protected against failures using Redundant Array of Inexpensive Disk (RAID) methods. The current popular protection level is RAID-6 and in some cases erasure encoding. All of these protection methods also have an impact on the sequentiality of the data access and should be compensated by the new virtualization layer. PLFS is exactly such a solution.

PLFS is a virtual file system that is introduced in the compute nodes (CN) between the application running on the CNs and the global file system they write to. PLFS was introduced and developed at LANL and Carnegie Mellon University (CMU) by a small group of scientists that were focused on improving the layout of data on disk to enable achieving write speeds of 100-200 MB/sec on individual disks for both N-to-N and N-to-1 patterns. Moreover, by changing the mapping between the application I/O and disk I/O, PLFS creates an orchestration of all the disks such that each disk achieves the highest speeds during the checkpoint write. PLFS does this by understanding the structure of the cluster file system and the way it stripes the data across multiple disks, and it was targeted in the first implementation phase to improve checkpoint write performance. Preliminary experimental results show that the write of the checkpoint using PLFS achieves speeds of 150 MB/sec average on all the disks used by the file system. This alone will allow using only a fraction of the number of disks required by the supercomputer, three times less, down from 6000 to approximately 2000, in our example, for write.

Of course the RAID processing can reduce this speed if it is not compensated by the PLFS virtualization of the disk blocks. One way to compensate for the effect of the RAID processing is to use an intelligent RAID controller that will reduce the impact of the RAID processing. One way to achieve this is by using larger stripes for the RAID or even an adaptive algorithm as an extension of PLFS. This will require new RAID controller algorithms because the PLFS layer in the CNs is too remote from the disk subsystem and separated by the global file system that hides the RAID calculations from the PLFS layer. Nevertheless, because PLFS turns everything into N-to-N, you get data caching all through the I/O stack, so classical techniques of data retention, waiting for a full stripe write, work well because of the huge amounts of data caching possible at very large scale. So, there may not be any need for special optimizations of the RAID, as largely the solutions are, simple cache and deep queues, which PLFS enables as a secondary effect of the sequentiality of the I/Os. Additionally, PLFS could easily limit the number of streams and that is really the main knob required to improve RAID performance.

While PLFS can remap the CN write I/Os to the disk in a sequential manner using parallel log structure, the situation is much more complex in the case of the read. As with all log structured file systems, since the data is not laid out sequentially by byte offset in the file (it is written in a log structure), reading sequentially can be a challenge. There is a huge difference between log structured file systems and parallel structured file systems; the difference being in the implications of the parallel nature of the implementation. Log structured file systems require an index to map between logical and physical file offset. If this index size is small and requires low overhead to manage, it is possible to reorder the reads from a log structured file system and allow one to optimize the reads according to the physical layout rather than the logical layout which is the way the user requests the data. In a parallel file system that optimization of reordering the writes can become extremely effective because the data is written over many devices. The optimization, for reading sequentially (logically) from a parallel log structured file system, can take advantage of, not only the index that allows the reorder the read action, but also of the multiple devices the read can be multi-threaded, to optimally retrieve from many devices in parallel, thereby decreasing or even diminishing the drawback of log structure for reading.

Further, if the reads are done in general in an increasing byte offset manner, each thread participating in the read can be warming the server side cache (read ahead) for other readers. In fact, in tests done so far, many read patterns reading from a parallel log structured file system, if done in an optimized/threaded way, outperform reading an equivalent sequential file. This is a counter-intuitive result if you are thinking about the wisdom of log structured file systems. Work has been done at LANL and CMU to quantify these phenomena. See Manzanares et al., "Reading from a Write Optimized File System Under Highly Concurrent Shared File Workloads," FAST 2011, WiP, 9$^{th}$ USENIX Conference on File and Storage Technologies, Feb. 17, 2011, San Jose, Calif.

As we mentioned above, this optimized reading files from a parallel log structured file system is dependent on having a manageable sized index, so that optimizations can be done more efficiently. If the index becomes too large and hard to manage/distribute, then the optimizations become less effective. LANL is working on two approaches to attack this issue. The first approach is to utilize collective I/O operations in MPI-IO to get semantic information from the application (still transparently to the application) to help produce an as compact index as possible, and for the cases where a compact index cannot be provided, a scalable distributed indexing capability is being developed.

Additional to this work, we are also looking to extend the value of the PLFS virtual file system (FS) and expand this value for capacity jobs that use small files by merging multiple small files in a large sequential I/O to disk similar to checkpoint files. We are thinking to combine PLFS with a retention technique on all the CNs and write all the files in concert such that the data will be written to disk sequentially interleaving the small files and writing them as a single file. This will be very useful for small supercomputer (SC) jobs used in the commercial high-performance computing (HPC) such as the ones in the financial HPC which analyze and write small files and merge them in a big history file that is written very fast to disk.

Another function, that PLFS is pursuing, is hashing of file metadata across multiple file system metadata servers/name spaces/mount points. This function allows for the large amounts of file metadata produced by N-processes to N-files (N-to-N pattern), as well as the management of the large number of log structured files and indexes produced by PLFS for N-to-1 files, to be mitigated by using more metadata servers to parallelize the workload. This feature has shown to improve metadata operations for N-to-N and N-to-1 in a nearly linearly scalable way.

PLFS has taken three approaches to user/application interfaces. The first is the PLFS native interface which can be used by changing open/read/write/close/etc. calls in an application to plfs_open, plfs_read, etc. calls. It is unlikely that this interface will be used much due to portability concerns for applications. The other two interfaces encourage and support portability. There is a Filesystem in Userspace (FUSE) interface which allows for unchanged applications to utilize PLFS, and there is an MPI-IO interface which allows MPI-IO applications to use PLFS unchanged. The MPI-IO interface allows for a much richer set of optimizations too. In theory, I/O libraries like HDF5 and NetCDF can utilize PLFS because they use MPI-IO for their I/O operations. It is possible that further optimization could be done for these heavily used I/O libraries by working with the developers of these libraries to make sure they leverage PLFS function well. This is something the PLFS effort wants to do at some point soon.

Another function that is planned for PLFS is the ability to target the physical logs/indexes (parts of the parallel file) at different storage devices, either local (near the CN), local neighbor (near a neighbor CN), or global (on a global parallel file system). This function is referred to as the PLFS/SCR integration. SCR is the Scalable Checkpoint Restart facility written by Lawrence Livermore National Laboratory (LLNL) which enabled checkpointing for N-to-N patterns only to be saved to a local storage device. LLNL and LANL are collaborating on adding the SCR function to PLFS and supporting all I/O patterns and generalizing the function for use by any application. To utilize this function, application changes may be necessary to manage where the application wants to keep its data (local, global, or both). This capability begins to address the concept of a burst buffer (BB), a solid-state storage device located near the CNs in a supercomputer's I/O stack. The burst buffer enables high bandwidth while using disk for capacity, thereby drastically decreasing the number of disks needed to provide I/O for future supercomputers, making I/O more affordable in the future. This function is potentially a game changer and introduces the ability to get modest sized nonvolatile storage close to the CNs where the bandwidths are very high (using the interconnect fabric). This capability also allows the possibility of adding intelligence to the storage devices in a way that is useful to the supercomputing application for offloading I/Os/migration to-from global file system operations and offloading data analytics from the CNs to the active burst buffer.

Recently supercomputers broke the petaflops barrier as an extension from the teraflops. But this was an easy differential step as the I/O system needed for checkpoints and I/O operations were relatively modest compared to the previous teraflops systems. If we look at the last fifteen years history of the supercomputers that achieved top flops performance we observe that the requirements for I/O were relatively modest and could be achieved by current storage architectures and disk speeds. We observed from that analysis that the global file systems were delivering I/O speeds that were using sequential disk access and achieved speeds of around 50 MB/sec/disk and using striping achieved I/O throughputs of 10 s of GB/sec. So far the I/O speeds were enough for writing the memory of the supercomputers, to the disk arrays, in a decent amount of time 15-20 minutes as the supercomputers' memory was in the order of 1 GB/core or 100 s of TB per supercomputer cluster. A simple math shows that a global file system like Lustre was more than capable of writing the entire memory of the compute cluster in 15 minutes at speeds of 100 GB/sec using 2000 disks for throughput. As the size of the disks, during this time, was less than 500 GB more disks were needed for storing checkpoints' data of 100 s of TB than to get the 100 GB/sec. In fact the disk subsystem sequential I/O throughput was able to achieve higher speeds than needed by the supercomputers. 2000 disks of 500 GB were only able to store one petabyte (PB) or at most ten times the memory of the SC. Considering capability runs on the SC that were running long term simulations of months and storing at least one checkpoint per day will only be able to store ten days' worth of checkpoints. Considering this example a job running for one month will need three times more disks for capacity, or 6000 disks, than the 2000 disks needed to achieve the throughput.

More recently with the increase in disk capacities to 2-3 TB the same amount of checkpoints can be stored on 1000 disks in the example above. What this means is that if we maintain the same disk speed of 50 MB/sec then we will need 2000 disks which provide more capacity than is needed. This means that at the crosspoint of capacity and throughput we buy disks for throughput and get the capacity for free. This data point happened in 2011 with the introduction of three TB disks. But this entire example was based on the assumption that all the disks will deliver 50 MB/sec continuously. This assumption can be valid only when the data is written sequentially on disk. Even if each compute node (CN) writes its data sequential in an N-to-N pattern if multiple CNs write to the same disk then the sequential nature of the I/O is destroyed if multiple CNs write to same disk as the disk head moves between different regions on the disk. The situation is much worse when all the CNs write their memory to a single file to the global FS in an N-to-1 pattern. In this case even the write I/O are not sequential and the stripe of the FS makes the I/O almost random on disk and as a result the disk throughput decreases to less than 10 MB/sec. As a result the write I/O performance in the N-to-1 case is much lower and inconsistent on disk. Some disks will see sequential I/Os and some will see very random I/Os. This trend will change all the time during the write of the checkpoints resulting in longer time to write the checkpoint or require much more disks. According to our example we will need 3× more disks to achieve the same performance as before meaning that the balance between disk capacity and throughput is worse toward the throughput so we need much more disks to achieve the required throughput than we need for capacity.

So far we only discussed the write I/O issues but the read is much worse in the case when the data is accessed in an N-to-1 mode as the memory of each CN is randomly distributed between multiple disks. As a result even if the CN reads the data sequentially, due to multiple CNs accessing the data in parallel, the disks will see very small and random read I/Os to the point that the read I/O performance is five to ten times lower than the write. And this is the current situation with the petascale supercomputers (SCs) and it will get worse on the way to Exascale SCs. So in order to keep the balance between throughput and capacity we need to improve the disk throughput for both read and write assuming that the disk physical speeds will remain more or less constant. The only way to improve disk I/O performance that we know of is to improve the sequentiallity of the I/O access to disks regardless of the access model N-to-N or N-to-1.

So far we assumed that there is a separation between the checkpoints and the read I/O as the SC is stopped during the take of the checkpoint and there is no read I/O during this time yet during the runtime of the SC there are concurrent read and write operations to disk and we need to find a way to separate the read and the write by the application to allow PLFS to improve disk throughput. So far the experimental results with PLFS are very promising and the current project will try to improve the performance as well as to address the N-to-N and N-to-1 cases.

Although PLFS is a very important tool to improve disk throughput we may need also to change the application to collaborate with PLFS as well as introducing additional software layers and APIs that will allow the retention of small files before writing to disk or using such libraries as HDF5 and IOLFS between other software tools and adding the Burst Buffer cache appliance that we call SSD Node or SSDN. The SSDN will be introduced between the CN and the global file system (FS) and will allow fast destage of the memory of the CN to the SSDN and slower draining of the data from the burst buffer (BB) to the global FS while the CNs will resume the compute immediately after the checkpoint ends.

3. Flash Memory and SSD Used as Burst Buffer

In recent years flash memory and SSD became viable storage solutions replacing disk drives. The major advantages of SSD and Flash are very low latencies, high input/output operations per second (IOPS) and I/O throughput as well as very low power consumption compared to both disk and cache memory. The price remains still a concern and the use of SSD is mostly restricted to cases where disk technology cannot deliver the I/O performance for applications sensitive to latency. Considering the above characteristics flash disks can be used either as an extension of cache memory in the CNs or as fast disk replacement in an SSD appliance connected to the CNs. The purpose of the SSD is to allow fast checkpointing of large amounts of memory of the CNs on a cheaper larger memory. So, SSD and Flash are very good media to be used for checkpointing the memory of the CNs on a persistent storage media. If we use flash memory in the CN then we can only store the checkpoint data locally on that node and it cannot be accessed by any other node for recovery without communications or by copying the data from the flash to the global file system in the background while the CN is in computing phase. Any I/O to/from the CNs, during a compute phase, will use memory bus bandwidth and processor cycles in a random way. As a result the efficiency of the CNs will be reduced in random ways, an effect we call jitter. Also this will reduce the number of flops that are executed during the "compute"

time between checkpoints and increase the runtime of a given job, practically wasting CPU resources of the supercomputer.

Using an external special SSD node (SSDN) appliance is a possible solution to the jitter problem described above. The main difference from the case when we use Flash inside the CN is the fact that the CN will write the state of the memory very fast to the SSDN appliance and, after the write of the data ends, will resume the compute without any I/O activity during the compute cycle—thus increasing the efficiency of the cores. During the compute phase the data will be slowly drained from the SSDN, aka burst buffer (BB), to the global file system, using PLFS to ensure enough speed to allow moving the entire content of the SSDN to the global file system before the next checkpoint scheduled. In the future architectures of supercomputers, the SSDN will be a new layer in the I/O stack, inserted as a level of indirection between the CN and the global file system that will act as a cache writeback for the CNs. The connectivity of the SSDNs is still being considered. It could range from simple connection using an I/O channel like SAS from several compute nodes (say 1-2 SSDNs per rack of CNs), to direct connection to the supercomputer's interconnection network fabric. Depending on the connection method, SSDNs might need to be connected to one another through the use of a Storage Area Network (SAN) or other mechanism.

4. Flash in CN Versus SSDN Appliance

A simpler alternative to using a new hardware layer in the global I/O stack is to include a Flash card on the Peripheral Component Interconnect express (PCIe) bus in the CNs. While this can be a relatively cheap solution it has several drawbacks that will allow only a partial solution to the checkpoint problem. The flash card has the advantage of a large capacity of up to TBs at a much lower price than a similar Double Data Rate (DDR) memory card. Flash has lower power consumption than the DDR memory at the speeds ten times higher than disk yet five to ten times lower than DDR memory. In addition, flash memory has a higher latency than DDR memory and needs special software mechanisms to allow the application to use the flash similar to cache memory. Another disadvantage of flash memory is the unbalance between the latency of write and read with the extreme situation when the write needs to wait for the erase of the NAND cell. Moreover flash has some endurance issues that limit the lifetime of the memory to millions of operations per cell, compared to DDR memory that has a theoretically unlimited span life. Although DDR memory can also incur memory access errors this is rather the exception than the rule. Now regarding the power consumption of flash, it is lower than the DDR memory if we assume that the I/O speeds of flash are an order of magnitude lower than DDR memory, then the power efficiency is reduced compared to the theoretical values (there are papers related to this issue).

Moreover DDR memory allows direct memory access (DMA) from I/O devices and by this allows one less data memcopy than flash to access I/Os as well as more memory bus throughput. While the DMA and remote DMA (RDMA) for that purpose are performed in the background while the CPU is running uninterrupted (well almost, DMA can also generate I/O waits) moving the data from the memory to the flash requires an additional I/O operation and memory bus access for copying the I/O from cache to flash. This means that in order to maintain the same compute efficiency of the CN the application and the DMA/RDMA need to be modified to remove the memcopy. So if we expect flash to replace cache memory for the application and add a larger memory capacity for each core we need to ensure a lower impact on the compute. This will require a large change in the hardware and software of the application and CNs which is not considered at this time yet.

So, as far as the current software and hardware stacks are implemented today flash memory can be mostly used as an extension of DDR memory rather than a replacement and could be good for SWAP memory at speeds faster than IDE disks. There still remains the problem that RDMA cannot be used directly from flash. As we discussed before the way to achieve Exascale compute is to increase the size of the memory per core yet flash will not be able to achieve this goal for the Exascale. One can also argue that the memcopy will impact the compute so even if there will be more "memory" per core there will be no increase in compute efficiency by using more flash memory. Moreover the use of flash memory will continue to incur a cost of using the memory bus for memcopy that will result in compute jitter or at least will increase the I/O wait during the compute phase. For this reason, alternative technologies like Phase Change Memory and MemRistor are being considered for DRAM extensions to get more memory capacity in an affordable package, both from a purchase point of view but also from a power consumption point of view.

Let's also look at another dimension of use of flash: the persistency of the data in flash. Although it looks like a very attractive feature, that will increase the resilience and MTTI and improve failure recovery, it is not clear that, in order to prevent data corruption during a CN crash, we will be able to use just the data stored in flash for recovery. It will require some compute cycles that will allow full recovery by checking the consistency of the data written on flash. It is questionable if adding a battery to protect the memory cache is not more efficient than using a flash memory.

Now, if we go back to our checkpoint problem for Exascale, we need to understand that just storing the checkpoint data on the flash in the CN alone will not improve the reliability of the supercomputer unless we make a copy of the data from the flash in the CN to an external storage system. This will allow recovery of the checkpoint when multiple CNs fail, in which case even if the CNs themselves recover after the failure, the MPI job will need to be restarted from an old checkpoint that is not in the flash of the CNs after recovery. To avoid using the global file system as the reliability mechanism for the SSDNs, we need a way to make a copy of the content of the flash to another CN, the way the Scalable Checkpoint Restart (SCR) project intends, or to a global FS, as currently done at Petascale. Either way, the memory bus will be used to move the checkpoint data out of the CNs somewhere else.

This will create additional compute jitter and thus adversely affect the compute, unless we pause the compute for as long as we need to make the copy. Either way, the compute efficiency will be reduced. Even when using SCR, the same problem remains as with de-staging to the global FS except that the speed of the copy is accelerated by using flash instead of disk. However, during the copy the computing is stopped on both source as well as destination CN. One way to prevent this compute jitter is to move the data only once from memory to an external flash or SSD appliance, or to the SSDN, as mentioned above. Of course, movement of data from DDR memory in the CN to an external node can be done using RDMA to memory that sits in front of the SSDN flash, in order for flash I/O load balancing and buffering to help with flash endurance. Additionally, it is possible to use an external PCIe outbound port and modular critical infrastructure enclosure (MCIE) architecture to allow RDMA (pull model) between flash and the external node—but this is still in preliminary research.

A further concern we must address is affecting the supercomputer interconnect during the time spent making the redundant copy of the data from CN flash to global file system or neighbor flash. The SSDN could move the data to the global file system using a different interconnect, such as 10 GbE or 40 GbE without disrupting the compute interconnect fabric and the MPI traffic, except for the time of copying from CNs to the SSDN, while the MPI job is stopped. Some interconnect fabrics could be disturbed by the background data movement of creating the redundant copy, while others wouldn't by design. We believe that the potential to disturb the interconnect, which would thus adversely impact the calculation, will be lower using SSDN compared to CN flash. More experiments will be needed to evaluate the relative impact of each architecture to the MPI latency and thereby the induced compute jitter.

5. Additional Value of SSD Appliance

As we mentioned above the main purpose of using an SSDN between the CN and the global file system is to reduce the throughput requirements of the FS for Exascale and to minimize the number of hard drives needed for the throughput. The idea is to allow fast destage of the state of the cache of the CN to the SSDN and allow a slower draining of the state from SSDN to the global FS during which time the CN can continue to compute and there is no disturbance to the MPI traffic on the IB fabric. Currently at petascale very few of the cluster FS are capable of supporting the I/O requirements of the SC to achieve the flops including: General Parallel File System (GPFS), PanFS, Lustre and Parallel Virtual File System (PVFS). The reason is that all the checkpoint writes are performed directly to the global FS and as fast as they are they are limited to 100 GB/sec which will require many tens of minutes to write the checkpoint. The limitation resides mainly in the disk subsystem and the speeds of the interconnect are less of a problem as the disk are the bottleneck. As such 10 GbE or even 10 GbE are enough for the interconnect, yet in many cases the IB fabric is used to connect the CNs to the global FS in an inefficient way and impacting the MPI traffic longer. As a result of this situation, it is not possible to use additional "cheaper" shared FS that have lower throughputs than the aforementioned ones; for example, any vanilla NFS (v3, v4.1 or pNFS) server or OneFS of Isilon could offer a cheaper solution but it cannot achieve 100 s of TB/sec. Using this new I/O layer SSDN in combination with PLFS will allow the use of these cheaper slower shared FS at petascale and beyond. Currently PLFS needs to be integrated with the global FS but this integration will be extended to work with slower FS as well.

In fact there is no dependency between the shared FS used by the SSDN as it can mount any FS and use any global FS client running on the Linux OS inside the SSDN appliance. Moreover there is no need for integration between the SSDN and the global FS as long as they are supported and mountable on the Linux OS. This feature itself opens the door to additional value that SSDN can bring to the SCs. First it will allow a better separation between the compute phase and the I/O checkpoint phase. Second it will reduce the impact of the jitter on the CNs and the impact on other jobs running on the SC that do not take checkpoints in sync and by this will allow use of the IB fabric for flashing very fast the state of the memory of the CNs to the SSDN. Third it will allow removing any I/O related compute cycles used currently by the global FS client running in the CNs. The FS client is active all the time so even if there is no direct compute activity during the compute phase there is at least some compute that is used for keeping the connection alive.

Third and most important in our opinion is the fact that the SSDN being located on the fastest interconnect pipe will allow full achievement of the high speeds and IOPS of the SSD disks that otherwise would be underutilized if included in a disk array connected via a slower network with the CN. To explain this in more detail we can use a simple example of a SSD or flash disk that can achieve 100k IOPS and connected via IB quad data rate (QDR) to the CN that can achieve throughputs in excess of 2 GB/sec. Striping multiple of these SSDs (10 for example) will allow achievement of throughputs of 20 GB/sec and allow fast dump of the CN state to the SSDN. The design of such a SSDN will allow balancing of the throughput of the SSD/flash with the bandwidth of the network pipes assuming that a small number of CNs are connected to each SSDN. If the SSD is included in the storage system under the FS then the throughput that will be needed on the interconnect will have to feed at the same speeds tens of thousands of CNs, and it will be unrealistic to build such a storage array that will value to the maximum the capability of throughput of thousands of SSD drives. So compared to the SSD in an array the SSDN will remove the interconnect bottleneck between the CNs and the disk storage system.

As a forth additional value of the SSDN we can mention the fact that multiple checkpoints' data files can be stored in the local SSDN to which each CN is connected. Storing the checkpoint data specific to each CN in the local SSD storage for several checkpoints will allow a faster recovery of the state of the CN in case of a failure very fast from the "local" copy rather than reading it from the global FS. This will allow between other things the state of the simulation to be visualized very fast by reading the data from the local SSDN and following almost in real time the progress of the job. Moreover if the shared FS is very slow then the SSDN will be able to pipeline multiple checkpoints locally on the SSDN and drain the data at the speed of the FS while ensuring that all the checkpoints are stored in a Least Recently Used (LRU) queue on the local SSDN. If the time between checkpoints will be reduced to the point that it will take longer to drain from SSD to global FS than the checkpoint interval then we can eventually drop an older checkpoint from the work queue and skip to the latest data. This will effectively mean that we will allow adaptive variable checkpoint intervals without impacting the recovery time in case of a failure yet allow a slower FS to be used. (See Mallikarjuna S et al., Selection of a Checkpoint Interval in Coordinated Checkpointing Protocol for Fault Tolerant Open MPI, International Journal on Computer Science and Engineering, Vol. 02, No. 06, 2010, pp. 2064-2070.) In the case of a failure during the drain of the last checkpoint that is still in the SSDN and not started to be copied to the FS, the data can be uploaded to the CN and can be used as local copy for recovery or drained to the global FS before the recovery starts.

As we pointed out above SSDN is not only capable to support slower FS but it is also global FS agnostic; SSDN can mount any global FS client and copy the data from the local SSD to the global FS including even NFS and pNFS. This is an interesting way to make NFSv3 clients on CNs be able to do N-to-1 correctly and N-to-N would gain the PLFS metadata hashing benefits as well. The kind of file system you put under the SSDN would not matter and it even could be more than one at a time. Moreover multiple FS can be used to create multiple copies of the data for different purposes such as recovery visualization. This will be a great idea for low/midrange HPC for applications such as stock market analysis, oil and gas explorations, etc.

6. SSDN Leveraging PLFS

As mentioned above the new SSDN layer will allow the use of slower FS and can compensate to a certain extent for the slowness by using a pipeline of checkpoints data in the SSDN. Yet there is a certain point of slowness when even this least recently used (LRU) mechanism implemented in the SSDN will not be enough in order to keep up with the small checkpoint intervals and/or very slow FS without using a better data layout on disk. To address this problem, and not to require a large number of disks, we may improve the speeds of the disks using a better sequential layout such as PLFS can achieve. In order to do so we will make some modifications to PLFS to allow disconnecting from the FS data layout on disk by inverse mapping the FS layout and allowing PLFS to take advantage of the knowledge of the layout of the FS on disk to ensure better sequentiality. This will require some additional computations to be performed on the SSDN. Currently PLFS performs this type of computations on the CN and by this consumes CN compute resources, reducing CN efficiency. In order to be able to perform the inverse mapping calculations, SSDN will need to have enough CPU resources to allow these computations to be performed between the checkpoints and avoid slowing down the drain of the checkpoint to the global FS. We assume that each different file system will be inversed mapped and have some kind of plugins specific to each FS client running in the SSDN. For example Lustre has stripe widths that could be tuned by PLFS (with ioctls) that would optimize the PLFS on disk layout. For the most part this problem doesn't matter much because PLFS presents an N-to-N or no concurrent writes pattern to the file system and therefore, caching effects overwhelm all of these tunable variables. The tuning is largely related to N-to-1 high concurrent access to single file, but it might have a small effect on performance. This optimization might serve to inform a forwarding layer as well. Forwarding layers might work better if they knew there would be no concurrence. Today PLFS is doing what it does without any file system specific code in it, but we will investigate how much it helps to have an Abstract Device I/O (ADIO) layer at the bottom of PLFS or in the lower part of the SSDN software stack to optimize. See Rajeer Thakur et al., An Abstract-Device Interface for Implementing Portable Parallel-I/O Interfaces, Proceedings of the 6$^{th}$ Symposium on the Frontiers of Massively Parallel Computation, October 1996, pp. 180-187, IEEE, New York, N.Y.

Additional changes will be needed to PLFS to allow seamless access to the local as well as remote data automatically, depending on the location of several copies of the data and the "location" of the CN regarding the SSDN it is connected to. This will allow optimal recovery from a failure by minimizing the access to the slow global FS and increasing the use of the local copy of the checkpoint. This will require some knowledge about the location of each checkpoint data in the LRU queue of the individual SSDNs without requiring any clustering between the SSDN. It would be desirable for the application to explicitly decide what checkpoint copies get deleted. The application or some middleware the application calls should be able to manage the nearby workspace. Moreover, it will be possible to make PLFS aware of the checkpoint data chunks' location in neighbor SSDNs and request special data movement from SSDN to SSDN. Further, we can implement a significantly higher availability architecture that will use SCR-like methods to make copies to the neighbor SSDNs and allow recovery when an SSDN crashes and data cannot be recovered from the failing SSDN. These copies can be performed on a slower network, not on the supercomputer fabric, using perhaps SAS or 10 GbE interconnect between the SSDNs. As an extension we will enable PLFS to allow access in a hybrid mode to the checkpoint data by the SSDN, using both "local" and "remote" chunks (in the global FS) to thus improve the high-availability characteristics of the SSDN.

7. SSDN Used for Checkpoint Recovery and Pre-Fetch Next Job

Currently, the data for a new job is read from the global file system, using the global file system client running on CN, and it is slow due to randomness of the read and the uncertainty of the MPI job threads distribution to CNs for job data pre-fetch. In other words, the current MPI job scheduling is serializing the data load at the end of the rank scheduling process. First the job scheduler will allocate all the processes to all the CNs available for use or on CNs that have compute processes available for use and only when all the processes are allocated the CN will read the data from the global file system using the global file system client installed on the CN. Due to the slowness of the global file system, the load of the memory states for all the CNs that will be used by a job will take a long time. During this time all the compute resources allocated for the job will be idle. In worse case scenarios we are talking about many hours and maybe days as we head towards Exascale. During all this time there may be jitter on the other jobs that are still running during the load and read of restart of a new job.

The new concept of using a new layer in the I/O stack, SSDN, will very nicely address this problem by allowing the prefetch of the job data in the SSDNs closest to the CN where the MPI processes are scheduled to run. By this we mean that the data for the job can be preloaded in the SSDN to which CN is connected and when the MPI job starts the data will be very fast uploaded to the respective CN where a certain MPI process is schedule to run. The prefetch operation will be done in the background by the SSDN, on the slow network, without any disturbance to the currently running jobs on the supercomputer fabric and without any impact on the MPI traffic. Moreover the prefetch can be done even before the previous MPI job is finished and allow the scheduling of a faster start after the data has been preloaded to the SSDNs connected to the CNs scheduled to be used after the current job is done. This will increase even more the efficiency of the SC utilization.

The use of SSDNs will allow also checkpoint recovery to a different number of MPI processes than the one the checkpoint was written from. Modifications to the MPI-IO standards are being prototyped, by LANL and LLNL to allow applications to control where checkpoints are written, local or global, and also to request asynchronous copies of checkpoints to be made to neighbors or to global storage from local storage. Additionally, a new function is also being prototyped to request that a checkpoint be made "local" on an SSDN near the compute node. This function allows an application to ask for different data layouts than the layout that the checkpoint used when it was written. This function uses the supercomputer's interconnect to move around the parts of the checkpoint to make "local" all the parts needed by each CN. Since this function would hopefully be added to the MPI-IO layer, then there would be appropriate ADIO function calls added, matching these new capabilities.

PLFS could then be extended to handle these new ADIO functions for managing the data in, moving to, and moving from the burst buffer/SSDN. This work is in plan for PLFS as part of the PLFS/SCR project. These functions can be asynchronous and that is where the processing power of the SSDN comes in. The SSDN could be tasked with making copies completely asynchronous to the application running on the CNs. It is the responsibility of functions that make copies/move data around (local, neighbor, global) to keep the PLFS metadata up to date so that PLFS knows where all parts of the file are and the relative performance level of each part. Since PLFS has all this parts location/copy information in its metadata, querying that metadata will allow additional optimization of read/write/copy functions in parallel as well as allowing smart placement of analytic functions by moving the analysis to where the data resides (which SSDN).

8. SSDN Alternative Architectures

So far we discussed the possible utilization of SSDN appliances yet we didn't look in more depth to the implementation and integration with PLFS. There are many SSDN designs that could be considered. One could imagine an SSDN that is simple and just connects to the CN I/O channels like a SAS channel and connects to the SAN via Ethernet or Infiniband to talk to the global file system. This simple burst buffer concept has some capability in that it could provide the base burst buffer on write function. This design however makes it difficult to fully utilize the processor that the SSDN could have on board for offloading functions from the CNs and it makes pre-stage/shuffle operations less elegant. At the other end of the spectrum, the SSDN could be connected to the supercomputer interconnect fabric directly and thereby be addressable by every CN and the SSDNs would have interesting ways to talk to each other. This design would support offloaded function very naturally and assists in pre-stage/shuffle operations etc.

Depending on the connectivity architecture chosen, the software stack on the SSDN will be different. It is envisioned that in the later more richly connected SSDN design, parts of PLFS would be present on the SSDN so that the SSDN could interpret PLFS files/metadata. Further the SSDNs could implement server side pull RDMA operations to pull the data out of the compute node's memory instead of having the data pushed on the SSDN which is much more efficient from an optimal scheduling point of view. It is even possible to define views on the data in MPI-IO and pass that view (semantic information) down to the IO subsystems, thereby allowing PLFS and SSDN to understand the structure of the data (like arrays of floating point data, etc.). Passing this semantic information into the SSDN would allow for massive optimization of the SSDN operations to occur. This also provides the ability to implement analysis functions naturally at the SSDN level. It is envisioned that analysis functions would likely have to be implemented using virtual machine technology dropped on the SSDN by the application to provide active storage functions on the data in the SSDN. There are many decisions to be made and research questions to be answered in the best way(s) to exploit the full potential of the SSDN concept. We expect to work with the community, especially the data analysis community, to define the interfaces to the SSDN well. Also, the interconnect method of the SSDN will govern how much or little the SSDN cluster can act as a cluster and this is also an area ripe for research to determine the right amount of synchronization between SSDNs which has implications on how easy the SSDN cluster is to grow/shrink/change/etc.

One way to implement is to use a PLFS thin client on CN and a thicker one on SSDN; we can call this idea SSDN PLFS clustered metadata. So let's talk about N-to-1. In POSIX (not MPI-IO), all CN processes call open (create) on the same file name. There is a possible race to see who gets the directory lock to insert that one name into the name space by a million processes (for Exascale). As one can imagine, this is quite ugly if not impossible today. In MPI-IO, open is a collective call, so all, CNs and processes, know they are opening the same file and they can just delegate one process to do the open. Instead of in POSIX, when everyone is opening and most of the packets get dropped at the network, and everyone backs off and tries again and eventually after timeouts and several retries they all realize that someone has already opened with create, the MPI-IO organizes this with low latency optimized collective calls/barriers, when the processes decide to write N-to-1 after the open. In MPI-IO many application will call file set view, which is a collective call. This tells everyone who is writing what. This enables an enormous optimization on writing; it enables you to build a million scatter gather lists in parallel. Most of these sorts of optimizations fix problems that get worse as you scale up. The question where the "run some of PLFS in CN and some in SSDN" comes in where these optimizations occur.

For example, assume you have a million processes on the CNs. They decide to write an N-to-1 file. They call collective opencreate and we use the collective to have one process do the opencreate into the global file system. Then the application calls set view which describes the memory of the CN process (for example, pressure/temperature/density distributed arrays) which is scattered across the memories of the CNs and how the user wants that data laid out in the N-to-1 file. Set view is a collective call, so we can record what process will write what parts of the file into the metadata for the file in the global parallel file system. Then the application calls writeall.

Now with all the PLFS function running in the CN, each CN process takes the view (memory/to file scatter gather map for that process), and builds a writev operation and writes the data to the SSDN. But with some of the PLFS function running in the CN, each CN process takes the view (memory/to file) scatter gather map for that process, and ships that map to the SSDN, and the SSDN schedule RDMAs in an optimum way for the SSDN to get the data in the most efficient way to/from the CNs. Then the application calls mpiclose. Now we have the high level metadata for the file in the global parallel file system, so other systems elsewhere (not part of this job) can see the file and how big it is but can't read it (the data) because the parts are not global, they are "local" in the SSDN. At this point the PLFS running in the SSDN will have to figure out if the data is in the SSDN that is connected "locally" with the CN or if there is a need to bring that data from a neighbor SSDN. But all of these will need to be investigated further in order to ensure the best implementation architecture.

9. Increasing SC Efficiency Using SSDN

As we already noted above, reducing checkpoint interruption of compute increases the compute time and efficiency and assuming same amount of computation will be executed in less time as the flops increase. On the other hand this reduces the job runtime for the same amount of flops and as a result, assuming a constant checkpoint interval (see Mallikarjuna S. et al., cited above), the number of checkpoints is lower which in turn results in a lower storage capacity needed for the job data. Eventually this leads to a reduction in the number of CNs and cores used by the job or the ability to run larger jobs on the same number of CNs. In reality this means that we increased the amount of Gflops per core and improved the evolution from Petaflops to achieve Exaflops with smallest number of CNs. We need more research in order to quantify the amounts of savings.

10. SSDN as Viz Enabler

As we already pointed out above, the use of a "local" copy of the checkpoint data in the SSDN will improve the value of simulation by early detection of simulation errors and/or erroneous unexpected behaviors of the system under simulation by enabling fast visualization of the checkpoint data. The Viz application could display the data from the local SSDN, with no disturbance to the running job/s all while not disrupting the compute, compute jitter, and MPI traffic. But this doesn't come cheap; it needs compute power in the SSDN such as General-Purpose computation on Graphics Processor Units (GPGPU) to allow display of each checkpoint immediately after it is dumped to SSDN. Currently it is not possible to Viz all the checkpoint and even less possible for Exascale when the size of the memory of the SCs will be in the PB. De facto this means that each SSDN will become a different type of CN that will run Data Intensive Tasks in parallel and without disturbing the SC. This idea is reminiscent of the Active Storage ideas that were investigated and tested at the Pacific Northwest National Laboratory (PNNL). See Evan J. Felix et al., "Active Storage Processing in a Parallel File System", 6th LCI International Conference on Linux Clusters: The HPC Revolution. Apr. 26, 2005, Chapel Hill, N.C., and Juan Piernas et al., "Simulation of Active Storage Strategies for Lustre Parallel File System," SC '07 Conference, Nov. 1-16, 2007, Reno, Nev.

11. SSDN Supports/Utilizes Active Storage Architectures

As was covered above, adding compute power to SSDNs will allow visualization of the simulation data in real time. Additional to this the SSDN compute will allow searching for interesting patterns in the data that will allow the design of the next simulation according to the new understanding/interpretation of the simulation results on-line. Currently the next simulation design starts only after the previous simulation ends. Moreover while the data is in the SSDN additional data analysis can be done as well as searching the data in transfer to disk. Having additional CPU resources on the SSDN allows for asynchronous processing done on the SSDN rather than synchronously on the CN, for example to detect malicious intrusions or even programming anomalies before writing the data to disk. The compute power in the SSDN will allow improved data protection as well as check summing data on the global file system as an asynchronous background operation. As a result this will allow further reducing the throughput required from the global file system. Another active storage/network concept being contemplated is to staple code sections to the data that they were responsible for producing, thereby giving a way to debug issues with the code by looking at the checkpoints and in pseudo real time.

Essentially we end up creating an intelligent 'storage' layer that is aware of the CN application and data layout and formats, without enhancing the underlying global file system layer. Additional research is needed in order to determine what kinds of active functions to do on the SSDN and how to do those functions. Since the SSDNs may be shared resources, shared by analytics and checkpointing, protecting quality of service will be a necessary concern. Additionally, applications must be able to manage not only the use of the SSDN but also the space they are using on the SSDN.

The use of this new SSDN layer only makes sense if we get to a viable CN/SSDN cores ratio. Given that the CN is also using multi-cores, a 1-to-1 CN/SSDN cores ratio will be cost prohibitive because adding cores to CN is cheaper that adding a whole SSDN node. We should think of the SSDN as a CN co-processor that handles tasks that are independent of the running Jobs on the CN. Other possible uses of active concepts include encryption and data reduction using compression, differential checkpointing, and data de-duplication.

What about data analysis? In the case of all the PLFS function running in the CN: The SSDN doesn't know much about the structure of the file, because it just has binary blobs of data sent from each CN process in a write op. So data analysis done by the SSDN is hard and may require dedicated compute resources but can improve even more the reach of the PLFS inside the RAID for example. The question still remaining to be investigated is how much compute.

For example, in the case when part of PLFS function is running in the SSDN, the SSDN is passed the structure of the file so it knows what the data is that it is storing (array of floats, etc.). Now active storage concepts like data analysis can be done on the data as the data can be understood by the SSDN. Additionally, now that the SSDN is smart and has information to optimize over, it can be even smarter about how it writes the data to the global file system, maybe in row major and column major, maybe in ranges, etc.

What about migrating the data to global from SSDN? If part of PLFS runs on the SSDN, when the application issues an mpi-file-move all asynchronous operation, and since the SSDN is running PLFS (MPI-IO probably) it can look at the global metadata for that file and determine who should move what chunk of data and how it moves it and optimize the data movement. So in this case, the SSDNs would need to know about one another (in a weak cluster way) and use PLFS code to help them know who needs to move what and how without lots of metadata synchronizations between the SSDN's. One should expect that the SSDNs will have to act as a team, for similar reasons to needing the communicators for the PLFS on the CNs. This feature will allow the PLFS to act as a synchronization layer between SSDNs with very little 'chat' between the SSDNs.

What about deleting data on the SSDN to make room for new data? The application could call mpi_delete_file_all. This could let all the involved SSDNs know they need to delete their parts without having to talk to each other. Then when all the parts are gone, one of the SSDNs (or one of the CNs—since this is collective) could delete the high level metadata.

11. Additional Value of Active Storage SSDN

If SSDN will have enough compute power additional data reduction operations can be applied including for example: data reduction using compression, differential checkpoint, de-dupe; data analysis in the SSDN; graph analysis of the compute results; local copy of data versus Global FS; and data encryption (can allow retaining disks when SC is decommissioned). Although the idea of Active storage is attractive for the SSDN layer we will require always that the SSDNs will operate as loosely coupled cluster. This will allow a higher level of flexibility to the SC I/O implementation as about the number of SSDNs used in the SC as well as the easy way to add or remove SSDN's without modifying or changing the supercomputer hardware or software and allow flexible connectivity between CNs and SSDNs independent of the network topology and number of components. The data draining is done from "local" SSDN FS to the global FS for each CN independently and the only synchronization is done when all the drain operations are ended on all the SSDNs and are done asynchronously and PLFS file is complete when all the data is on the global FS. We can use mpi_file_protect_all or can use a separate MPI cluster of SSDN. A simple mechanism can be to replace pointers, to data objects/chunks, by data and change the PLFS log to reflect this.

In the SSDN architecture for a demo and for high availability, the checkpoint data is mirrored to the neighbor SSDN. The draining operation can be done in parallel to making a copy to the neighbor SSDN on the Ethernet network using standby continuous replication (SCR) ideas but between SSDNs and not between CNs. The MTTI of SSDN is much higher than for CNs due to the reduced number of SSDNs and makes SCR more efficient.

12. SSD as Burst Buffer Above the FS is Better than SSD in Storage Array

Currently storage systems use SSD drives inside the array and achieve good IOPS performance numbers as well as low latency that is much lower than spinning drives. SSD drives are used mostly for data base (DB) applications and stock market analysis due to their low latency requirements yet using SSD drives for extreme HPC is not a good option for supercomputer disk storage. Of course, the price of SSD plays an important role preventing the penetration of SSD based disk arrays in the supercomputer's I/O stack. Yet the price is not the major inhibitor of using SSD based disk arrays as much as the needs of moving all the data from the disk array to the CNs of the SC. Most of the high end disk storage is using SAN networks based on FC connectivity. This is a limiting factor of delivering the high performance of the SSD from the array to the hosts. If we consider for example that a SSD drive can deliver on average 30,000 iops and a normal disk drive can barely achieve 500 iops or a factor of 50× higher performance. Considering that a fast disk array like VMAX can do maximum 500,000 iops, due to limitations of the memory bandwidth and input/output subsystem, the 500 iops per disk are enough to achieve the maximum throughput performance of the array using 1000 disks. On the other hand, if we use SSD drives as we defined before, then we will need just 14 SSD drives to achieve the maximum throughput of the array. Conversely, if we want to achieve the maximum potential of 1000 SSD drives of 30 million iops, then we will need 60 disk arrays connected via the SAN to the CNs. But this is just an ideal SAN network case when the hosts are connected to the SAN using Fibre Channel (FC) or even the Secure Remote Password (SRP) protocol over IB while in the case of the HPC supercomputers they use a global shared FS for the I/O data access. Assuming that the overhead of the file system is neglectable, and the throughput required by each CN is 2000 iops (2 GB/sec of 1M I/Os) we will be able to provide the I/O performance for 15,000 CNs. But for this we will need an IB switch that will support a traffic of 30 TB/sec from the disk arrays to the CN.

One way to address this issue could be to use the spare compute resources in the disk array to run HPC jobs inside the array and without any need to move the data in and out of the array so that all of the 30 million iops can be delivered directly to the compute resources. In this case we will need to ensure that the memory throughput on the PCIe bus will be 30 TB/sec which is not possible with the current technology. If we could achieve these speeds than we will be able to deliver the I/O performance to 15,000 CNs and using 1000 SSD drives to achieve the I/O performance required by the CNs. But in this case we will need to include a large number of processors inside a single disk array that will also require large amounts of memory and that will result in high power consumption and heating that will not be possible to cool efficiently. So, using SSD inside disk arrays in either of the two possible solutions (CNs connected to SAN or else compute inside the disk array) fails to achieve the I/O throughputs required by the SC.

More recently SSD and flash disk vendors, like Violin, introduced small form boxes that can achieve high I/O performance that will replace a large disk array of 1000 disks with 20 SSD/flash drives and will be able to achieve equivalent performance and use the same SAN technology as the classical disk arrays, so that it will be possible to deliver the I/O performance required by the SC of the example using 60 such SSD appliances. This solution looks much better from a price/performance perspective than using disk arrays yet it still needs a SAN able to deliver 30 TB/sec.

We can now address the SC problem by changing the location of the SSDs in the I/O stack and bringing them closer to the CNs. If we connect a small number of CN to a SSD appliance, like Violin, and use a small number of SSDs that will be able to feed the CNs and deliver all their I/O needs on a local network, then we can solve the problem of I/O for SC. Each of the SSD boxes will need only modest connectivity because they only support a small number of CNs and will be relatively cheap. Now if we assume that we can copy the data from the SSD boxes to the big disk storage array with 1000 disks in the "spare" time when the SC is in compute phase, then we can still use a single disk array and by using the SSD boxes as I/O reducers we will be able to supply the I/O needs of the 15,000 CNs using 1000 SSD drives and 1000 disk drives to achieve 30 TB/sec required by the SC in our example. So, to summarize, by moving the SSD up in the I/O stack above the global FS we will be able to deliver the I/O throughput using many thinner pipes that exist today and not require very wide pipes on the disk arrays to deliver the same throughput. This new paradigm of I/O will allow achieving Exascale I/O in an evolutionary way using small numbers of expensive disk arrays and a larger number of cheaper SSD appliances.

13. SSDN Appliance Brings Data to the Compute

Most recently many of the cloud providers played with the idea of putting the compute resources close to the data mostly when public clouds span across geographies. This seemed as an attractive value proposition for the HPC users because for most of the use cases the users lack compute resources and using cloud HPC resources could help to get cheap compute resources on demand. The assumption was that in the majority of the HPC the cost of moving the data close to the compute in the public cloud was and still is an expensive solution as the network resources. Moreover, the compute resources could be distributed between multiple locations and that means that data has to be multiplied to all the sites. Some storage vendors used this idea and utilize the compute resources that were not used for the data movement and RAID controller to run HPC jobs. Again, the problem is that compute nodes inside the array are not enough for large capability jobs and they will have to span over multiple storage arrays. As a result there was a need to mirror the data between all the arrays similar to the public cloud case. Although this idea is good and reduces the network resources to move data, there is a limitation on the amount of compute resources and of memory that can be available for compute inside the storage array. One can argue that there are trade-offs for this approach that may not be conclusive and most certainly will not suit all the usecases. On one hand we have the advantage of the low network traffic internal to the storage system and utilizing the backplane bus is very efficient. On the other hand in order to achieve the computation efficiency we need large amounts of memory for the cores which will require more power and cooling for the storage system making it limited in the compute power efficiency. Additional to this, adding additional global FS resources from external systems is requiring additional hardware as well as network and connectivity gear for both the data and the MPI traffic. This alone will limit the size of the supercomputer to no more than 1,000 s of cores which can be useful for small compute clusters but unsuitable for large supercomputers. There is a possibility to replicate the data across multiple storage systems using Hadoop Distributed File System (HDFS) for example yet this requires additional network traffic and network gear.

As we discussed above the option of bringing the compute to the data is complicated and limited to small compute clusters and will not suite extreme HPC that are on the way to Exascale. The other alternative is to bring the data close to the compute. The challenge in this case is to keep the network resources low and cheap while moving the data from the storage system to the CNs of the SC. We will also consider as an invariant the number of disks required for same job; e.g. with the compute inside the storage we need a small number of disks as the cache of the storage system will ensure high throughput from the disks as the data resides in the cache which is flushed to disk. So, this means that in order to bring the data to the compute we need to use a small number of disks similar to the previous case and a low network throughput to bring the data from the storage array to the CNs without any loss of compute efficiency and as seamless as possible for the CNs with minimal jitter and disruption. The idea is similar in that the solution will have to use some kind of caching mechanism such as a buffer. This is called in the literature a burst buffer (BB) because will need to prefetch or flush the data to or from the CN memory to the disk system and allow fast CN data movement to the BB and ensure that the data is on disk. This will allow achieving the goal of bringing the data to the compute in an economical way. We introduced the idea of SSD node as a BB in the previous sections and we will use this type of SSDN to show that this will bring the data close to the compute. We propose to use the SSDN as a throughput impedance match that will allow the CNs to either dump the state of their memory very fast to the SSDN and continue the compute undisrupted after the data was pre-fetched to or dumped from the CNs to the SSDN. As we explained above, after the data is burst to/from CN the SSDN will use local compute resources to drain the data slowly to the disk system using low network resources to accommodate the low throughput requirements and capability of the disk subsystem that will use a small number of disks. In order to be able to compensate for the cached I/O to/from disk inside the storage we will need to ensure that we get very sequential data layout on disk using PLFS. This in turn will increase the efficiency and the throughput of each disk and achieve similar performance with the previous case.

In addition to reduction in the throughput from the SC to the disk system achieved by the SSDN-BB, we can add compute resources in the SSDN to allow additional reduction of the data that is sent to disk and further reduce the amount of data sent to disk via the network. We will be able for example to compress, de-duplicate and compute differential checkpoints to minimize the amount of data that is stored on the disk system and reduce proportionally the network traffic to/from disk and possible reduce the time of moving the data from SSDN to disk in extreme cases when the time between checkpoints needs to be decreased due to MTTI decrease. Of course we assume that both the checkpoint write and the data pre-fetch will be improved accordingly to keep the network traffic to the disk low.

If we consider now that each compute job has some needs to analyze the resulting data on the CNs not related to the simulation task but required in order to continue the next compute period, then we could off-load these analytics tasks to the SSDN. In doing so, we will release the cores in the CNs to perform the main compute task while the analysis for the next phase is done in the background on the SSDN using the compute power of the SSDN. For example, we can split the supercomputer in two clusters running independently MPI jobs; CNs compute nodes and SSDN Data-Intensive Super-Computing DISC nodes. The scheduling of a MPI job will be able to define each of the tasks and plan to run on the right cluster.

Although one could argue that we can achieve the same result using additional compute resources to the SC by using DISC specialized compute tasks more efficiently on the SSDN cluster we will need less SSDN boxes and in total less components to run the same job. We can envision that by transforming or moving some of the CNs to become SSDN boxes we can reduce the number of CNs required to finish the same job in less time and in fact this will result in a need for less components.

So far we discussed the architecture implication of moving data near compute assuming that there is a fast way to move the data from CNs to/from the BB. But this assumption has additional implications on the compute efficiency and jitter. The basic idea is that we want to separate as much as possible the compute time from I/O time and move the data from CN memory to/from SSDN in the most efficient way so we will be able to minimize the I/O time and maximize the compute time between checkpoints. It is still to be proven experimentally that the separation of compute and I/O is the best solution while interleaving compute to I/O at a lower granularity can still be more compute efficient. While we need more research in this area, to prove that the separation is the best paradigm, we believe that the separation has the best chances of success. If we consider that there is no need to modify the application to achieve the separation while interleaving the compute and I/O segments will require changes to the application, then we are convinced that the separation has the best chances of success on the evolutionary way to Exascale.

Now it remains to see how we can minimize the I/O time during the checkpoint interval using the SSDN box. The solution needs to consider hardware and software combinations that will move the data as fast as possible, using current technology, between CN and SSDN. We are first looking at using RDMA between the CN and the SSDN for either SRP, iSER or NFS transport protocols. Either of these protocols have advantages and disadvantages considering the resources used for enabling the connection and creating the socket. An additional alternative is to use an external PCIe connection between the CNs and SSDN. Although the PCIe solution may not be faster than a transfer protocol solution, it has the advantage of offloading the socket creation of the CN and also the data transfer model to pull. All the other hardware enabled RDMA will require the CN to manage the socket and will use a data push model. One more problem we need to address is the efficiency of the data transfer considering also small files as well as random access. To address this issue it seems to us that the most efficient model would be NFS-RDMA as it will allow the CN to decide to use either RDMA or not according to the needs of each data transfer.

The above are mostly hardware driven data transfer methods but the MPI enabled solutions are also available. For example if the application is modified to use I/O forwarding it will be possible to move data more efficient than using hardware assisted RDMA. The reason is that the application knows the best the characteristics of the data transfer and can efficiently decide the caching and the pipeline of the data and not have to create a socket for all the transfers. From the architectural point of view and simplicity the hardware assisted method looks the most attractive yet depending on the transfer model pull or push the efficiency of the transfer will vary. For example using the pull model with PCIe has the advantage of offloading the CN compute resources but will have no control over the efficiency of the small I/Os and may induce overheads that cannot be reduced as there is no information on the intent of the application. Conversely, using NFS RDMA, the CN and application will be able to decide the use of RDMA or normal transfer of small objects and random I/Os at the cost of some compute resources. We will need to run some experiments with both patterns before we will be able to decide which is the optimal. We need to agree that all the three models (push, pull and I/O forward) have merits that cannot be neglected without empirical data.

All this said we believe that the PCIe assisted RDMA has the best chances of success for checkpointing and data prefetch as in most of the cases the checkpoint data is large sequential I/Os and the prefetch data will be controlled by the SSDN which will have all the details on the data transfer and can easily decide to use RDMA or not depending on the type of transfer. In any case we assume that all the data transfers between CNs and SSDN will be done on the IB interconnect fabric connecting the CNs. Additional research is needed in order to decide the impact of I/O traffic on the IB fabric on the MPI traffic and latency. It is well known that the data traffic between multi-point connections and distributed cluster used for MPI on the IB traffic will create bottlenecks and may block the MPI traffic in congestion cases. This is a serious concern for the SC running capacity jobs because checkpointing one job can disrupt the other jobs using the fabric yet for the capability jobs it is less of a concern. As such we propose to investigate the impact of the data traffic on the MPI traffic and select the most suitable data transfer method according to the usage of the SC and scheduling the jobs accordingly. This means that the jobs will be scheduled to reduce the interaction between running jobs and checkpointing jobs in such a manner as to configure the data transfer according to the job scheduling specific to each type of job. Alternatively we can schedule the data transfer model and method for each job at a time assuming that the hardware is supporting all the data transfer types. One result of this new scheduling method will be that we will be able to decide the number of CNs to be connected to a single SSDN in a dynamic fashion taking advantage of the fact that both CNs and SSDNs will be connected to the IB fabric. Using this idea will allow Cray SC to use the SSDN seamlessly as well as any other cluster that has different compute efficiency models to use the same architecture of SSDN cluster.

14. SSDN Helps the Evolution to Exascale

As pointed out above, the SSDN appliance used as a burst buffer can be a valuable component in the I/O stack that can significantly improve the I/O performance in support for the compute nodes. We expect that these improvements will allow operation of supercomputers that will deliver higher flops that today are not possible due to the weaknesses of the I/O system between other factors. Although we cannot predict that SSDN alone will allow Exascale SC, we can see how the BB idea will allow evolution from petaflops to many petaflops. In order to achieve the Exaflops additional research is required as well as performing experiments with the new I/O stack and developing new software tools to allow taking advantage of the burst buffer. There are several effects of the use of a burst buffer based on a SSD appliance including:

SSDN will allow increasing the efficiency of the SC by reducing the checkpoint time and allow more frequent checkpoints.

SSDN will allow reducing the number of CNs capable of achieving more flops by increasing the ratio of compute to checkpoint time.

SSDN will allow reducing the number of disks required to store the checkpoints and application data by reversing the current trend to use more disks for throughput than for capacity. This will allow keeping the number of disks to similar levels as the currently used in petaflop supercomputers.

The burst buffer function will allow reducing the disk space required for checkpointing by reducing the runtime of SC jobs and as a result reducing the number of checkpoints and requiring less disk space.

SSDN will allow fast de-stage of the CN's memory while allowing slow drain of the checkpoint data to the global file system and allow slower FS to be used. This effect is equivalent to an I/O speed reduction from the CN's high speeds to accommodate the slower speeds of the global FS acting as an impedance match. This alone will facilitate use of less slower disks with large capacity and hide latencies related to random disk access.

Use of PLFS on SSDN will allow reducing even more the number of disks by placing the data on disk in a sequential way and increase disk access speeds both for write and read. Although currently, at the I/O speeds of petaflops, sequential access speeds of disks are sufficient, we predict that with the increase in the disk capacity to 10 s of TB we will need much higher disk throughputs in order to keep the number of disks low. In this latest case PLFS will become critical for Exascale supercomputers in order to allow draining of the data during the time between more frequent checkpoints.

Assuming we use an "active" SSDN, that includes compute resources, the SSDN appliance will offload some of the data intensive (DISC) tasks from the CNs to the SSDN. By this the efficiency of the SC will increase resulting in less cores needed to execute the same job during the same runtime or equivalently reduce the runtime of the same job.

An active SSDN appliance will allow online visualization of the checkpoint data and compute results without disturbing the CNs computations without compute jitter, which is not possible for the current SC I/O architectures. This will allow early detection of simulation errors and restart the jobs close to the time when the error occurs and not having to finish the job and having to re-run the erroneous job. This evolution alone can help petascale supercomputers today and will become critical for the evolution to Exascale.

The SSDN appliance will allow fast pre-fetch of the data for the next job much faster than currently at petascale systems and as a result will reduce the I/O waiting time for starting the MPI jobs and allow a more efficient use of the supercomputers and reduce the idle time of the supercomputers.

Using a BB to move the data out from the CN memory to the SSDN will allow moving the global FS client out of the CN and reduce the compute resources used by the FS clients like GPFS, Lustre or PanFS. We intend to run experiments to measure the compute resources used by different popular FS clients to estimate the impact on compute runtime.

One of the alternative SSDN implementations will use an external PCIe outbound port that will allow moving the data to/from the CNs using a pull model that will have the effect of offloading the compute resources required for the creation of the RDMA sockets and allow use of RDMA to speedup even more the dump of the checkpoint data.

The use of PLFS running on the SSDN will improve the metadata performance located on a fast SSD and allow support of a very large number of objects in the global FS. By offloading the metadata we expect to enable additional DISC functions related to fast search of objects and integration of additional libraries to improve the I/O data access without introducing any jitter to the CNs.

15. SSDN: On Fabric or on Network?

SSDN on fabric is more efficient for copying from SSD to global FS but this will interfere with the MPI traffic. SSDN on network is slower but it doesn't disturb MPI traffic yet it might be too slow to keep up with the checkpoint interval reduced at Exascale.

16. Pre-Fetch Data for Next Run

SSDN and PLFS integration to allow recovery using local copy and remote copy should consider how SSDN can allow fast recovery from local checkpoint data at a fast enough rate to ensure efficiency of the Exascale. If the checkpoint interval decreases to less than one hour, then recovery must be as fast as the checkpoint (300 sec) to ensure more processing than checkpointing (assuming there is a need to increase MTTI).

17. Using pNFS to Cluster SSDNs

For clustering SSDNs using local NFS cluster and global pNFS cluster, each SSDN is a data server, and data is mirrored or migrated to global FS. The global FS is used as data servers for pNFS and metadata servers (MDS) or clustered MDS for the pNFS.

18. Demo System

Figure 4:
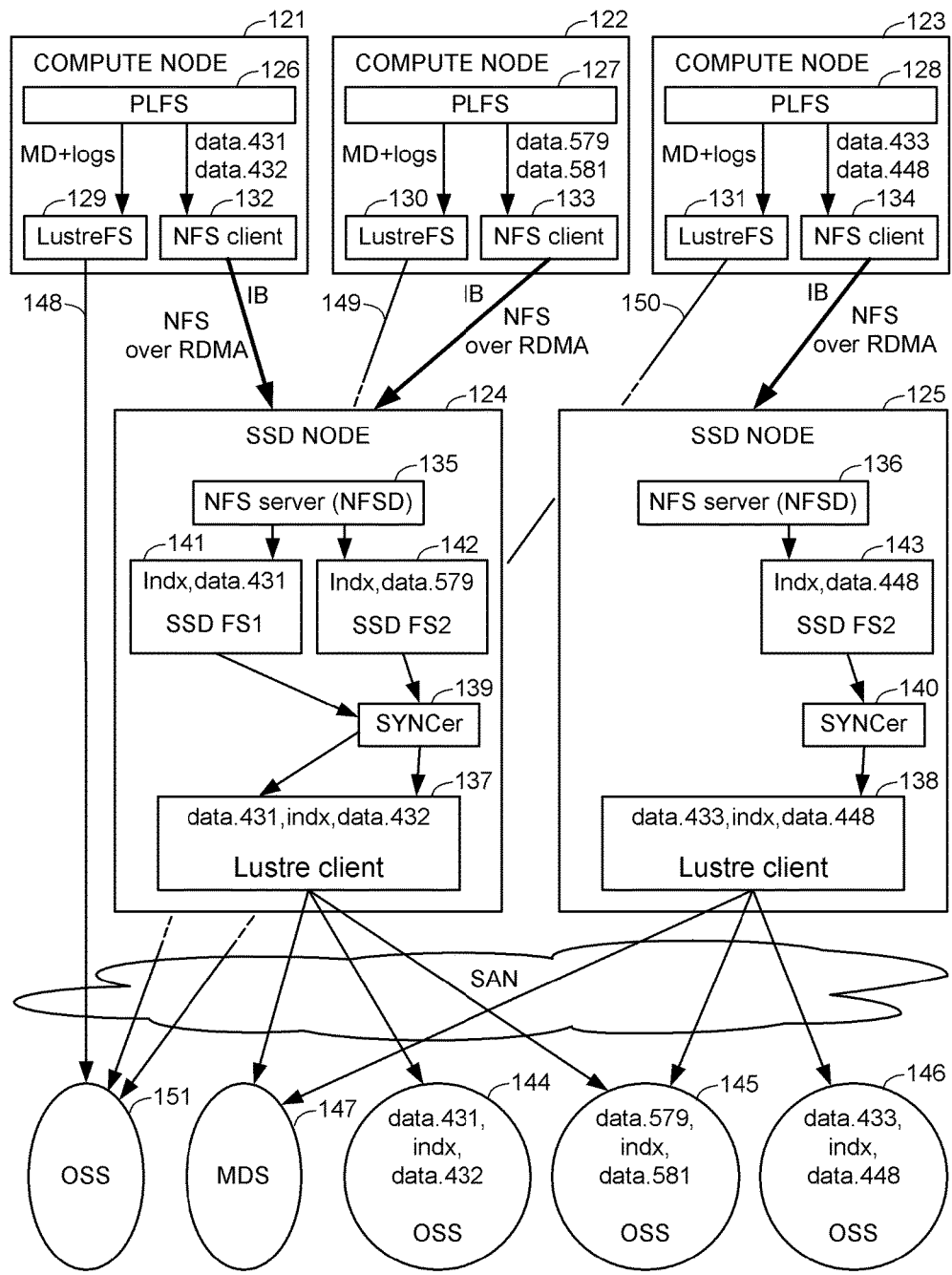
FIG. 4 is a block diagram of a demonstration system.

FIG. 4 shows a demo system to show that using the SSD burst-buffer nodes increases the efficiency of the computation by increasing the compute time and decreasing the checkpoint write duration for the same checkpoint interval of five minutes. Without the SSD burst-buffer nodes it takes four minutes to dump checkpoint to Lustre FS and PLFS (without PLFS the dump will take longer). The demo system includes three compute nodes 121, 122, 123 and two SSD burst-buffer nodes 124, 125 linked to the compute nodes via IB. Each compute node 121, 122, 123 is programmed with a respective PLFS manager 126, 127, 128 and a respective LustreFS manager 129, 130, 131 and a respective NFS client 132, 133, 134.

Each SSD burst-buffer node 124, 125 is programmed with a respective NFS server 135, 136 and a respective Lustre client 137, 138 and a respective "SYNCer" program 139, 140. The SSD burst-buffer node 124 has two associated solid-state drives 141, 142. The SSD burst-buffer node 125 has one associated solid-state drive 143.

Each of the SSD burst-buffer nodes 124, 125 is linked via SAN links to each of three Object Storage Servers (OSS) 144, 145, 147. Each of the SSD burst-buffer nodes 124, 125 is also linked via a SAN link to a Meta Data Server (MDS) 147. Each of the three compute nodes 121, 122, 123 is linked by a respective data link 148, 149, 150 to an OSS 151.

In the compute node 121, the PLFS manager 126 accesses the LustreFS manager 129 to store and retrieve metadata and logs of the PLFS, and the PLFS manager 126 accesses the NFS client 132 to store and retrieve data of the PLFS. Each of the compute nodes 122 and 123 operate in a similar fashion.

Figure 5:
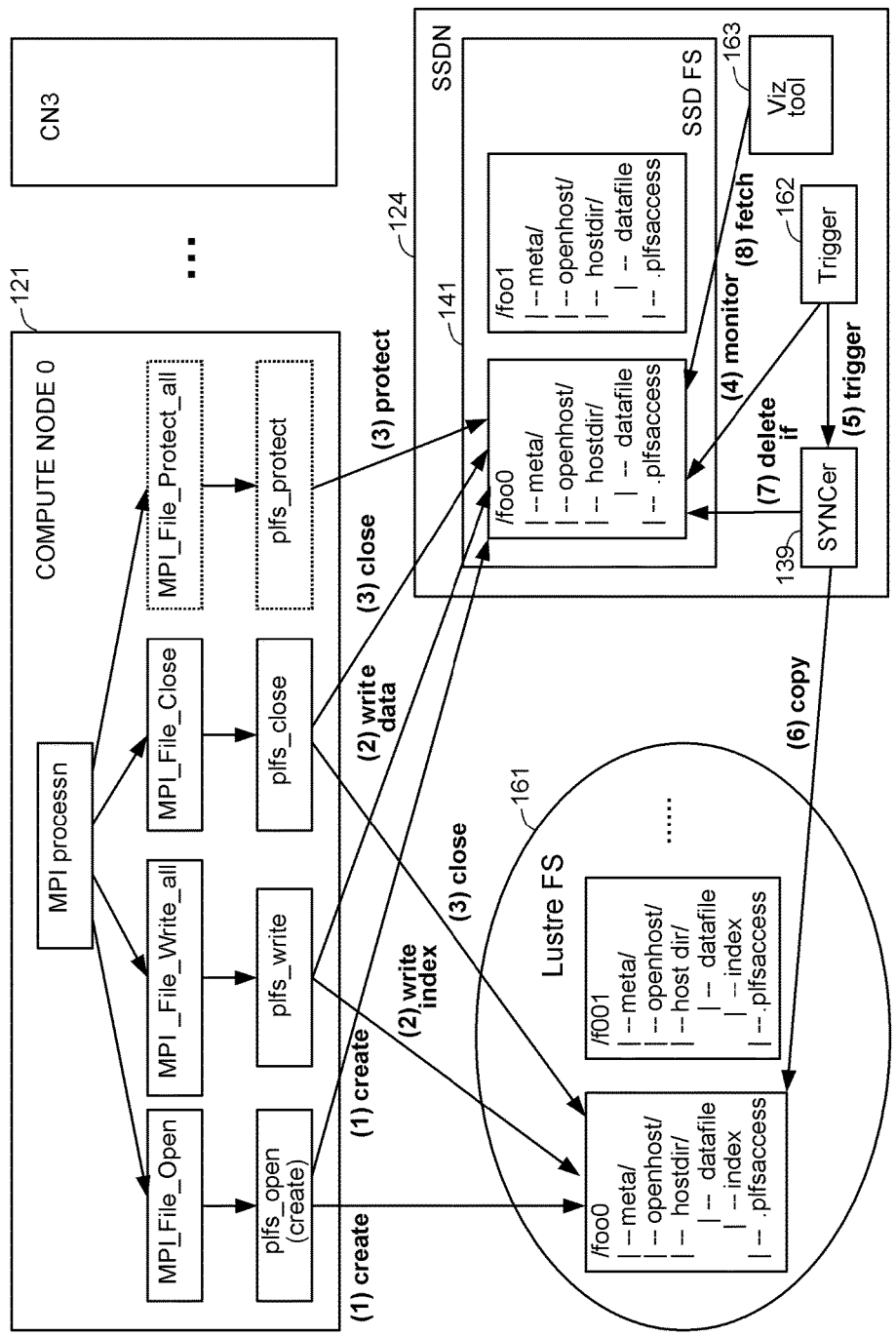
FIG. 5 shows a flow diagram of the demonstration system of FIG. 4.

FIG. 5 shows data flow through the demo system. A typical operational sequence includes a create, a write index and data files, a close, a protect, a monitor, a trigger, a copy, and a delete operation. In particular, the CN 121 mounts both NFS file system (/NFS-CN) and Lustre file system (/Lustre). In a "create:" operation, an application creates the same directory structure in the SSD FS 141 and in the Lustre FS 161, which includes meta/, openhost/, hostdir, etc. In a "write index and data files:" operation, during the checkpoint process, the application dumps the checkpoint data to the remote SSD FS exported by SSDN NFS server (/NFS-CN/foo/hostdirN/), and writes index files to global Lustre FS (/Lustre/foo/hostdirN/). In a "close:" operation, when checkpoint process ends, the application calls MPI_File_close to close the checkpoint file. At this moment, the SSD file system should have all the data files for all the CNs connecting to it. If MPI_File_Protect_all is not used, plfs_close will be changed to create a special indication file on openhost/in SSD FS. In a "protect:" operation, when MPI_File_Protect_all is used, application calls MPI_File_Protect_all inside which creates this indication file. All CNs will finish the checkpoint process and resume the computing.

There is a "monitor:" operation on the SSDN. A Trigger 162 monitors the creation of the indication file (based on inotify). The Trigger 162 sends a message to the SYNCer 139 once the indication file is created.

Figure 6:
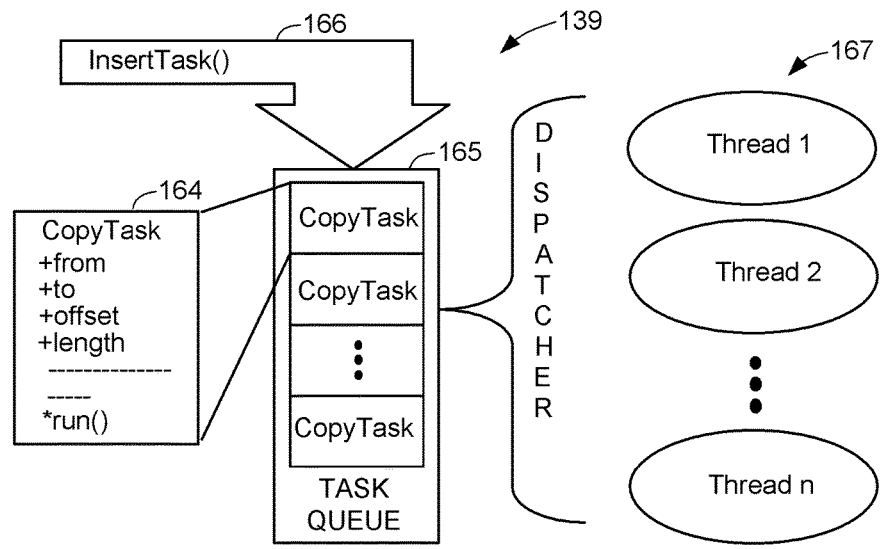
FIG. 6 is a flow diagram of a SYNCer in the demonstration system.

The SYNCer 139 is shown in FIG. 6. In a "copy:" operation, the SYNCer starts drain of the container's content from the SSD FS to the Lustre FS by copying individual CN's directory that contains data files to Lustre FS (/Lustre/foo/hostdirN/). The SYNCer deletes the indication file when the draining is done. When SYNCers finish the job, the whole checkpoint file is stored on the Lustre file system.

The directory/foo/contains metadata directories (/foo/meta) and files (/foo/.plfsaccessxxxx, /foo/hostdirN/index), as well as the data files from all CNs (/foo/hostdirN/dataXXX). A client could read this checkpoint file foo via PLFS on Luster FS.

In the "delete:" operation, the SYNCer deletes the indication file once data is copied to the Luster FS. This step could also be ignored since the existence of indication file would not affect the whole system. In the "fetch:" operation, the Viz tool (163 in FIG. 5) can read the data stored in the SSD FS after "close:" operation.

When MPI_File_Protect_all is not ready, we create the indication file inside MPI_File_close' call. MPI_File_close will do a barrier between all computing processes, and call PLFS' plfs_close. We can change plfs_close to create the indication file on SSD FS.

From MPI2.2 specification, the user is responsible for ensuring that all outstanding non-blocking requests and split collective operations associated with the file handle made by a process have completed before that process calls MPI_File_close. And inside MPI_File_close, a barrier is done before calls plfs_close. So when the indication file is created on SSD FS, all CNs connected to the SSDN have completed their checkpointing—it is safe for SYNCer to start draining when the Trigger 162 detects the creation of indication file.

The SYNCer will not notify the CN of the completion of draining. So in the demo, the blocking semantic of MPI_File_Protect_all and the non-blocking semantic of MPI_File_Iprotect_all are not ensured.

The SYNCer does not free the SSDN's disk space; instead, it is the application's responsibility (by call MPI_File_Delete_all) to delete the drained checkpoint file. For the demo, users can manually delete the checkpoint file on SSDN, or use another script to periodically delete the old checkpoint file.

There are three assumptions for the SYNCer. First, the SYNCer will copy some big files from a local file system to the Lustre file system. There won't be too many such files and those files won't be too small or too big. Second, those files may be appended or truncated. They won't be modified in the same position. Third, those files should be copied in a multi-threaded way. A copy task (164 in FIG. 6) represents a file to be copied to the Lustre file system. It will be inserted onto the task queue 165 using InsertTask( ) API 166. And several threads 167 will check the task queue and run the CopyTask in parallel.

The major procedures of CopyTask.run( ) include a Call stat(to) to get the size of the target file, a Set offset to the size of the target file, set to 0 if the target doesn't exist, a Call stat(from) to get the size of the source file, a Set length to (size of from—offset), If length <=0, return, and Open two files and call sendfile(to, from, offset, length) to do the file copy. If a file is written by several threads concurrently, data corruption may occur. So for data consistency, we should avoid this situation. Since there are only a fixed number of copy threads (typically 8 or 16), it is easier for us to record which file a thread is operating on instead of recording a state for each file.

When we are about to pop a CopyTask from the TaskQueue 165, we could first check whether the CopyTask.from is operating by some other thread now, and if not, we can safely copy it. If it is operated by someone else, then this thread should skip it and check the next task in the queue.

If the SYNCer will be implemented as a library in the future, these codes will be included in the library. According to the file name passed in MPI_Protect_All( ) a list of files to be copied can be constructed. But if the MPI_Protect_All( ) is not ready in time, we need another way to generate the file list for SYNCer. In this case it is the Trigger 162.

Figure 7:
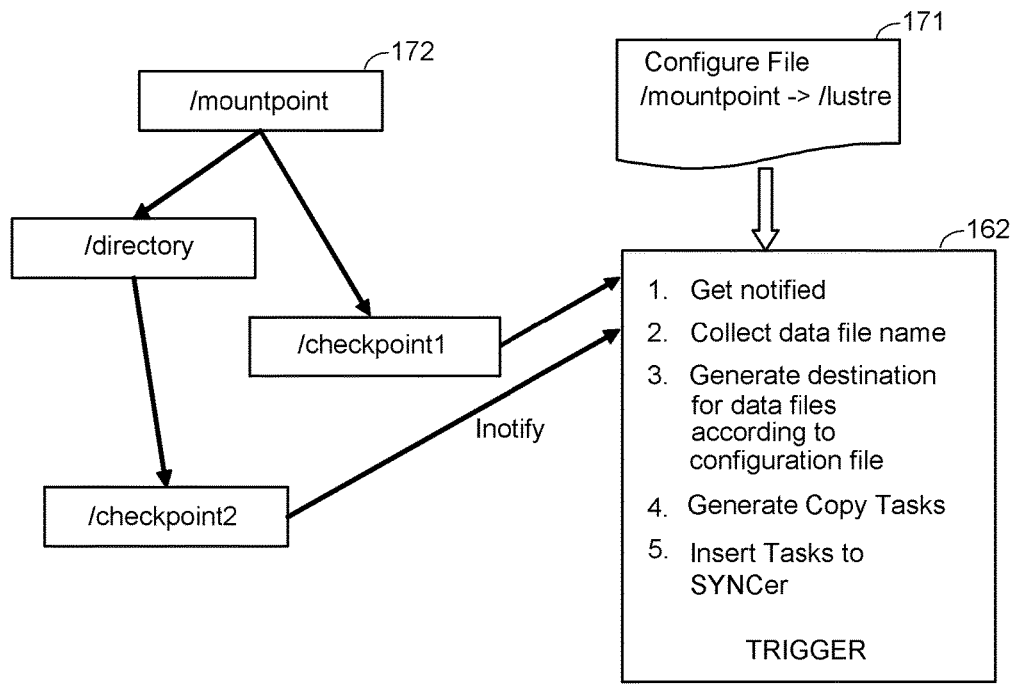
FIG. 7 is a flow diagram of a trigger in the demonstration system.

The Trigger 162 is further shown in FIG. 7. The Trigger generates a list of files when the PLFS file is closed, and sends those files to SYNCer to do the data copy. Inotify can generate a notification when file is created or deleted and it works with NFS. So inotify can be used to monitor the SSD FS. It can identify the PLFS container by the ".plfsaccess113918400" file in it. And once a file (close.hostname.pid for example) is created in its ./openhosts/sub-directory, we could know that the PLFS is closed by this compute node and then we can start to copy the data from the SSD FS to the Lustre FS.

Once "close.hostname.pid" file is created under a PLFS container, the Trigger will call readdir( ) on its hostdir.X subdirectory and get all data file names. Then it will compare the top level directory for the PLFS container to find out the destination for those data files.

Take /mountpoint/checkpoint1 for example, if it is closed. The Trigger will call readdir( ) on /mountpoint/checkpoint1/hostdir.*, and get a list of /mountpoint/checkpoint1/hostdir.X/dropping.data.mtime.hostname.pid. In the configuration file 171, /mountpoint 172 will be associated with /lustre, so CopyTasks copy /mountpoint/checkpoint1/hostdir.X/dropping.data.mtime.hostname.pid to /lustre/checkpoint1/hostdir.X/dropping.data.mtime.hostname.pid will be generated.

If we need to get the status of all CopyTasks belonging to a given PLFS container, in order to know when the SYNCer finishes the job, we can implement an active tasks counter in each PLFS container so that we can know whether all the tasks are done or not. The Trigger needs not to be multi-threaded, because generating the file list won't have too much overhead.

The design goals for the SSDN appliance are defined and targeted to allow check point duration of 5 min for a memory size of 4 TB from 8 CNs connected to each appliance. This translates into a throughput of 12 GB/sec write to the SSDN or 1.5 GB/sec per CN using 4 IB QDR interconnect ports fabric per SSDN and a single port on the CNs.

For the demo system we target a scaled down performance of 500 MB/sec per CN with 32 GB of memory that will result in checkpoint duration of 1 min.

The second design goal will refer to the checkpoint interval that will depend on the target performance of the global FS when Lustre is used as the target FS. We will assume that we use PLFS (see FIG. 8 for the detailed Lustre FS container) and that each disk will deliver 150 MB/sec sequential write performance. With these values we estimated a checkpoint interval target of 60 min that will translate into a FS performance target of 1.2 GB/sec for each SSDN connected to the Lustre FS via a 10 GbE network single port each. If we normalize the number of disks required for each SSDN assuming 150 MB/sec/disk we will need 8 disks per SSDN. With these parameters we will require 1 disk per CN which is a reasonable number of disks for Exascale system.

Figure 8:
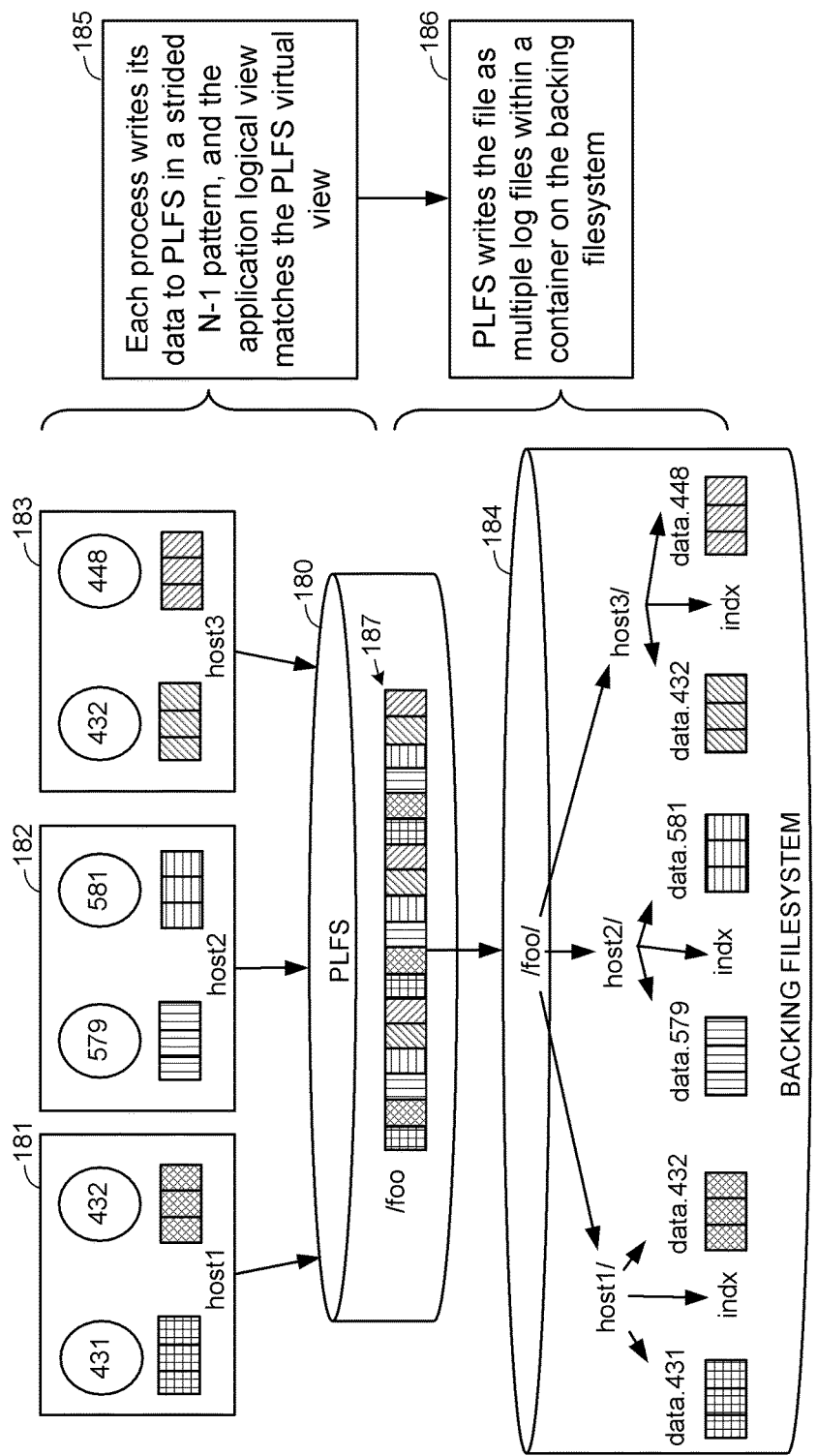
FIG. 8 is a block diagram of a PLFS container structure example.

FIG. 8 provides a summary of PLFS and shows a specific example of a strided N−1 pattern in the PLFS file system 180. As shown in FIG. 8, a number of host processors 181, 182, 183 share the PLFS file system 180, while the data and metadata of the PLFS file system is stored in a backing filesystem 184. PLFS involves two basic operations. In a first operation 185, each process in each host processor writes its data to a file 187 in PLFS 180 in a strided N−1 pattern, and the application logical view matches the PLFS virtual view. In a second operation 186, PLFS writes the file 187 as multiple log files within a container on the backing filesystem 184.

In the example of FIG. 8, each process has a respective process ID that identifies the process in its host processor, and this process ID is also used to identify the respective data container in the backing filesystem 185. For example, in FIG. 8, the first host processor 181 has two processes identified by process IDs "431" and "432", the second host processor 182 has two processes identified by process IDs "579" and "581", and the third host processor 183 has two processes identified by process IDs "432" and "448". The full pathname to the respective data container in the backing store 184 is constructed from the name of a given host processor and the process ID for a given process in this host processor. For example, the data container for the process ID "431" in the first host processor 181 named "host1" has the full pathname of "/foo/host1/data.431".

For the demo again we targeted a scaled down goal of a 5 min checkpoint interval as we only use four CNs with 32 GB of memory each connected to each SSDN box. Assuming that we maintain the same throughput performance as the final design the write throughput to the Lustre FS will be 500 MB/sec for each SSDN. We will use 2 SSDN boxes and 10 disks in RAID-6 8+2 to achieve 1 GB/sec write performance from Lustre FS and using PLFS will achieve 100 MB/sec per disk. The average disk sequential performance of the near-line SAS drives used is only 20 MB/sec, using XDD test on Lustre FS, if we do not use PLFS. The target of the demo is to show the value proposition of the PLFS on Lustre compared to native Lustre as well the value proposition of the SSDN as a performance multiplier. We want to show that by using 60 disks the performance of checkpoint on Lustre without PLFS, 1 GB/sec, will be lower than the performance of checkpoint using the SSDN and PLFS combination, 4 GB/sec for the same number of clients and using just 5 disks. The checkpoint time for the demo system with Lustre will be 4 min compared to less than 1 min using the SSDN PLFS combo. And all will be done this using 50 disks compared to 5 disks or a reduction of 10× in the number of disks. The compute efficiency will be five times lower.

Figure 9:
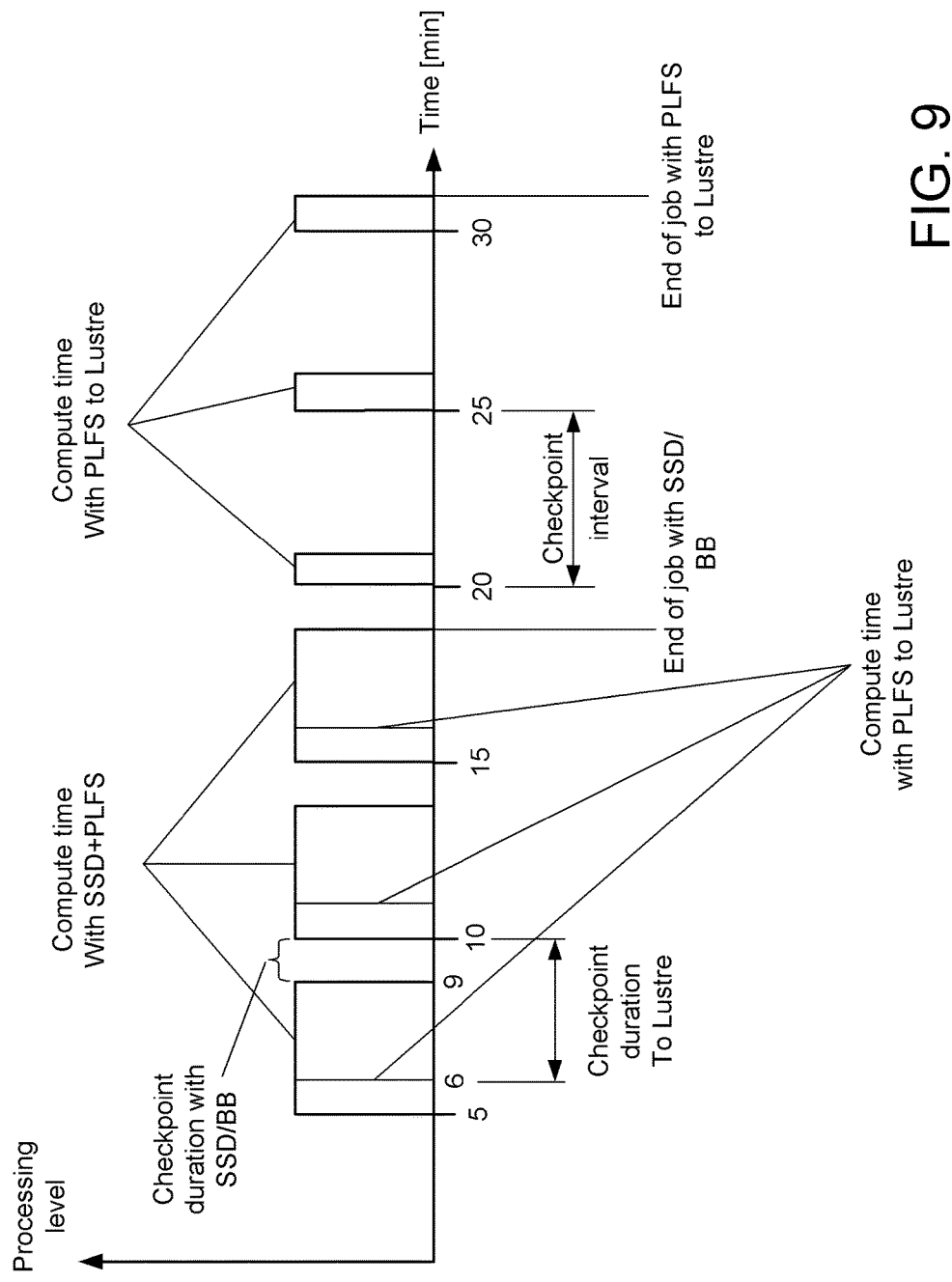
FIG. 9 is a timing diagram of processing of checkpoints with SSDN-PLFS versus with Lustre file system only.

Using the demo system as an example (FIG. 9) using the BB on SSD it takes 1 min to dump the CN checkpoint data to SSDFS leaving 4 min for compute. The system using just Lustre will need 4 min for checkpoint and 1 minute for compute. A 12 minutes job will finish in 15 min with SSD and 30 min without SSD but with PLFS. The checkpoint space with SSD is ½ of the space without as we need less checkpoints (2 versus 5). In addition, the probability of failure is lower as the duration of the job is lower. We will run two small clusters in parallel; one with SSD and one without. The times are based on 32 GB of checkpoint data per CN and 2 GB/sec throughput to each SSD for 4 CNs. These are the targets of the demo that need to be validated experimentally. They assume that the transport protocol is IPoIB and we will not need RDMA to achieve the goals of the demo. Also based on the hardware specifications we should be able to achieve higher throughputs to the SSDN up to 8 GB/sec, or 2 GB/sec per CN, but we need to validate that it is possible to get 2 GB/sec from the CNs using IPoIB on QDR.

If we will be able to achieve the speeds according to the specifications without using RDMA we could demonstrate the impact of SSDN on Exascale systems using a ratio of 4:1 CNs per SSDN as follows and the mathematical model based on Gary Grider's Exascale PowerPoint presentation at MSST 2011 (see Gary Grider, "Exa-Scale FSIO," MSST 2011 Symposium on Massive Storage Systems and Technologies, May 23-27, Denver, Colo.):

Total memory of Exascale SC: 60 PB
Checkpoint time: 300 sec
Total throughput required for Exaflops: 200 TB/sec
Throughput per CN (assuming 100,000 CNs): 2 GB/sec
Throughput per SSDN (assuming 10,000 SSDNs): 20 GB/sec So if we succeed to demo that each CN will do 2 GB/sec to the SSDN by scaling linearly the demo system we will be able to achieve the required I/O throughput required for an Exascale SC machine. Moreover as the theoretical maximum throughput of the prototype SSDN-BB appliance is 20 GB, we will be able to reduce the number of SSDN-BB boxes by a factor of 2.5 that will require only 10000 SSDN-BB appliances to achieve the target of 200 TB/sec for the example above.

Let's look at the disk subsystem requirements that will allow a checkpoint interval of 60 minutes. We will need to drain each 60 PB of checkpoint data to the disk subsystem in 60 min which will require a global FS throughput of 16.6 TB/sec and will require 30,000 disks (assuming 500 MB/sec/disk). Assuming that we use 10,000 SSDN-BB appliances we will need a throughput of 1.66 GB/sec from each SSDN to the global FS. So two 10 GbE ports, or one 40 GbE port, to the storage system will be enough to achieve 1.66 GB/sec. Using this model each SSDN will achieve a factor of twelve times slow down from SC I/O to the global FS I/O. Of course if the MTTI of the SC will be high enough we can increase the checkpoint interval to 120 min and reduce the number of disks accordingly.

We will be able to demonstrate that using a compute brick/unit similar to the one in the demo multiplied by 2500 and using enough cores will be able to fulfill the I/O needs of an Exascale SC.

19. Simulation Method and Model for the Supercomputer

A demo system for the supercomputer of FIG. 1 including the SSD nodes was described above with respect to FIGS. 4 to 9. This demo system is based on the following simulation model:

% Simulation Model 6 of SC11 demo system
% NoD is 5; and we use 5 min checkpoint time
% Parameters definition
CNs=8; % Number of CNs in the Super Computer; SCores=500000
Cores=8; % Number of cores per CN assuming dual socket Sandy Bridge
GFPC=5; % Giga Flops Per Core [GB];
Flops=0.7*GFPC; % Computation giga flops
DISC=0.3*GFPC; % Data Gigaflops=processing used for data IO for the simulation
CKPT=300; % Checkpoint interval; 5 min
THPT=0.25; % Installed disk throughput [GB/sec]
SPACE=15000; % Disk system capacity [GB]
MPC=0.5; % Memory per core [GB]
NoBoxes=1; % Number of storage cabinets
DPC=5; % Number of 3 TB disks per cabinet
CNPSSDN=4; % No. of CNs connected to each SSDN; SSDN design parameter
GBPSSDN=1; % SSDN inbound throughput [GB/s]; SSDN design parameter
NoDpfs=DPC*NoBoxes; % Number of disks used by Lustre
GBPDpfs=THPT/NoDpfs; % GB per disk according to LLNL configuration with Lustre [GB/s]
GBPDplfs=0.1; % Disk average throughput with PLFS [GB/s]
MEMTotal=CNs*Cores*MPC; % Total memory size assuming 2 GB/core

```
ckptPFS=round(MEMTotal/THPT); % checkpoint time
for the PFS on Sequoia ckptPLFS=round(ckptPFS/
GBPDplfs*GBPDpfs); % checkpoint time for PLFS on PFS
on Sequoia
    THPTplfs=MEMTotal/ckptPLFS; % FS disk throughput
for checkpoint time of ckptPLFS
    NoDplfs=round(THPTplfs/GBPDplfs); % No of disks
required to PLFS for checkpoint
    % Correction to SSDN+PLFS IO model factoring I/O
retries on errors and BW used by Viz
    % We assume that the Viz read will eat some BW of
draining and introduce a C sec factor
    C=24; % C correction factor
    % We assume that additional throughput lost due to I/O
error retries a L seconds factor
    L=18; % L correction factor
    % Corrected number of disks required to SSDN for drain
from SSD to PFS using PLFS speeds
    NoDssdn=round(MEMTotal/(CKPT-C-L-ckptPLFS)/
GBPDplfs);
    Reduction=NoDpfs/NoDssdn; % Reduction factor of no.
of disk using SSDN+PLFS
    NoSSDN=CNs/CNPSSDN; % No of SSDN boxes
    ckptSSDN=MEMTotal/GBPSSDN/NoSSDN; % Check-
point time using SSDN
    THPTssdn=MEMTotal/ckptSSDN; % Checkpoint time
using SSDN
    GBPDssdn=THPTssdn/NoDssdn; % Equivalent disk
speed using SSDN+PLFS
    % Compute system simulation assuming constant I/O
performance; constant number of disks
    Tckpt=1:3600*2; % Time of a run [sec] assuming 2 h job
    % Computation level time signal: Compute=1; check-
point=0 for Lustre PFS
    CPUpfs=[ones(length(Tckpt)/CKPT,CKPT-ckptPFS)
zeros(length(Tckpt)/CKPT,ckptPFS)];
    % Computation level time signal: Compute=1; check-
point=0 for PLFS on Lustre PFS
    CPUplfs=[ones(length(Tckpt)/CKPT,CKPT-ckptPLFS)
zeros(length(Tckpt)/CKPT,ckptPLFS)];
    % Computation level time signal: Compute=1; check-
point=0 for PLFS on SSDN-BB
    CPUssdn=[ones(length(Tckpt)/CKPT, CKPT-ckptSSDN)
zeros(length(Tckpt)/CKPT,ckptSSDN)];
    % Create a vector from the time signal
    cpuPFS=CPUpfs(:)';
    cpuPLFS=CPUplfs(:)';
    cpuSSDN=CPUssdn(:)';
    % Multiply time series by flops level during each compute
interval: 20 PFlops
    PFS=CNs*Cores*GFPC*cpuPFS;
    PLFS=CNs*Cores*GFPC*cpuPLFS;
    SSDN=CNs*Cores*GFPC*cpuSSDN;
    % Simulate a job running on the SC by Integral of the time
series for each case
    pfs=zeros(size(Tckpt'));
    plfs=zeros(size(Tckpt'));
    ssdn=zeros(size(Tckpt'));
    for i=1:length(Tckpt),
    pfs(i)=sum(PFS(1:i))/1000000;
    plfs(i)=sum(PLFS(1:i))/1000000;
    ssdn(i)=sum(SSDN(1:i))/1000000;
    end
    % Compute runtime for all the 3 cases
    Rpfs=Tckpt(end); % PFS runtime is the longest until
performing the entire simulation
    Rplfs=Tckpt(min(find(plfs(:)>=max(pfs)))); % PLFS run-
time when flops equal PFS flops
    Rssdn=Tckpt(min(find(ssdn(:)>=max(pfs)))); % SSDN+
PLFS runtime when flops equal PFS flops
    % Compute number of checkpoints: floor of the runtime
over checkpoint interval
    NCPpfs=Rpfs/CKPT;
    NCPplfs=floor(Rplfs/CKPT);
    NCPssdn=floor(Rssdn/CKPT);
    % Display the job run as flops of execution at time t
    figure(1);plot(Tckpt/60,[pfs plfs ssdn])
    grid;axis([0 Rpfs/60 0 pfs(end)])
    xlabel('Time [min]');ylabel('Total # of Flops of the Sim
Job in [tera-flops]')
    title('Runtime of a 2 h job on demo machine with SSDN+
PLFS, PLFS/Lustre or Lustre')
    text1=['We assumed: CNs='num2str(CNs)', Cores/
CN='num2str(Cores)',
    Gflops/core='num2str(GFPC)', GB/s/SSDN='num2str
(MPC)];
    text(32.0737,0.2781,text1); %'We assumed: CNs=25000,
Core/CN=10, Gflops/core=40, GB/s/SSDN=2.5')
    text(31.2442,0.1313,['Flops and DISC ops are done on
CNs; ckpt interval='num2str(CKPT/60)'min'])
    text2=['Compute/Ckpt ratios: SSDN='num2str(CKPT/
60)'/'num2str(ckptSSDN)',PLFS on PFS='num2str(CKPT/
60)'/'num2str(ckptPLFS)' and PFS='num2str(CKPT/60)'/
'num2str(ckptPFS)];
    text(19.0783,0.0232,text2);
    Rssdn1=[num2str(floor(Rssdn/3600))':'num2str(floor
((Rssdn-floor(Rssdn/3600)*3600)/60))'h'];
    Rplfs1=[num2str(floor(Rplfs/3600))':'num2str(floor
((Rplfs-floor(Rplfs/3600)*3600)/60))'h'];
    Rpfs1=[num2str(floor(Rpfs/3600))':'num2str(floor
((Rpfs-floor(Rpfs/3600)*3600)/60))'h'];
    text(24.8848,1.2360,['Runtimes: SSDN+
PLFS='Rssdn1'; PLFS='Rplfs1'; Lustre='Rpfs1'])
    % Simulation model using Active Storage in the SSDN to
offload 30% of compute resources
    % from the CNs used for data analysis not simulation. We
assume that the checkpoint time
    % is same as when using SSDN+PLFS and CNs=12500
and each CN will do 30% more simulation
    % flops.
    CoreSSDN=round(0.3*Cores*CNPSSDN); % Number of
cores per SSDN design parameter
    % We assume the number of cores on SSDN is same as
the number of cores offload from CNs
    CNsAS=round(CNs/1.3); % New number of CN is 30%
lower than CNs as it has 30% more flops
    MEMTotalAS=CNsAS*Cores*MPC; % new memory of
the SC is lower as we use less CNs and we % kept the
memory per core a constant so it will be 30% lower
    THPTAS=MEMTotalAS/ckptSSDN; % We assume that
the checkpoint time is same as SSDN before
    % Total number of components in the SC including SSDN
    SCTotalAS=CNsAS+ceil(CNsAS/CNPSSDN);
    TPCN=THPTAS/CNsAS; % Throughput per CN
    TPSSDN=TPCN*CNPSSDN; % Throughput per SSDN
    % Corrected number of disks required to SSDN for drain
from SSD to PFS using PLFS speeds
    NoDAS=round(MEMTotalAS/(CKPT-C-L-ckptSSDN)/
GBPDplfs);
    % Reduction in number of components
    CReduction=(CNs+NoSSDN)/SCTotalAS;
```

```
% Model of adding SSDN versus adding more CNs to
reduce job time
% - - -
% Make corrections of ckpt time for new number of cores
assume that the total flops
% using SSDN equals total flops using more CNs and the
throughput of new SC is same as
% throughput of old SC using PFS. We will use a
quadratic equation to find the number of
% CNs to compensate for flops lost due to long time of
checkpoint. We keep the number of
% flops per simulation run constant equal to old value and
we keep the total FS
BW
% constant and increase number of CNs to achieve same
flops as old with SSDN+PLFS.
%          (ckptPFS/CNs)*x^2-CKPT*x+CNs*(CKPT-
ckptBB)=0
   ckptNew=220; % assuming 3 minutes checkpoint time
   CNNew=round(roots([ckptNew/CNs   -CKPT   CNs*
(CKPT-ckptSSDN)]));
   CNNew=CNNew(2);
   CNNew=14;
   ckptNew=140;
% Model of I/O subsystem assuming LLNL I/O data and
previous model for compute;
   % compute new ckpt time
   MEMNew=CNNew*Cores*MPC;
   THIPTNew=MEMNew/ckptNew;
   % Computation level time signal: Compute=1; check-
point=0 for modified PFS with old bw
   CPUNew=[ones(length(Tckpt)/CKPT,CKPT-ckptNew)
zeros(length(Tckpt)/CKPT,ckptNew)];
   cpuNew=CPUNew(:);
   % Multiply time series by flops level during each compute
interval: 1 PFlops
   PFSNew=CNNew*Cores*GFPC*cpuNew;
   % Simulate a job running on the SC by Integral of the time
series for new case
   pfsNEW=zeros(size(Tckpt'));
   for i=1:length(Tckpt),
   pfsNEW(i)=sum(PFSNew(1:i))/1000000;
   end
   RpfsN=Tckpt(min(find(pfsNEW(:)>=max(pfs)))); % PFS
new runtime when flops equal PFS flops
   figure(2);
   plot(Tckpt/60,[pfsNEW pfs ssdn])
   grid;axis([0 Rpfs/60 0 pfs(end)])
   xlabel('Time [min]');ylabel('Total # of Flops of the Sim
Job in [tera-flops]')
   title('Runtime of a 2 h job on SC11 Demo machine with
SSDN+PLFS, Lustre and new bigger Lustre')
   text1=['New number of CNs='num2str(CNNew)', Cores/
CN='num2str(Cores)',   Gflops/core='num2str(GFPC)',
GB/s/SSDN='num2str(MPC)];
   text(32.0737,0.2781,text1); %'We assumed: CNs=25000,
Core/CN=10, Gflops/core=40, GB/s/SSDN=2.5')
   text(31.2442,0.1313,['Flops and DISC ops are done on
CNs; ckpt interval='num2str(CKPT/60)'min']);
   text2=['Compute/Ckpt ratios: SSDN='num2str(CKPT/
60)'/'num2str(round(ckptSSDN/60))',new   PFS='num2str
(CKPT/60)'/'num2str(round(ckptNew/60))'           and
PFS='num2str(CKPT/60)'/'num2str(round(ckptPFS/60))];
   text(19.0783,0.0232,text2);
   Rssdn1=[num2str(floor(Rssdn/3600))':'num2str(floor
((Rssdn-floor(Rssdn/3600)*3600)/60))'h'];
   Rplfs1=[num2str(floor(Rpfs/3600))':'num2str(floor
((Rpfs-floor(Rpfs/3600)*3600)/60))'h'];
   Rpfs1=[num2     str(floor(RpfsN/3600))':'num2str(floor
((RpfsN-floor(RpfsN/3600)*3600)/60))'h'];
   text(24.8848,1.2360,['Runtimes:           SSDN+
PLFS='Rssdn1'; New='Rpfs1'; Old='Rplfs1'])
```

As should be evident from the above computer code listing, the simulation model is defined by a simulation program including a model of the system of compute nodes and a model of the I/O subsystem and also including computer instructions that, when loaded into program memory and executed by a data processor (such as the control station computer 22 in FIG. 1), perform a simulation method. The simulation method includes receiving input parameters defining the system of compute nodes and input parameters defining the I/O subsystem; computing a total number of computational flops for a time between checkpoints and an amount of disk storage required to store the checkpoint data for the configuration of the parallel supercomputing cluster; and presenting a summary to a user of the computed number of computational flops for a time between checkpoints and an amount of disk storage required to store the checkpoint data.

This simulation model not only enables the performance of the system of FIG. 1 to be determined, but it also can be modified to provide a comparison between supercomputer systems having different architectures. In particular, as discussed above, Exascale is coming. The storage stack needs to be re-architected due to changing economics. We created a model to explore the design space. We modeled both the supercomputer computation system as well as the I/O subsystem. We are using the model both for evaluating the computational efficiency and the efficiency of the disk subsystem as well as a design tool that will allow provisioning of the disk storage and the I/O subsystems.

All the parameters of the model were defined according to publically available data as well as the parameters of the demo system. We validated the model using the real measurements from the small demo system and we extrapolated to a full scale supercomputer. Here is a table containing the input parameters given to the model. The parameters of the Compute model are summarized in the following Table I:

| Name | Description | Demo Value | Sequoia Value |
|---|---|---|---|
| $C_N$ | Number of compute nodes | 8 | 98304 |
| $C_{core}$ | Number of cores per compute node used for simulation | 8 | 16 |
| $F_{core}$ | Flops per core (at SC maximum Linpack speed) [GF/sec/core] | 1.6 | 128 |
| $I_{ckpt}$ | Time interval between checkpoints [sec] | 300 | 3600 |
| $M_{core}$ | RAM memory per core [GB] | 0.25 | 1 |
| $C_{BB}$ | Number of compute nodes per burst buffer node (BB Design Parameter) | 4 | 49 |
| $T_{BB}$ | Write throughput from all CN to the BB [GB/sec] (BB Design Parameter) | 0.5 | 5 |
| $N_{core}$ | Total number of compute cores in the SC | 64 | 1,600,000 |
| $T_{flop}$ | Total number of Linpack flops of the SC [Tflops] | 0.1 (measured using Matlab) | 20,000 (spec.) |

The parameters of the I/O subsystem model are defined in the following Table II:

| Name | Description | Demo Value | Sequoia Value |
|---|---|---|---|
| $T_{disk}$ | Raw throughput of the disk and RAID subsystem [GB/sec] | 0.135 (measured) | 1000 |
| $C_{disk}$ | Total usable storage capacity of the disk subsystem to store 30 checkpoints [GB] | 12,000 | 50,000,000 |
| $M_{ckpt}$ | Total checkpoint memory of the SC [GB] | 16 | 1,600,000 |
| $N_{disk}$ | Total number of disks in the storage system | 5 | 18,000 |
| $D_{plfs}$ | Disk throughput of N-to-1 with PLFS on Lustre [MB/sec] | 54 (measured) | 110 (estimated) |
| $D_{raw}$ | Disk raw throughput according to spec. [MB/sec] | 27 (measured) | 55 (computed) |
| $T_{ckpt}$ | Time to write the checkpoint for Lustre [sec] | 120 (measured) | 1500 (computed) |
| $N_{BB}$ | Number of burst buffer nodes used by the SC (BB Design Parameter) | 2 (available) | 2000 (model) |
| E | Correction factor for I/O error from BB to Lustre [sec] | 30 (estimated) | 480 |
| V | Correction factor for Viz read throughput interference to drain of data [sec] | 15 (estimated) | 360 |

The simulation model calculates the checkpoint time for three cases. The first case is a basic configuration using Lustre file system clients, running in the compute nodes, and the checkpoint target time specified in the spec of the supercomputer. The second case is an I/O system using PLFS on the compute nodes on top of the Lustre file system mounted on each compute node. The third case is an I/O system using PLFS on the compute node and writing to a burst buffer that each compute node is connected to. The data is written to the BB using MPI-IO during the Tckpt time (MPI job paused) and it is "drained" to the Lustre FS during the MPI job compute time between checkpoints:

$$\Delta drain = Ickpt - Tckpt - E - V$$

where:

E—correction factor accounting for retries due to I/O errors during drain

V—correction factor accounting for read throughput of the Viz application.

Using these values we calculate the checkpoint time and the compute time between checkpoints for each of the above defined cases and then the model builds a time series for each of the cases as follows:

$$Tflop \text{ iff } 0 < t < Ickpt - Tckpt$$

$$Si(t) =$$

$$0 \text{ iff } Ickpt - Tckpt < t < Ickpt$$

where i=1, 2, 3

The last step is to compute the total number of computation flops C for each checkpoint interval for each of the 3 cases by integral of the time series.

$$Ci(t) = \int Si(t) dt$$

The model calculates also the number of disks required to achieve the throughput to allow drain from the BB to the Lustre FS during the time between the checkpoints assuming the corrections defined above. The model assumes that the SC using Lustre FS for I/Os will finish the application/simulation run in the time defined by the simulation parameter, one hour for demo and one day for the Sequoia model, and uses the total number of flops to determine the time when the other systems, using either PLFS and BB or both achieve the same flops as the Lustre FS. As the system using the BB+PLFS is more compute efficient it will finish the simulation faster than Lustre FS case. The simulation model will estimate the run time, Ri, for each of the three case.

The outputs of the model include the following variables:

Pi—the number of checkpoints actually written for each case: 1, 2 and 3

Ri—the runtime for each case

Di—minimum number of disks required to achieve the throughput needed for each case di—minimum number of disks for capacity required for storing Pi checkpoints, 30 for Lustre Si(t) and Ci(t)—the time series of the flops/sec and total flops (graphics)

Using the set of parameters defined in Tables I and II above in the column for the demo system, we get the results in the following Table III:

| Name | Description | Demo Value | Sequoia Value |
|---|---|---|---|
| $T_{disk}$ | Raw throughput of the disk and RAID subsystem [GB/sec] | 0.135 (measured) | 1000 |
| $C_{disk}$ | Total usable storage capacity of the disk subsystem to store 30 checkpoints [GB] | 12,000 | 50,000,000 |
| $M_{ckpt}$ | Total checkpoint memory of the SC [GB] | 16 | 1,600,000 |
| $N_{disk}$ | Total number of disks in the storage system | 5 | 18,000 |
| $D_{plfs}$ | Disk throughput of N-to-1 with PLFS on Lustre [MB/sec] | 54 (measured) | 110 (estimated) |
| $D_{raw}$ | Disk raw throughput according to spec. [MB/sec] | 27 (measured) | 55 (computed) |
| $T_{ckpt}$ | Time to write the checkpoint for Lustre [sec] | 120 (measured) | 1500 (computed) |
| $N_{BB}$ | Number of burst buffer nodes used by the Sc (BB Design Parameter) | 2 (available) | 2000 (model) |
| E | Correction factor for I/O error from BB to Lustre [sec] | 30 (estimated) | 480 |
| V | Correction factor for Viz read throughput interference to drain of data [sec] | 15 (estimated) | 360 |

The model matches closely the measurements and validates the simulation model of the Demo system.

Using the parameters of the Sequoia system, that will deliver 20 Pflops, are included in the last columns in Tables I and II. We used the same model and extrapolated to the Sequia system and simulating the same three cases we got the results in the following Table IV:

| Variable/Usecase | $P_i$ | $R_i$ [sec] | Ratio of runtimes | $D_i$ | $d_i$ |
|---|---|---|---|---|---|
| Lustre | 30 | 7200 | 1 | 5 | 4 |
| PLFS + Lustre | 22 | 5028 | 0.7 | 5 | 4 |
| PLFS + Lustre (measured) | 23 | 4980 | 0.69 | 5 | 4 |
| PLFS + BB | 18 | 4086 | 0.56 | 3 | 3 |
| PLFS + BB (measured) | 19 | 4160 | 0.57 | 3 | 3 |

We can conclude that assuming the model built here we can estimate the behavior of an Exascale supercomputer with a certain level of accuracy that will allow specification of all the pertinent components of the I/O subsystem. We are able to update the model to accommodate additional architectures either evolutionary or revolutionary and refine the model accordingly.

Figure 10:
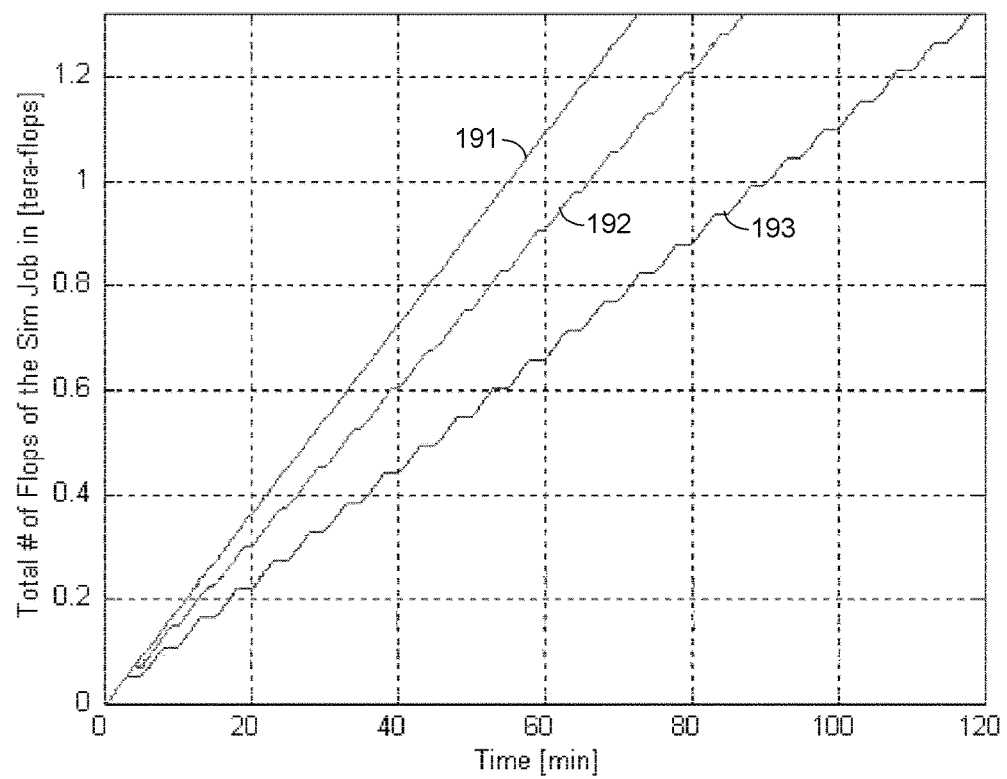
FIG. 10 is a graph of the total number of flops as a function of time as computed by a simulator for a first size of a supercomputer for three different architectures.

FIG. 10 shows the modeled computational efficiency over time of the demo system during the runtime of a two hour job on Lustre. The runtime for this job on SSDN+PLFS would be 1.12 hours, and the runtime for this job on PLFS would be 1.26 hours, according to the simulation model. The simulation model assumed the number of CNs=8, Cores/CN=8, Gflops/core=5, GB/s/SSDN=0.5, the flops and DISC ops are done on CNs, the checkpoint interval=5 min, and the compute/checkpoint ratios are SSDN=5/16, PLFS on PFS=5/64, and PFS=5/128.

In FIG. 10, each line shows the performance achievable using a particular one of three different storage stacks. The top line 191 shows the performance of the PLFS-SSDN architecture, the middle line 192 shows the performance gained using PLFS directly on the parallel file system (i.e. Lustre) without the SSDN nodes, and finally the bottom line 193 shows the performance when checkpointing directly to the parallel file system.

The key observation is that the system with both SSDN and PLFS is capable of the largest computational efficiency. Not shown is the additional benefit that such a system allows co-processing of the visualization on the SSDNs. This co-processing allows computational steering in real-time without delaying or perturbing the foreground simulation.

In the demo, to ensure a fair comparison, the stack using the parallel file system only uses the compute resources on the SSDNs to also do co-processed visualization. All stacks produce a sequence of images: one for each time step where a time step consist of a computational phase, a checkpoint process in which the computational state is saved persistently, and then a visualization routine which converts the checkpoint data into an image. The efficiency of the three software stacks is easily shown by the duration between the creations of successive images.

Figure 11:
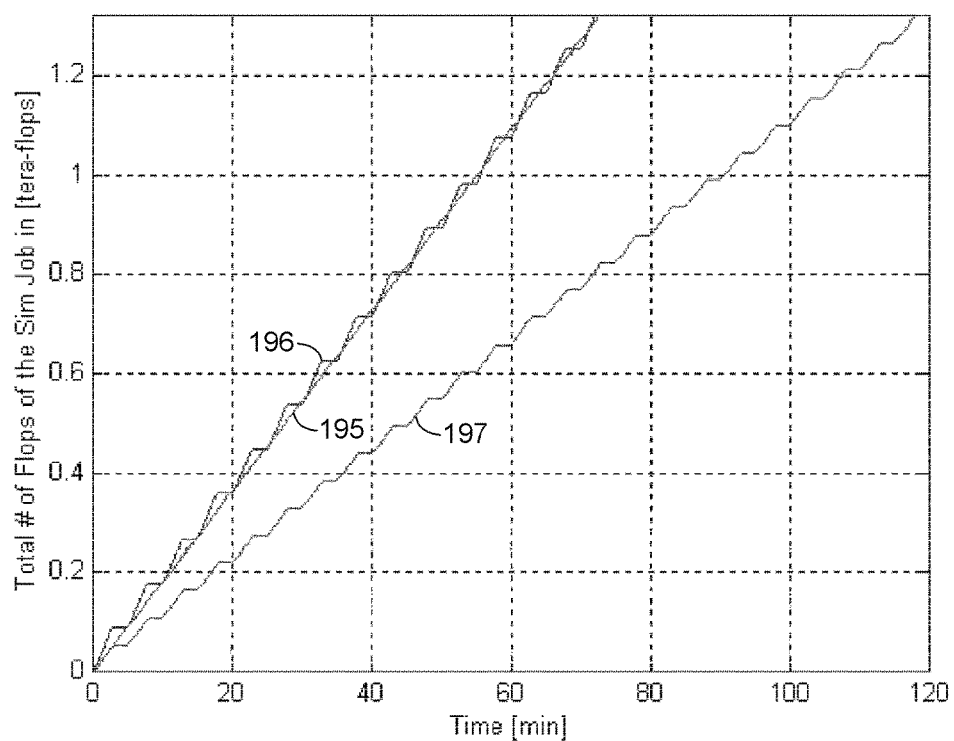
FIG. 11 is a graph of the total number of flops as a function of time as computed by a simulator for a second size of a supercomputer for three different architectures.

FIG. 11 demonstrates that the increased efficiency of the PLFS+SSDN storage stack is possible using other methods. FIG. 11 shows the modeled computational efficiency over time of the demo system during the runtime of a two hour job on Lustre. The runtime for this job on SSDN+PFS would be 1.12 hours, and the runtime for this job on a new bigger Lustre would be 1.11 hours. The simulation model assumed the number of CNs=14, Cores/CN=8, Gflops/core=5, GB/s/SSDN=0.5, flops and DISC ops are done on CNs, checkpoint interval=5 min, and compute/checkpoint ratios of SSDN=5/0, new PFS=5/2, and PFS=5/2.

In FIG. 11, the efficiency of the PLFS+SSDN solution is shown by the middle line 195, and this is compared to a different system without PLFS+SSDN but augmented instead with twice as many compute nodes and fifty percent more disks to provide a similar performance shown in the top line 196. The bottom line 197 is the efficiency achievable using the same resources as the PLFS+SSDN stack but without utilizing PLFS+SSDN. Although the top line 196 achieves the same efficiency as the PLFS+SSDN approach, there are multiple disadvantages, including: (1) more compute resources decreases the MTTI of the system which requires more frequent checkpointing; (2) doubling the compute nodes is a much more expensive solution than adding the PLFS+SSDN stack; and (3) the lack of a dedicated SSDN hierarchy prevents co-processed visualization. Although a subset of the compute nodes could be used for visualization, doing so introduces jitter into the simulation.

In conclusion, the tremendous number of cores and the total aggregate memory of Exascale computers disallow efficient computation with existing storage architectures. In order to maintain current levels of computational utilization, the requirements for storage bandwidth and storage capacity as a function of the size of the machine must be maintained. However, changing economics and disk characteristics changes this equation in the Exascale era. Disks are priced for capacity such that increasingly dense disks provide more capacity per dollar but fewer operations per byte per dollar. Through the Petascale era, the required number of disks for capacity was sufficient for the bandwidth requirement as well; however, the denser disks in the Exascale era will not provide enough bandwidth. A solution is to use higher performing emerging storage technologies such as solid state devices. These devices provide a cost-efficient means to purchase sufficient bandwidth for Exascale storage requirements; however, their byte per dollar cost is too high for the capacity requirement. A hybrid, hierarchical solution is the only way forward. Unfortunately, interposing new hardware into the existing storage stack is not trivial. Such an approach requires careful integration into the software stack as well. Our proposal is to create specialized burst buffer nodes with multiple SSDs carefully coordinated and managed by a middleware file system such as PLFS.

Figure 12:
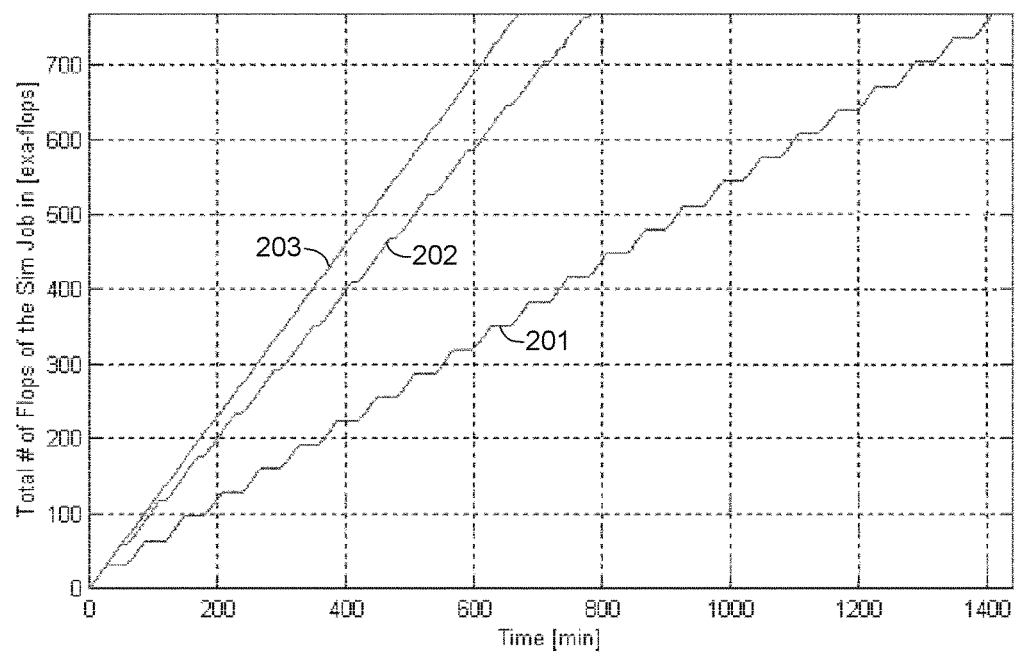
FIG. 12 is a graph of the total number of flops as a function of time as computed by a simulator for a third size of a supercomputer for three different architectures.

FIG. 12 shows computational efficiency over time for three different storage architectures. The results in FIG. 12 were over the runtime of a one day job on Lustre on the Sequoia supercomputer. The runtime for this job on SSDN+PLFS would be 11.09 hours, and the runtime for this job on PLFS would be 11.09 hours, according to the simulation model. The simulation model assumed the number of CNs=2500, Core/CN=10, Gflops/core=40, GB/s/SSDN=2.5, flops and DISC are done on CNs, the checkpoint interval=60 minutes, and the computer/checkpoint ratios are SSDN=60/3, PLFS on PFS=60/11 and PFS=60/33.

In FIG. 12, checkpointing directly to the parallel file system is shown in the bottom line 201, checkpointing to the parallel file system through PLFS is shown in the middle line 202, and finally checkpointing to the SSDN through PLFS is shown in the top line 203. The numbers are derived from Lawrence Livermore's RFP for their 20 petaflop Sequoia supercomputer. In addition to more efficient computation, the SSDN architecture also allows Active Storage. For example, as the simulation progresses on the compute nodes, visualization and data analysis is performed in parallel on the SSDNs.

We have heard from many scientists across multiple DOE laboratories that the existing computational simulations currently spend up to 30% of their time doing data analysis. The transformative observation from our model is that the SSDN architecture can offload this data analysis to the SSDNs. By doing so, the supercomputer can reduce its number of compute nodes by 30% and still achieve the same compute efficiency. Notice that this Active Storage effect does not change the above graph. In particular, the PLFS+SSDN performance is unchanged but is achieved at a lower cost due to a 30% reduction in the number of compute nodes and a corresponding reduction of resources throughout the storage stack due to reduced bandwidth and capacity requirements (i.e. fewer compute nodes have less memory thereby stressing the storage system less).

This Active Storage concept is uniquely enabled by the SSDN+PLFS architecture and has significant financial implications for the design of the eventual Sequoia supercomputer, as summarized in the following Table V.

| Components | Lustre | PLFS + Lustre | SSDN + PLFS | SSDN + PLFS + AS |
| --- | --- | --- | --- | --- |
| Disks | 18000 | 17920 | 10000 | 7692 |
| SSDNs | 0 | 0 | 2500 | 1923 |

| Components | Lustre | PLFS + Lustre | SSDN + PLFS | SSDN + PLFS + AS |
|---|---|---|---|---|
| CNs | 25000 | 25000 | 25000 | 19231 |
| Petaflops | 9.6 | 17.1 | 20 | 20 |
| Cost ($M) | 138 | 138 | 145 | 132 |
| $M/PF | 14.4 | 8.1 | 7.4 | 6.8 |

Figure 13:
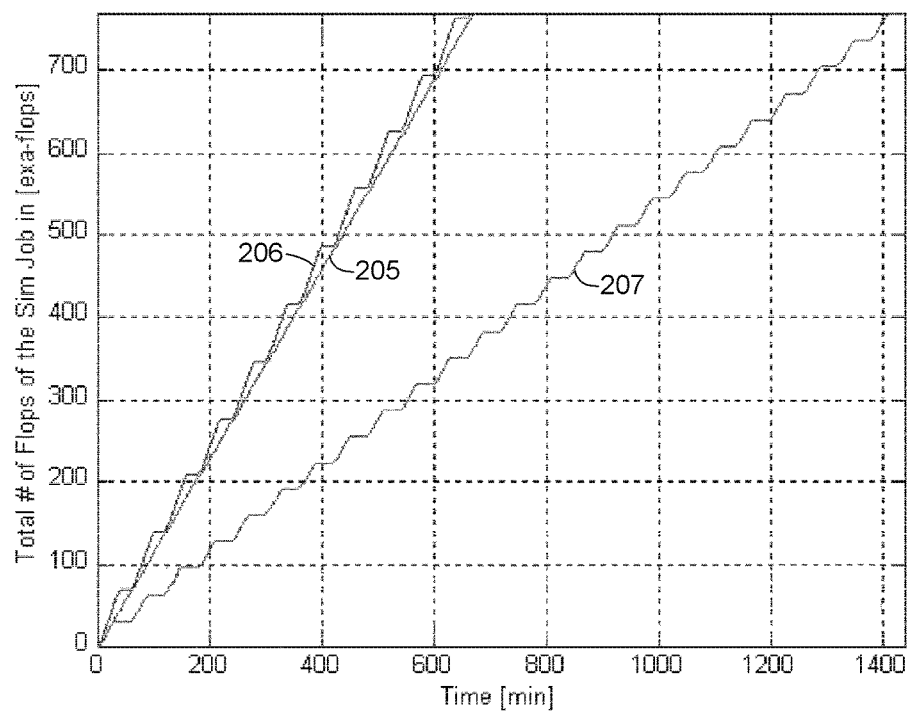
FIG. 13 is a graph of the total number of flops as a function of time as computed by a simulator for a fourth size of a supercomputer for three different architectures.

FIG. 13 shows an example of a Sequoia supercomputer simulation, in which we demonstrate that the increased efficiency of the PLFS+SSDN storage stack is possible using other methods. The simulation was for a one hour job on Lustre. The runtime for this job on SSDN+PLFS would be 11.9 hours, and the runtime for this job on a new bigger Lustre would be 11.2 hours, according to the simulation model. The simulation model assumed a new number of CNs=2815, cores/CN=20, Gflops/core=40, GB/s/SSDN=2.5, the flops and DISC operations done on CNs, checkpoint interval=60 min, and compute/checkpoint ratios of SSDN=60/3, new PFS=60/23, and PFS=60/33.

FIG. 13 compares the efficiency of the PLFS+SSDN solution in the middle line 205 to a different system without PLFS+SSDN but augmented instead with 29815 compute nodes and 30% percent more disks resulting in the efficiency in the top line 206. The bottom line 207 is the efficiency achievable using the same resources as the PLFS+SSDN stack but without utilizing PLFS+SSDN.

In the example of FIG. 13 the number of disks for performance with SSDN is only 5,733. The number of disks for performance with SSDN and Active Storage offload of 30% is 3,550. The number of disks for capacity assuming 30 checkpoints with Active Storage offload 30% is 7,692. The number of disks with SSDN (with or without AS due to capacity requirement) for 30 checkpoints is 10,000. The number of disks with Lustre is 18,000. The number of disks with PLFS is 17,990. The number of CNs+SSDNs with Active Storage is 21,155. The number of components without Active Storage is 27,500. The reduction in the number of components due to Active Storage usage is 30%.

The summary basic cost of the system assuming $0.25/GB disk is $750; CN is $5K with 42 checkpoints. The total cost is $138M and runtime is 24 hours.

The summary cost with SSDN assuming $0.25/GB disk is $750; CN is $5K; SSDN is $10K, with 30 checkpoints. The total is $145M and runtime improvement of 50% down to 12 hours.

The summary cost with SSDN and AS and $0.25/GB disk is $750; CN is $5K; SSDN+Active Storage is $15K, with 30 checkpoints. The total is $132M and runtime improvement of 50% down to 12 hours.

In conclusion, SSDN+PLFS+Active Storage reduces the cost of the system and the number of components while increasing the efficiency of the supercomputer. Using just PLFS alone doesn't reduce the cost but increases the efficiency of the system by 40%.

This conclusion should be overly conservative because fewer components means longer MTTI means less frequent checkpoints. This conclusion should also be overly conservative because SSDN allows co-processed visibility whereas a system without SSDN does the visibility computations on compute nodes.

Figure 14:
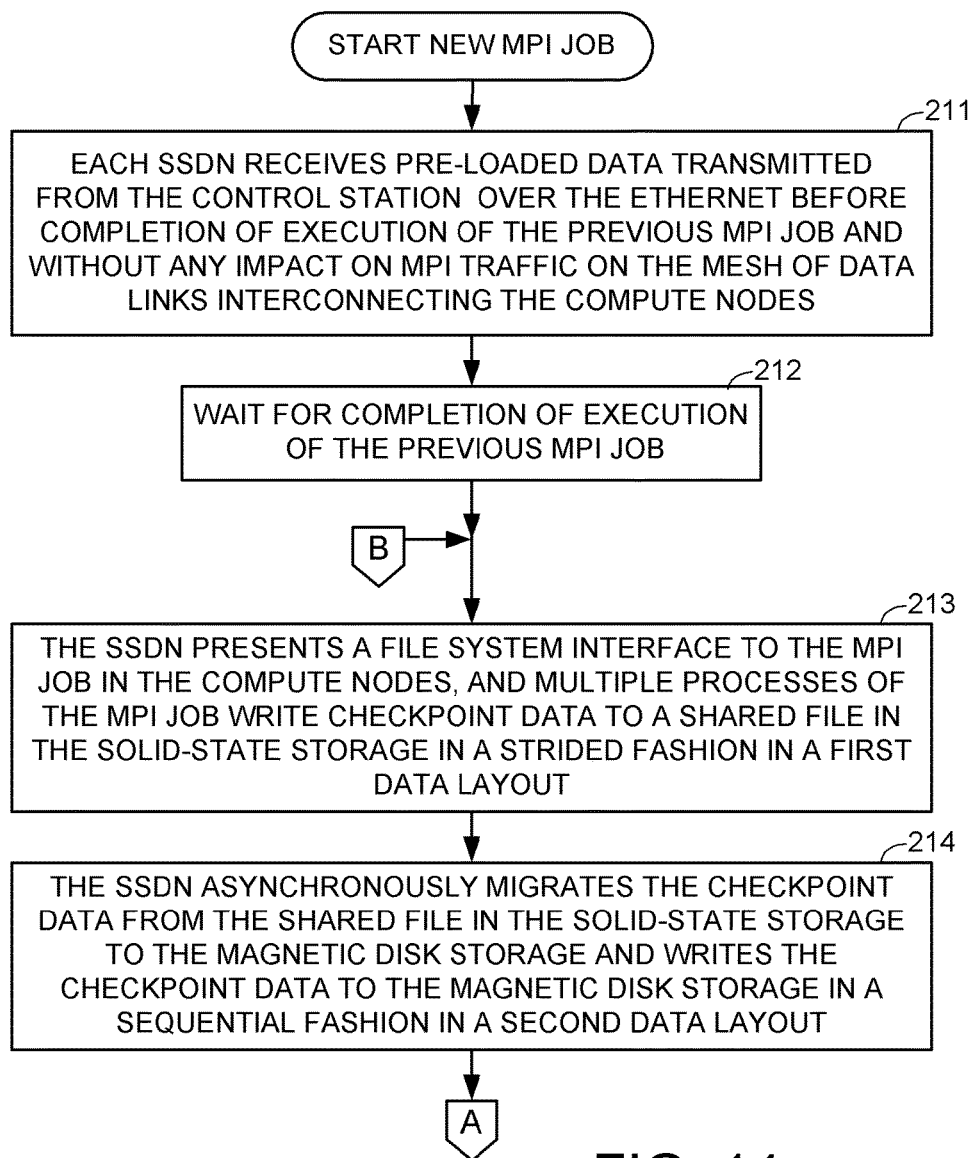
FIGS. 14 and 15 together comprise a flowchart of the operation of the solid-state drive nodes in the parallel supercomputer cluster of FIG. 1.
Figure 15:
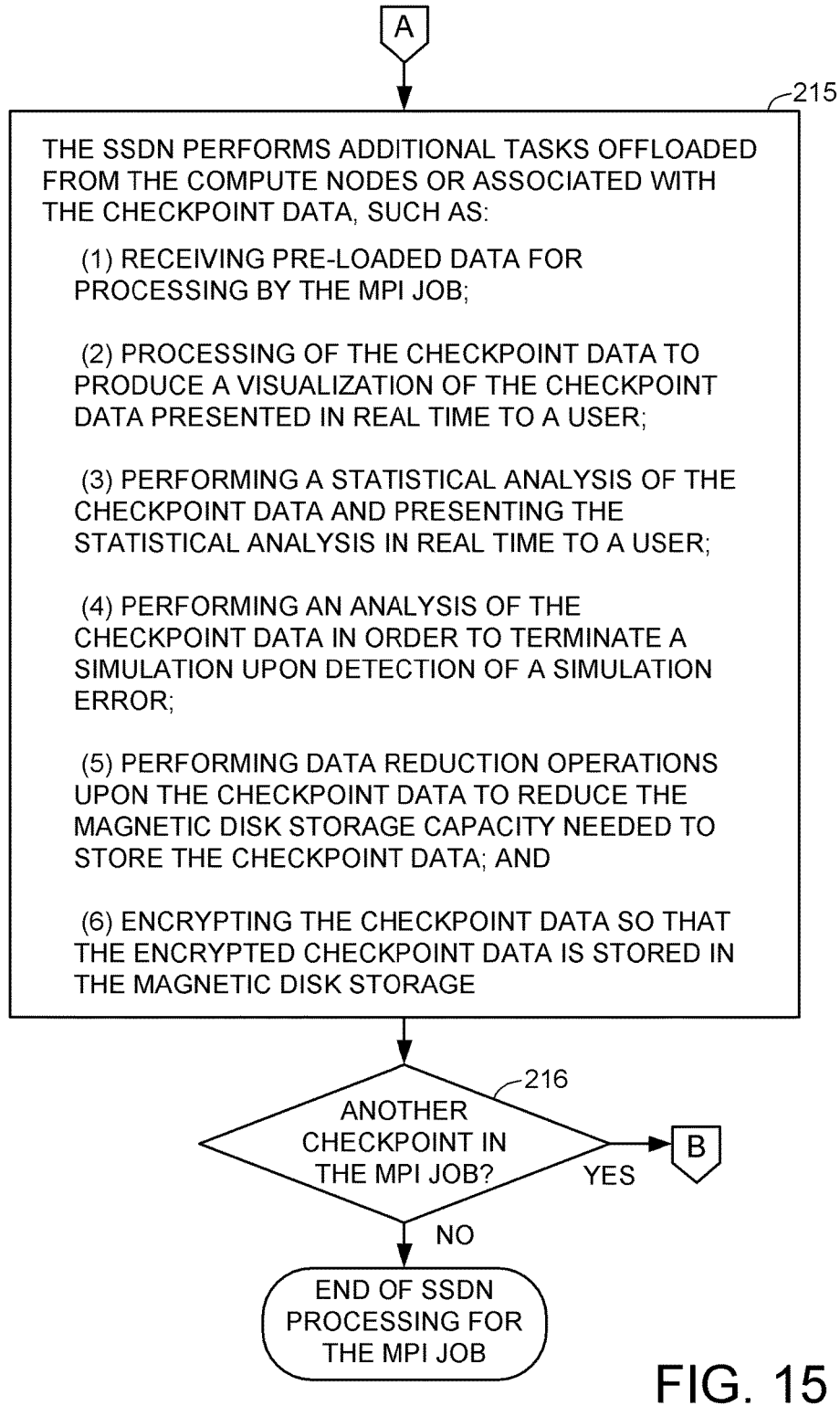

FIGS. 14 and 15 together show the operation of the SSDNs for a new MPI job in the parallel supercomputer cluster of FIG. 1. In order to start the new MPI job, in a first step 211 in FIG. 14, each SSDN receives pre-loaded data for the new MPI job. The pre-loaded data is transmitted from the control station (22 in FIG. 1) over the Ethernet before completion of execution of the previous MPI job and without any impact on MPI traffic on the mesh of data links interconnecting the compute nodes. Next, in step 212, the SSDN does not do any further work for the new MPI job until completion of execution of the previous MPI job. Then, in step 213, the SSDN presents a file system interface to the MPI job in the compute nodes, and multiple processes of the MPI job write checkpoint data to a shared file in the solid-state storage in a strided fashion in a first data layout. (An example of such a shared file is the checkpoint file 107 in FIG. 3, and such a first data layout is further shown in the file 187 in FIG. 8.) In step 214, the SSDN asynchronously migrates the checkpoint data from the shared file in the solid-state storage to the magnetic disk storage and writes the checkpoint data to the magnetic disk storage in a sequential fashion in a second data layout. (In the example of FIG. 3, the checkpoint data is written to the files 114, 115, 116 in the magnetic disk storage of the RAID-6 storage server 70, and such a second data layout is further shown in the backing filesystem 184 in FIG. 8). Execution continues from step 214 to step 215 in FIG. 215.

In step 215, the SSDN performs additional tasks offloaded from the compute nodes or associated with the checkpoint data, such as:

(1) Receiving pre-loaded data for processing by the MPI job;

(2) Processing of the checkpoint data to produce a visualization of the checkpoint data presented in real time to a user;

(3) Performing a statistical analysis of the checkpoint data and presenting the statistical analysis in real time to a user;

(4) Performing an analysis of the checkpoint data in order to terminate a simulation upon detection of a simulation error;

(5) Performing data reduction operations upon the checkpoint data to reduce the magnetic disk storage capacity needed to store the checkpoint data; and (6) Encrypting the checkpoint data so that the encrypted checkpoint data is stored in the magnetic disk storage.

One or more of the additional tasks can be performed in step 215 concurrently or in parallel with steps 213 and 214. For example, steps 213 and 214 are given priority over the additional tasks in step 215, and the additional tasks are performed in step 215 concurrently or in parallel with steps 213 and 214 depending on the availability of SSDN processing resources required for the additional tasks.

In step 216, if another checkpoint occurs in the MPI job, execution loops back to step 213. Otherwise, if steps 213, 214, and 215 have been completed for the last checkpoint of the MPI job, then the SSDN has completed its processing for the MPI job.

Figure 16:
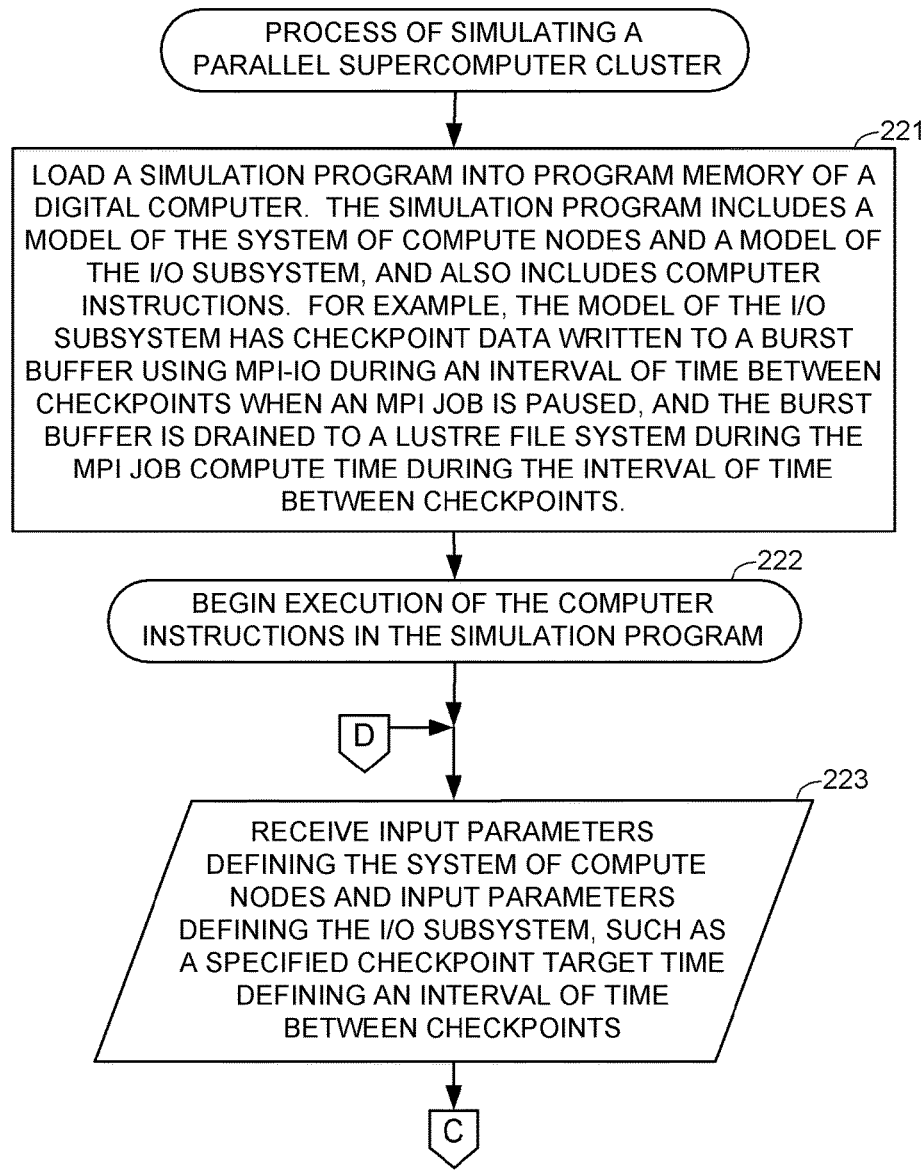
FIGS. 16 and 17 together comprise a flowchart of a process of simulating a parallel supercomputer cluster.
Figure 17:
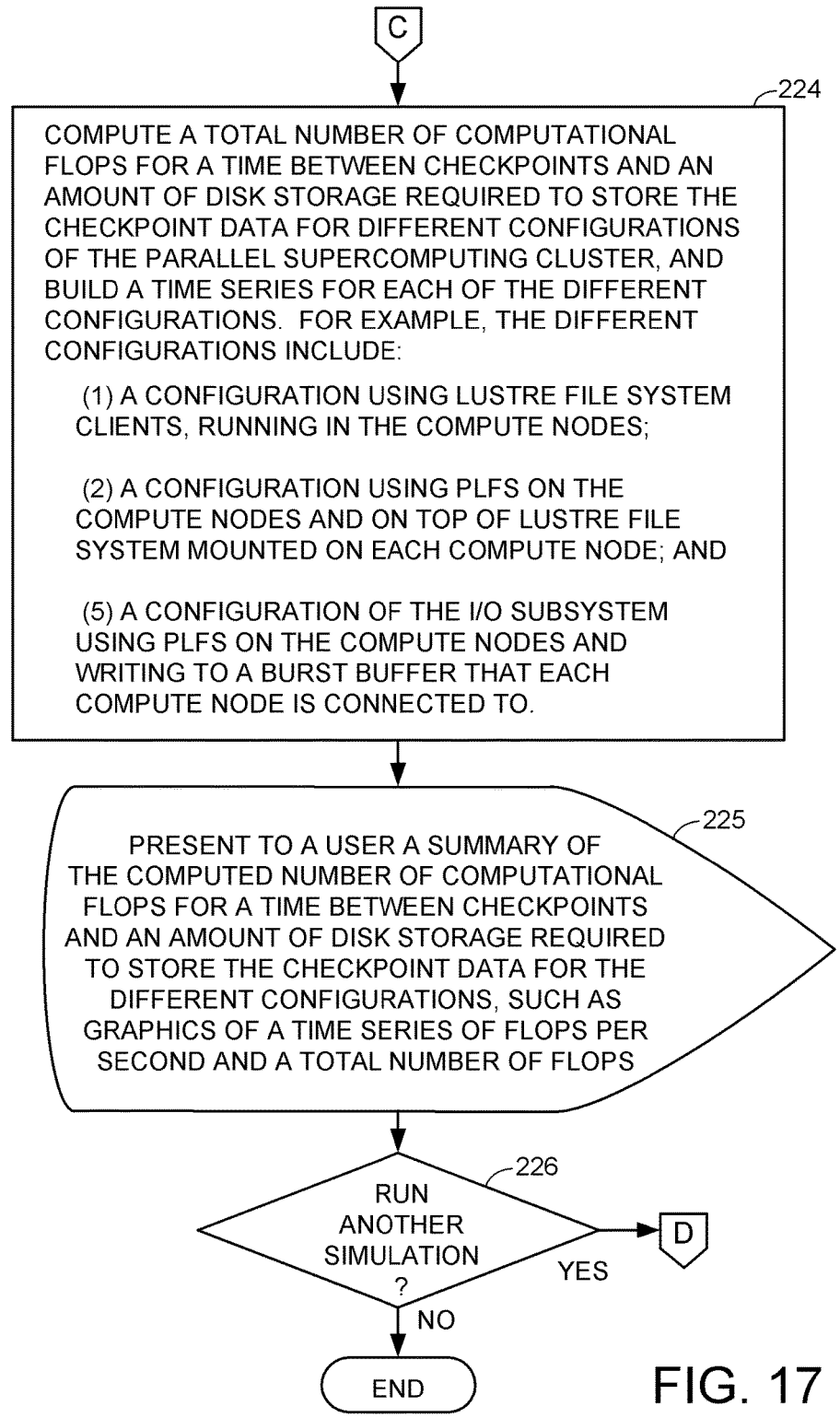

FIGS. 16 and 17 show the process of simulating a parallel supercomputer cluster. In a first step 221 in FIG. 16, the simulation program (49 in FIG. 1), as listed and described above, is loaded into the program memory of a digital computer. For example, the digital computer is the control station 22 shown in FIG. 1, which has an internal construction similar to the compute node 23 in FIG. 1, including the program memory 75. The simulation program includes a model of the system of compute nodes, and a model of the I/O subsystem, and also includes computer instructions. For example, the model of the I/O subsystem has checkpoint data written to a burst buffer using MPI-IO during an interval of time between checkpoints when an MPI job is paused, and the burst buffer is drained to a Lustre file system during the MPI job compute time during the interval of time between checkpoints. In step 222, the data processor of the digital computer begins execution of the computer instructions in the simulation program. As a result of this execution, the digital computer performs the following steps 223, 224, 225, and 226.

In step 223, the digital computer receives input parameters defining the system of compute nodes and input parameters defining the I/O subsystem, such as a specified checkpoint target time defining an interval of time between checkpoints. For example, the input parameters defining the system of compute nodes are included in Table I above, and the input parameters defining the I/O subsystem are included in Table II above. These input parameters could be received from a user (e.g. 44 in FIG. 1) from a keyboard (e.g. 43 in FIG. 1) or received from one or more files loaded into the digital computer. Execution continues from step 223 to step 224 in FIG. 17.

In step 224 in FIG. 17, the data processor of the digital computer computes a total number of computational flops for a time between checkpoints and an amount of disk storage required to store the checkpoint data for different configurations of the parallel supercomputer, and builds a time series for each of the different configurations. For example, the different configurations include: (1) a configuration using Lustre file system clients, running in the compute nodes; (2) a configuration using PLFS on the compute nodes and on top of Lustre file system mounted on each compute node; and (3) a configuration of the I/O subsystem using PLFS on the compute nodes and writing to a burst buffer that each compute node is connected to.

In step 225, the digital computer presents to the user a summary of the computed number of computational flops for a time between checkpoints and an amount of disk storage required to store the checkpoint data for the different configurations, such as graphics of a time series of flops per second and a total number of flops. For example, the summary is in the form of a table such as Table III or Table IV above, and the graphics are graphs of flops/sec or flops as a function of time such as FIGS. 9 to 13 as described above. The presentation can be a view on a video display (42 in FIG. 1) or a paper print-out or a graphics file presented to the user.

In step 226, if the user chooses to run another simulation, execution loops back to step 223 in FIG. 16. Otherwise, execution of the simulation program ends.

What is claimed is:

1. An apparatus for simulating a parallel supercomputing cluster having a system of compute nodes and an I/O subsystem connected to the compute nodes for storing checkpoint data from the compute nodes, the apparatus comprising a digital computer including a data processor and non-transitory computer readable storage medium storing a simulation program, the simulation program including a model of the system of compute nodes and a model of the I/O subsystem and also including computer instructions that, when executed by the data processor, perform the steps of:
   (a) receiving input parameters defining the system of compute nodes and input parameters defining the I/O subsystem;
   (b) computing a total number of computational floating point operations for a time between checkpoints for different configurations of the parallel supercomputing cluster, and computing an amount of disk storage required to store the checkpoint data for the different configurations of the parallel supercomputing cluster; and
   (c) presenting, to a user, a summary of the computed total number of computational floating point operations for the time between checkpoints for the different configurations of the parallel supercomputing cluster, and presenting, to the user, a summary of the computed amount of disk storage required to store the checkpoint data for the different configurations of the parallel supercomputing cluster.

2. The apparatus as claimed in claim 1, wherein the input parameters defining the system of compute nodes include a specified checkpoint target time defining an interval of time between checkpoints.

3. The apparatus as claimed in claim 1, wherein the different configurations of the parallel supercomputing cluster include a configuration using Lustre file system clients, running in the compute nodes.

4. The apparatus as claimed in claim 1, wherein the different configurations of the parallel supercomputing cluster include a configuration using Parallel Log-Structured File System (PLFS) on the compute nodes on top of Lustre file system mounted on each compute node.

5. The apparatus as claimed in claim 1, wherein the different configurations of the parallel supercomputing cluster include a configuration of the I/O subsystem using Parallel Log-Structured File System (PLFS) on the compute nodes and writing to a burst buffer that each compute node is connected to.

6. The apparatus as claimed in claim 5, wherein the model of the I/O subsystem has checkpoint data written to the burst buffer using Message Passing Interface Input-Output (MPI-IO) during an interval of time between checkpoints when an MPI job is paused, and the burst buffer is drained to a Lustre file system during the MPI job compute time during the interval of time between checkpoints.

7. An apparatus for simulating a parallel supercomputing cluster having a system of compute nodes and an I/O subsystem connected to the compute nodes for storing checkpoint data from the compute nodes, the apparatus comprising a digital computer including a data processor and non-transitory computer readable storage medium storing a simulation program, the simulation program including a model of the s stem of compute nodes and a model of the I/O subs stem and also including computer instructions that, when executed by the data processor, perform the steps of:
   (a) receiving input parameters defining the s stem of compute nodes and input parameters defining the I/O subsystem;
   (b) computing a total number of computational floating point operations for a time between checkpoints for different configurations of the parallel supercomputing cluster, and computing an amount of disk storage required to store the checkpoint data for the different configurations of the parallel supercomputing cluster; and
   (c) presenting, to a user, a summary of the computed total number of computational floating point operations for the time between checkpoints for the different configurations of the parallel supercomputing cluster, and presenting, to the user, a summary of the computed amount of disk storage required to store the checkpoint data for the different configurations of the parallel supercomputing cluster;
   wherein step (b) includes computing an amount of time required to write checkpoint data from the compute nodes to the I/O subsystem for each of the different configurations of the parallel supercomputing cluster, and building a time series for each of the different configurations of the parallel supercomputing cluster.

8. The apparatus as claimed in claim 1, wherein the summary of the computed total number of computational floating point operations presented to the user includes graphics of a time series of floating point operations per second and a total number of floating point operations.

9. A method of simulating a parallel supercomputing cluster having a system of compute nodes and an I/O subsystem connected to the compute nodes for storing checkpoint data from the compute nodes, the method comprising a data processor executing computer instructions of a simulation program stored in non-transitory computer readable storage medium, the simulation program including a model of the system of compute nodes and a model of the I/O subsystem, and the execution of the computer instructions performing the steps of:
   (a) receiving input parameters defining the system of compute nodes and input parameters defining the I/O subsystem;
   (b) computing a total number of computational floating point operations for a time between checkpoints, and computing an amount of disk storage required to store the checkpoint data for different configurations of the parallel supercomputing cluster; and
   (c) presenting, to a user, a summary of the computed total number of computational floating point operations for the time between checkpoints for the different configurations of the parallel supercomputing cluster, and presenting, to the user, a summary of the computed amount of disk storage required to store the checkpoint data for the different configurations of the parallel supercomputing cluster.

10. The method as claimed in claim 9, wherein the input parameters defining the system of compute nodes include a specified checkpoint target time defining an interval of time between checkpoints.

11. The method as claimed in claim 9, wherein the different configurations of the parallel supercomputing cluster include a configuration using Lustre file system clients, running in the compute nodes.

12. The method as claimed in claim 9, wherein the different configurations of the parallel supercomputing cluster include a configuration using Parallel Log-Structured File System (PLFS) on the compute nodes on top of Lustre file system mounted on each compute node.

13. The method as claimed in claim 9, wherein the different configurations of the parallel supercomputing cluster include a configuration of the I/O subsystem using Parallel Log-Structured File System (PLFS) on the compute nodes and writing to a burst buffer that each compute node is connected to.

14. The method as claimed in claim 13, wherein the model of the I/O subsystem has checkpoint data written to the burst buffer using Message Passing Interface Input-Output (MPI-IO) during an interval of time between checkpoints when an MPI job is paused, and the burst buffer is drained to a Lustre file system during the MPI job compute time during the interval of time between checkpoints.

15. The method as claimed in claim 9, wherein step (b) includes computing an amount of time required to write checkpoint data from the compute nodes to the I/O subsystem for each of the different configurations of the parallel supercomputing cluster, and building a time series for each of the different configurations of the parallel supercomputing cluster.

16. The method as claimed in claim 9, wherein the summary of the computed total number of computational floating point operations presented to the user includes graphics of a time series of floating point operations per second and a total number of floating point operations.

17. A computer program product comprising non-transitory computer readable storage medium storing computer instructions that, when executed by a data processor, perform the steps of:
   (a) receiving input parameters defining the system of compute nodes and input parameters defining the I/O subsystem;
   (b) computing a total number of computational floating point operations for a time between checkpoints, and computing an amount of disk storage required to store the checkpoint data for different configurations of the parallel supercomputing cluster; and
   (c) presenting, to a user, a summary of the computed total number of computational floating point operations for the time between checkpoints for the different configurations of the parallel supercomputing cluster, and presenting, to the user, a summary of the computed amount of disk storage required to store the checkpoint data for the different configurations of the parallel supercomputing cluster.

18. The computer program product as claimed in claim 17, wherein the input parameters defining the system of compute nodes include a specified checkpoint target time defining an interval of time between checkpoints, and the different configurations of the parallel supercomputing cluster include: (1) a configuration using Lustre file system clients, running in the compute nodes; (2) a configuration using Parallel Log-Structured File System (PLFS) on the compute nodes on top of Lustre file system mounted on each compute node; and (3) a configuration of the I/O subsystem using PLFS on the compute nodes and writing to a burst buffer that each compute node is connected to.

19. The computer program product as claimed in claim 17, wherein the different configurations of the parallel supercomputing cluster include a configuration of the I/O subsystem using Parallel Log-Structured File System (PLFS) on the compute nodes and writing to a burst buffer that each compute node is connected to, and the model of the I/O subsystem has checkpoint data written to the burst buffer using Message Passing Interface Input-Output (MPI-IO) during an interval of time between checkpoints when an MPI job is paused, and the burst buffer is drained to a Lustre file system during the MPI job compute time during the interval of time between checkpoints.

20. The computer program product as claimed in claim 17, wherein step (b) includes computing an amount of time required to write checkpoint data from the compute nodes to the I/O subsystem for each of the different configurations of the parallel supercomputing cluster, and building a time series for each of the different configurations of the parallel supercomputing cluster.

* * * * *